United States Patent
Xin et al.

(10) Patent No.: US 12,477,461 B2
(45) Date of Patent: Nov. 18, 2025

(54) RESTRICTED TARGET WAKE TIME SERVICE PERIOD TERMINATION

(71) Applicants: SONY GROUP CORPORATION, Tokyo (JP); SONY CORPORATION OF AMERICA, New York, NY (US)

(72) Inventors: Liangxiao Xin, San Jose, CA (US); Li-Hsiang Sun, San Jose, CA (US); Qing Xia, San Jose, CA (US); Mohamed Abouelseoud, Burlingame, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 715 days.

(21) Appl. No.: 17/844,555

(22) Filed: Jun. 20, 2022

(65) Prior Publication Data
US 2023/0047705 A1    Feb. 16, 2023

Related U.S. Application Data

(60) Provisional application No. 63/260,155, filed on Aug. 11, 2021.

(51) Int. Cl.
*H04W 52/02* (2009.01)
*H04W 74/04* (2009.01)
(Continued)

(52) U.S. Cl.
CPC ....... *H04W 52/0216* (2013.01); *H04W 74/04* (2013.01); *H04W 74/0808* (2013.01); *H04W 84/12* (2013.01)

(58) Field of Classification Search
CPC ............ H04W 52/0216; H04W 74/04; H04W 74/0808; H04W 84/12; H04W 74/0816; Y02D 30/70
(Continued)

(56) References Cited

U.S. PATENT DOCUMENTS

| 2011/0222524 A1* | 9/2011 | Thomson .......... H04W 74/0816 370/339 |
| 2016/0219522 A1* | 7/2016 | Asterjadhi ........ H04W 52/0235 |

(Continued)

FOREIGN PATENT DOCUMENTS

| JP | 2018505606 A | 2/2018 |
| WO | WO-2020085997 A1 | 4/2020 |

(Continued)

OTHER PUBLICATIONS

IEEE, 35. Extremely high throughput (EHT) MAC specification, IEEE Draft; TGBE_CL_35, IEEE-SA, Piscataway, NJ USA vol. 802.11be drafts, No. D1.01 Jun. 30, 2021 (Jun. 30, 2021), 78 pages, XP068183291.

(Continued)

*Primary Examiner* — Michael Y Mapa
(74) *Attorney, Agent, or Firm* — O'BANION & RITCHEY LLP; John P. O'banion

(57) ABSTRACT

A wireless communication protocol using CSMA/CA, EDCA and R-TWT to prioritize RTA traffic transmissions. During an R-TWT SP, the RTA traffic is prioritized for transmission and mechanisms are provided for assuring proper indications and termination of the R-TWT SP. During this process, member STAs communicate with the R-TWT scheduling AP when they have no more frames to send. The R-TWT scheduling AP can also terminate the R-TWT SP before its scheduled end time, allowing non-member STAs to immediately contend for the channel. In addition, the R-TWT scheduling AP can exchange frames with STAs, that have an R-TWT feature but are not R-TWT member STAs, after frame exchanges with the R-TWT member STAs during the R-TWT SP have been completed.

21 Claims, 29 Drawing Sheets

(51) Int. Cl.
*H04W 74/0808* (2024.01)
*H04W 84/12* (2009.01)

(58) Field of Classification Search
USPC .................................. 370/318; 455/450–455
See application file for complete search history.

(56) References Cited

U.S. PATENT DOCUMENTS

| 2017/0265130 | A1  | 9/2017 | Kakani |              |
|--------------|-----|--------|--------|--------------|
| 2021/0022154 | A1  | 1/2021 | Cavalcanti |          |
| 2021/0037464 | A1* | 2/2021 | Cariou | H04W 52/0229 |
| 2023/0308938 | A1* | 9/2023 | Sun    | H04W 28/0278 |
| 2024/0163916 | A1* | 5/2024 | Ryu    | H04W 74/0866 |

FOREIGN PATENT DOCUMENTS

| WO | 2020146094 A1    | 7/2020  |
|----|------------------|---------|
| WO | WO-2020243117 A1 | 12/2020 |
| WO | WO-2022047114 A1 | 3/2022  |

OTHER PUBLICATIONS

Rubayet Shafin (Samsung Research America), Handling Fairness Issue in Restricted TWT, IEEE Draft; 11-21-1020-01-00BE-Handling-Fairness-Issue -In-Restricted-TWT, IEEE-SA Mentor, Piscataway, NJ USA, vol. 802.11 EHT; 802.11be, No. 1 Aug. 10, 2021 (Aug. 10, 2021), 13 pages, XP068184508.

Chunyu Hu etal., "Traffic Prioritization During the Restricted TWT SPs", IEEE 802.11-21/1115r0, Jul. 25, 2021.

\* cited by examiner

FIG. 1 (Prior Art)

| Element ID | Length | TS Info | Nominal MSDU Size | Maximum MSDU Size | Minimum Service Interval | Maximum Service Interval | Inactivity Interval | Suspension Interval |

| Service Start Time | Minimum Data Rate | Mean Data Rate | Peak Data Rate | Burst Size | Delay Bound | Minimum PHY Rate | Surplus Bandwidth Allowance | Medium Time | DMG Attributes |

FIG. 2 (Prior Art)

| Traffic Type | TSID | Direction | Access Policy | Aggregation | APSD | User Priority | TSInfo Ack Policy | Schedule | Reserved |

FIG. 3 (Prior Art)

| Element ID | Length | User Priority | Frame Classifier |

FIG. 4
(Prior Art)

| Element ID | Length | Processing |

FIG. 5
(Prior Art)

| Element ID | Length | Control | TWT parameter Information |

FIG. 6
(Prior Art)

| NDP Paging Indicator | Responder PM Mode | Negotiation Type | TWT Information Frame Disabled | Wake Duration Unit | Reserved |

| Request Type | Target Wake Time | Nominal Minimum TWT Wake Duration | TWT Wake Interval Mantissa | Broadcast TWT Info |

FIG. 7 (Prior Art)

| TWT Request | TWT Setup Command | Trigger | Last Broadcast Parameter Set | Flow Type | Broadcast TWT Recommendation | TWT Wake Interval Exponent | Reserved |

FIG. 8 (Prior Art)

| Reserved | Broadcast TWT ID | Broadcast TWT persistence |

| Frame Control | Duration | Address 1 | Address 2 | Address 3 | Sequence Control | Action | FCS |

| Category | Robust Action | Dialog token | SCS Descriptor List |

FIG. 12 (Prior Art)

| Element ID | Length | SCSID | Request Type | Intra-Access Category Priority | TCLAS | TCLAS Processing (optional) | TSPEC | Optional Subelements |

FIG. 13 (Prior Art)

| Frame Control | Duration | Address 1 | Address 2 | Address 3 | Sequence Control | Action | FCS |

| Category | Robust Action | Dialog token | SCS Status List |

FIG. 14 (Prior Art)

| SCSID | Status |

RESTRICTED TARGET WAKE TIME SERVICE PERIOD TERMINATION

CROSS-REFERENCE TO RELATED APPLICATIONS

This application claims priority to, and the benefit of, U.S. provisional patent application Ser. No. 63/260,155 filed on Aug. 11, 2021, incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless local area networks using CSMA/CA, and more particularly to terminating Restricted Target Wake Time (R-TWT) Service Periods (SPs).

2. Background Discussion

Current wireless technologies using CSMA/CA focus on achieving high throughput network performance, yet they lack low latency capability. However, numerous applications, such as real time applications (RTA), require low latency.

A real time application requires low latency communication and uses best effort communication. The data generated from the RTA is called RTA traffic and will be packetized as RTA frames at the transmitter STA. In contrast to this, the data generated from a non-time sensitive application is called non-RTA traffic, and will be packetized as non-RTA frames at the transmitter STA. Then, the transmitting STA transmits packets within frames to the receiver STA over the channel.

The RTA frame requires low latency due to its high timeliness requirement on delivery. The RTA frame is valid when it is delivered within a certain period of time. One solution in a CSMA/CA wireless protocol is to schedule a service period (SP) for the Restricted Target Wake Time (R-TWT) for RTA frame exchange. During the R-TWT SPs, the RTA frames have higher transmission priority than other frames. However, R-TWT issues can arise in regard to efficiency and fair use.

Accordingly, a need exists for improved R-TWT operations. The present disclosure fulfills that need and provides additional R-TWT benefits.

BRIEF SUMMARY

Current wireless communication systems, such as under IEEE 802.11be, utilize EDCA and R-TWT to prioritize RTA traffic transmissions. During an R-TWT SP, the RTA traffic is prioritized to transmit. However, since R-TWT SP duration is scheduled and announced in advance, in some instances the R-TWT SP duration can end up being longer than the transmission time required by the R-TWT member STAs.

The present disclosure describes a protocol which contains a mechanism for communicating that the R-TWT SP has ended immediately after all the RTA traffic is transmitted during the R-TWT SP; and addresses the R-TWT scheduling challenge of the AP identifying transmitted RTA frames, which may be UL, DL, or P2P.

Thus, in order to improve the efficiency of channel usage and avoid fair use issues (abuse) of R-TWT SP, the R-TWT SP should be terminated immediately after the RTA frame exchange is completed.

In the present disclosure, the R-TWT scheduling AP and member STAs of a R-TWT negotiate which traffic is scheduled, and prioritize that traffic, during R-TWT SPs.

In the present disclosure, the member STAs can send a signal to the R-TWT scheduling AP, during the R-TWT SP, to indicate that it does not have any more scheduled UL and/or P2P to transmit during R-TWT SP.

In the present disclosure, the R-TWT scheduling AP can send a signal to other STAs indicating termination of the R-TWT SP, after all scheduled traffic has been transmitted during the R-TWT SP.

In the present disclosure, after finishing all the scheduled traffic transmission during the R-TWT SP, the R-TWT scheduling AP can share the remaining time of the R-TWT SP for frame exchange with the STAs that are R-TWT scheduled STAs but not member STAs of that R-TWT.

More specifically, in at least one embodiment of the present disclosure, the R-TWT scheduling AP and the R-TWT member STAs start a R-TWT SP for frame exchange between them. The R-TWT member STA sends a signal to the R-TWT scheduling AP when it does not have any more frames to transmit during the R-TWT SP. The R-TWT scheduling AP sends a signal to indicate the termination of the R-TWT SP when all the frame exchanges have been performed during the R-TWT SP.

In at least one other embodiment of the present disclosure, the R-TWT scheduling AP and the R-TWT member STAs start a R-TWT SP for performing frame exchange between them. The R-TWT scheduling AP terminates the R-TWT SP before the scheduled end time of the R-TWT SP. The STAs that are not member STAs of the R-TWT start to contend for the channel immediately after the R-TWT SP terminates.

In at least one further embodiment of the present disclosure, the R-TWT scheduling AP and the R-TWT member STAs start a R-TWT SP. The R-TWT scheduling AP exchanges frames with the R-TWT member STAs during the R-TWT SP. The R-TWT scheduling AP exchanges frames with the STAs that are not R-TWT member STAs, and has the R-TWT feature implemented after it finishes frame exchange with the R-TWT member STAs during the R-TWT SP. There are numerous additional elements and benefits, of the present disclosure.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 1 is a data field diagram of a TSPEC element as defined in IEEE 802.11.

FIG. 2 is a data field diagram of the contents in the TS Info field as shown in FIG. 1.

FIG. 3 is a data field diagram of the contents of a TCLAS element which as defined in IEEE 802.11.

FIG. 4 is a data field diagram of the contents of a TCLAS Processing element as defined in IEEE 802.11.

FIG. 5 is a data field diagram of the TWT element defined in IEEE 802.11ax.

FIG. 6 is a data field diagram of a control field of the TWT element as shown in FIG. 5.

FIG. 7 is a data field diagram of a broadcast TWT parameter Information field which is valid for a specific Negotiation Type.

FIG. 8 is a data field diagram of a Request type field in the Broadcast TWT parameter Information field.

FIG. 9 is a data field diagram of a Broadcast TWT Info field of the broadcast TWT parameter Information field of FIG. 7.

FIG. 11 is a data field diagram of an SCS request frame.

FIG. 12 is a data field diagram of an SCS descriptor elements from the SCS status list field seen in FIG. 11.

FIG. 13 is a data field diagram of the format for SCS response frame.

FIG. 14 is a data field diagram of an SCS status subfield.

DETAILED DESCRIPTION

Figure 10:
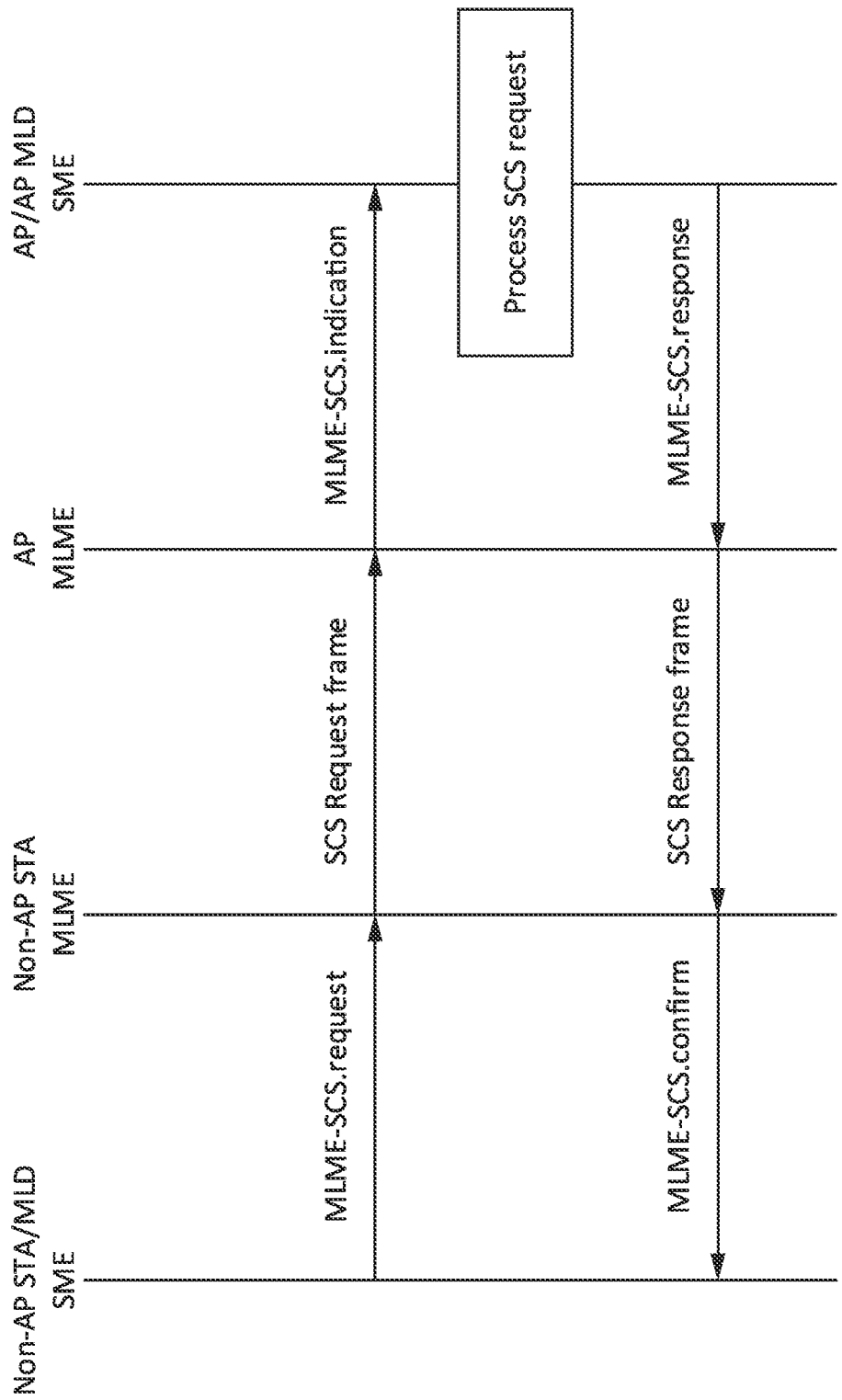
FIG. 10 is a communication diagram of an SCS setup defined in IEEE 802.11be (Draft P802.11be_D1.01).

1. Introduction to 802.11 Elements 1.1. Traffic Specification (TSPEC)

FIG. 1 depicts the content in a TSPEC element which is defined in IEEE 802.11. An Element ID field indicates the type of element; which in this instance is that of a TSPEC element. A Length field indicates the length of the TSPEC element. A TS Information (Info) field contains traffic stream information as shown in FIG. 2.

It will be noted, that in this disclosure, fields which are not described have the same function of prior fields of that name in other elements.

A Nominal MSDU Size field indicates the nominal size of MSDUs or A-MSDUs belonging to the TS under this TSPEC. A Maximum MSDU Size field contains the maximum size of MSDUs or A-MSDUs belonging to the TS under this TSPEC. A Minimum Service Interval field indicates the minimum time between the start time of two successive service periods (SPs). A Maximum Service Interval field indicates the maximum time between the start time of two successive SPs. An Inactivity Interval field indicates the time that is allowed to transpire without arrival or transmission of a MSDU belonging to the TS; after which that TS is deleted. A Suspension Interval field indicates the time that is allowed to transpire without arrival or transmission of a MSDU belonging to the TS before the generation of successive Quality-of-Service (QoS) (+) Contention-Free (CF)-Polling is stopped for this TS. A Service Start Time field indicates the start time of the first SP. A Minimum Data Rate field indicates the lowest data rate specified by MAC SAP for transmitting MSDUs or A-MSDUs belonging to the TS under this TSPEC. A Mean Data Rate field indicates the average data rate specified by MAC SAP for transmitting MSDUs or A-MSDUs belonging to the TS under this TSPEC.

A Peak Data Rate field indicates the maximum data rate specified by MAC SAP for transmitting MSDUs or A-MSDUs belonging to the TS under this TSPEC. A Burst Size field indicates the maximum burst of MSDUs or A-MSDUs belonging to the TS under this TSPEC at the peak data rate. A Delay Bound field indicates the maximum time that is allowed to transmit a MSDU or A-MSDU belonging to the TS under this TSPEC. A Minimum PHY Rate field indicates the lowest PHY rate for transmitting MSDUs or A-MSDUs belonging to the TS under this TSPEC. A Surplus Bandwidth Allowance field indicates the ratio of the bandwidth utilized for transmitting a MSDU or A-MSDU belonging to the TS under this TSPEC and its retransmissions to the bandwidth used for transmitting that MSDU or A-MSDU once at the minimum PHY rate. A Medium Time field indicates the amount of time that the STA is allowed for accessing the medium. A DMG Attributes field is presented when the TSPEC is applied to a directional multi-gigabit (DMG) BSS.

FIG. 2 depicts the contents in the TS Info field, shown in FIG. 1, as defined in IEEE 802.11. The subfields of the TS Info field are as follows. A Traffic Type subfield specifies whether the traffic is periodic or not. A TSID subfield provides an ID number to identify the TS. A Direction subfield specifies the direction of data transmission. An Access Policy subfield specifies the method for gaining channel access. An Aggregation subfield specifies whether the aggregation schedule is required. An APSD subfield indicates whether automatic PS delivery is used. A User Priority subfield indicates user priority of the MSDU or A-MSDU belonging to the TS. A TSInfo Ack Policy subfield indicates whether the Ack is required, and which form of Ack is to be utilized. A Schedule subfield indicates the type of schedule.

1.1.2. TCLAS Element

FIG. 3 depicts the contents of the TCLAS element which is defined in IEEE 802.11. An Element ID field indicates the type of element; in this case it indicates this is a TCLAS element. A Length field indicates the length of the TCLAS element. A User Priority field indicates user priority from the upper layer. A Frame Classifier field indicates the method to be utilized in classifying the frames from the upper layer.

1.1.3. TCLAS Process Element

FIG. 4 depicts the contents of a TCLAS Processing element which is defined in IEEE 802.11. An Element ID field indicates the type of element; here indicating it's a TCLAS Processing element. A Length field indicates the length of the TCLAS Processing element. A Processing field indicates the method of classifying traffic from the upper layer when multiple TCLAS elements exist.

1.1.4. TWT Element

FIG. 5 depicts the format of TWT element defined in IEEE 802.11ax having fields for Element ID, Length, Control and TWT Parameter Information.

FIG. 6 depicts a control field of the TWT element shown in FIG. 5; and has the following fields: NDP Paging indicator, Responder PM Mode, Negotiation Type, TWT Information Frame Disabled, Wake Duration Unit and Reserved. The Negotiation type subfield indicates the type of negotiation to be performed. \

FIG. 7 depicts a Broadcast TWT parameter Information element which is valid when the Negotiation Type, as described in FIG. 6, is set to a value of "2" or "3". The subfields are shown as Request Type, Target Wake Time, Nominal Minimum TWT Wake Duration, TWT Wake Interval Mantissa and Broadcast TWT Information.

It should be noted that there is an update in IEEE 802.11be (Draft P802.11be_D1.01). When the broadcast TWT recommendation field in the Request type field in Broadcast TWT parameter Information field is set to "4", it represents the broadcast TWT (B-TWT) indicated in the Broadcast TWT parameter Information field is a restricted TWT (R-TWT).

FIG. 8 depicts a Request type field in the Broadcast TWT parameter Information field, having the following subfields: TWT Request, TWT Setup Command, Trigger, Last Broadcast Parameter Set, Flow Type, Broadcast TWT Recommendation, TWT Wake Interval Exponent and Reserved subfield.

FIG. 9 depicts a Broadcast TWT Info field in a Broadcast TWT parameter Information field, which has the following fields. A Broadcast TWT ID subfield, and a Broadcast TWT persistence subfield.

1.2. SCS Signaling

FIG. 10 depicts an example of SCS setup defined in IEEE 802.11be (Draft P802.11be_D1.01). The interworking model of the STAs could the same as defined in IEEE 802.11 standard.

The non-AP STA decides to initiate a SCS setup procedure with the AP. The Station Management Entity (SME) of the non-AP STA sends a MLME-SCS.request message to its MAC Sublayer Management Entity (MLME). When the MLME of the non-AP STA receives the MLME-SCS.request message, it collects the information in the MLME-SCS.request message and sends a SCS request frame to the AP. The MLME of the AP receives the frame and generates a MLME-SCS.indication message to its SME.

Then, the SME of the AP sends an MLME-SCS.response message containing SCS setup result to its MLME. Then, the MLME of the AP sends a SCS response frame to the non-AP STA. The MLME of the non-AP STA receives the frame and sends an MLME-SCS.confirm message to its SME. Then, the non-AP can recognize whether the SCS setup was successful or not.

FIG. 11 depicts the format of an SCS request frame. The SCS descriptor list field can carry multiple SCS descriptor elements as shown in FIG. 12.

FIG. 12 depicts one of the SCS descriptor elements from the SCS descriptor List seen in FIG. 11.

FIG. 13 depicts the format a SCS response frame. The SCS status list field can carry multiple SCS status fields as shown in FIG. 14.

FIG. 14 depicts an SCS status subfield, which represents the SCS setup result (e.g., accept, reject, reject with reasons, terminate, and so forth) of the SCS indicated in the SCSID field.

1.3. R-TWT Signaling

Figure 15:
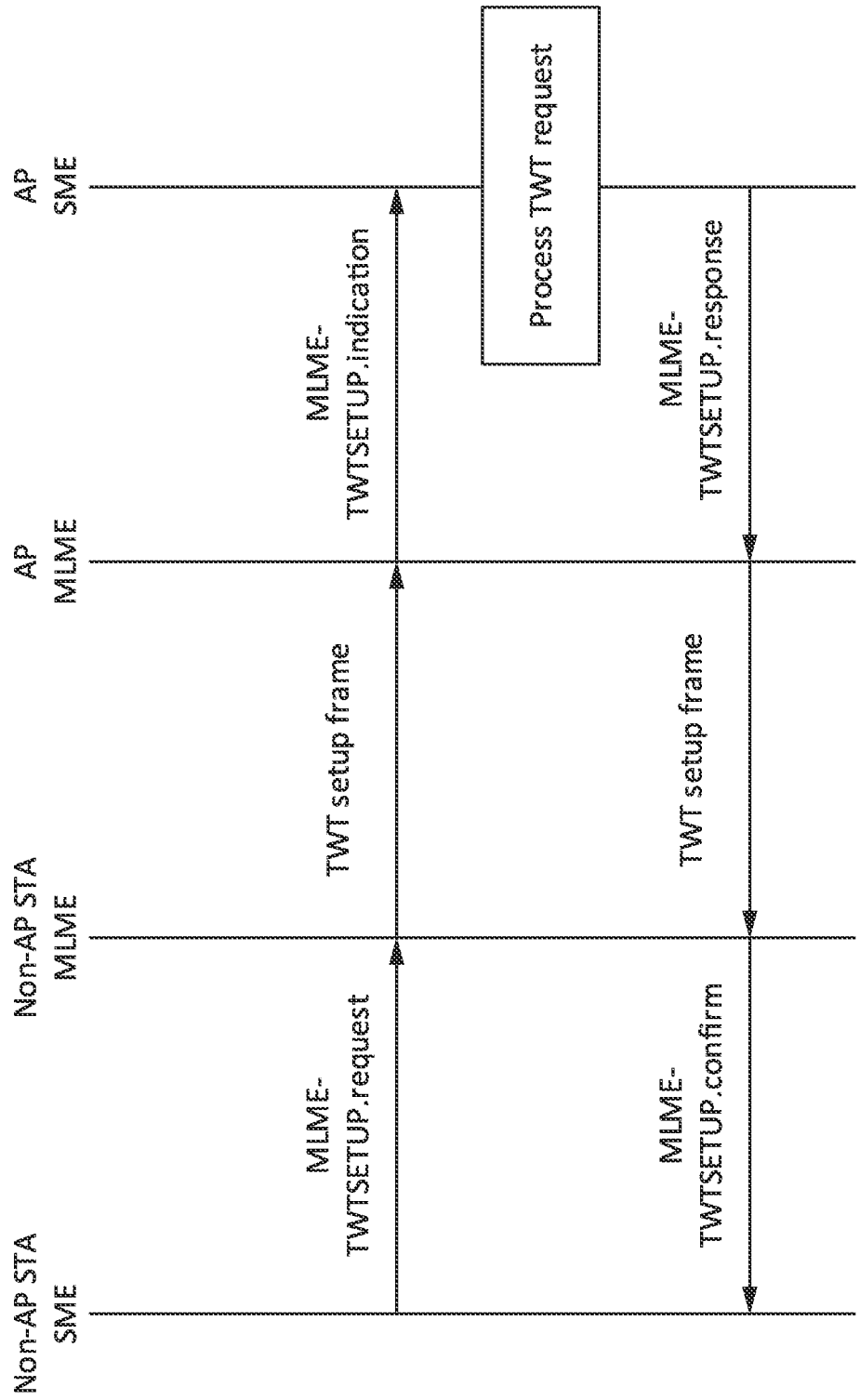
FIG. 15 is a communication diagram of TWT setup as defined in IEEE 802.11ax.

FIG. 15 depicts an example of a TWT setup defined in IEEE 802.11ax. The interworking model of the STAs can be the same as defined in the IEEE 802.11 standard.

The non-AP STA decides to initiate a TWT setup procedure with the AP. The Station Management Entity (SME) of the non-AP STA sends a MLME-TWTSETUP.request message to its MAC Sublayer Management Entity (MLME). When the MLME of the non-AP STA receives the MLME-TWTSETUP.request message, it collects the information in the MLME-TWTSETUP.request message and sends a TWT setup frame (i.e., TWT request frame) to the AP. The MLME of the AP receives the frame and generates a MLME-TWTSETUP.indication message to its SME which processes the request.

Then, the SME of the AP sends an MLME-TWTSETUP.response message containing TWT setup results to its MLME. Then, the MLME of the AP sends a TWT setup frame (i.e., TWT response frame) to the non-AP STA. The MLME of the non-AP STA receives the frame and sends an MLME-TWTSETUP.confirm message to its SME. Then, the non-AP recognizes whether the TWT setup was successful or not.

According to the definition in IEEE 802.11be, a restricted TWT R-TWT scheduling AP, referred to as an R-TWT scheduling AP, is an EHT AP that supports restricted TWT operation and sets the Restricted TWT Support subfield in the transmitted EHT Capabilities elements to a "1".

A restricted TWT R-TWT scheduled STA, referred to as an R-TWT scheduled STA, is a non-AP EHT STA that supports restricted TWT operations and sets the Restricted TWT Support subfield in the transmitted EHT Capabilities elements to a "1".

A R-TWT scheduled STA can establish membership of one or more R-TWTs scheduled by the R-TWT scheduling AP. The R-TWT setup signaling is the same as broadcast TWT with additional parameter settings, which are used for membership negotiation of a R-TWT between the R-TWT scheduled STA and the R-TWT scheduling AP. After a R-TWT scheduled STA establishes the membership of the R-TWT scheduled by the R-TWT scheduling AP, the R-TWT scheduled STA has higher priority, or is allowed to exchange frames with the R-TWT scheduling AP during the SPs of the R-TWT. On the other hand, the R-TWT scheduled STA that is not a member of the R-TWT either has a lower priority or is not allowed to exchange frames with the R-TWT scheduling AP during the SPs of the R-TWT.

Figure 16:
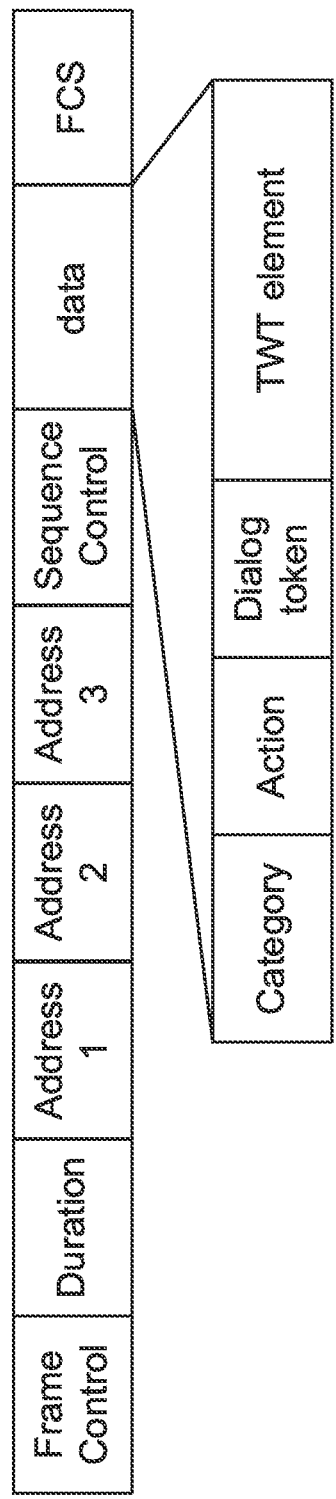
FIG. 16 is a data field diagram of a TWT Setup frame.

FIG. 16 depicts a TWT Setup frame which contains the following fields: Frame Control, Duration, multiple Addresses, Sequence Control, and data. The data field is shown in the figure containing the subfields of Category, Action, Dialog Token and TWT element.

The Frame Control field indicates the type of the frame, and can indicate that this is an action frame. The Duration field contains NAV information used for CSMA/CA channel access. The Address 1 field contains the address of frame recipient. The Address 2 field contains the address of the STA that transmitted the frame. The Address 3 field contains the BSSID of the STA that is the recipient of the frame. The sequence control field indicates the sequence number of the frame.

The Category and action field indicate the action frame is TWT setup frame and carries TWT element. The Dialog Token is used to identify the TWT setup frame. The TWT element indicates the TWT setup information whose format is shown in FIG. 5.

Figure 17:
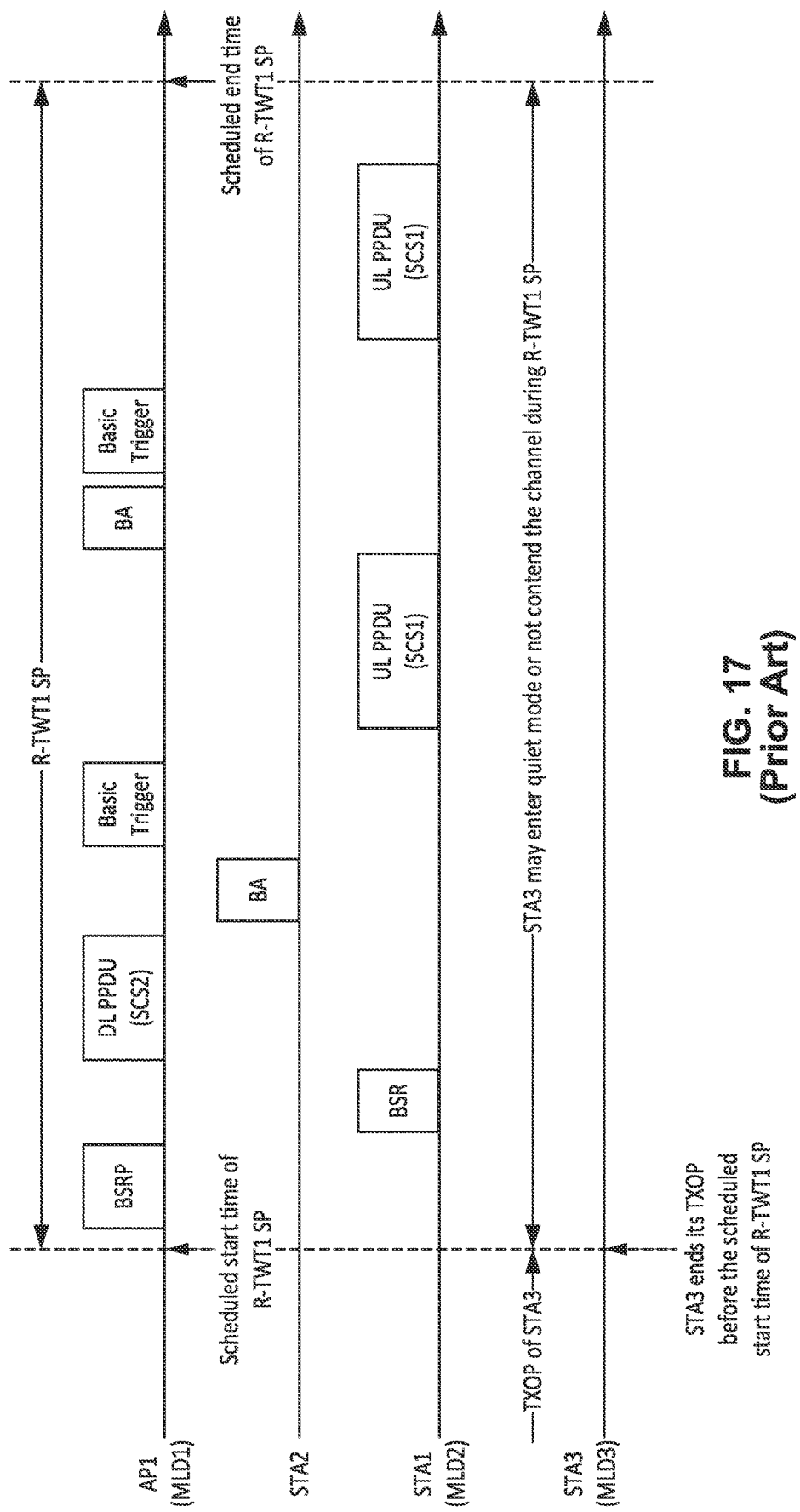
FIG. 17 is a communication diagram of an R-TWT SP communication.

FIG. 17 depicts an example of a R-TWT SP communication. AP1 is a R-TWT scheduling AP which announces R-TWT1 scheduling and manages the members of R-TWT1. STA1 and STA2 are the member STAs of R-TWT1. During the R-TWT1 SP, AP1 schedules and prioritizes the frame exchange with the member STAs (e.g., UL PPDU of SCS1 with STA1 and DL PPDU of SCS2 with STA2). STAs which can receive and recognize R-TWT scheduling are called R-TWT scheduled STAs. STA3 is a R-TWT scheduled STA, while not being a member STA of R-TWT1. STA3 has to end its TXOP before the start time of R-TWT1 SP. STA3 could also enter quiet mode, or just not contend for the channel during R-TWT1 SP. The scheduling AP could broadcast a quiet element to announce a quiet interval during a R-TWT SP, and the STA recognizing this element may enter quiet mode.

2. Problem Statement

The current wireless communication systems using EDCA and R-TWT can prioritize RTA traffic transmission, for example during an R-TWT SP, the RTA traffic is prioritized to transmit. However, the R-TWT SP duration is scheduled and announced in advance; and it in some instances the R-TWT SP duration can be longer than the transmission time required by R-TWT member STAs, which results in unused channel bandwidth (less efficient transmissions).

3. Contribution of this Invention

The R-TWT scheduling AP and member STAs of a R-TWT negotiate which traffic is scheduled to transmit during the SPs of that R-TWT. The scheduled traffic is prioritized to transmit during the R-TWT SPs. The present disclosure has identified an issue that arises when the R-TWT SP duration is longer than the transmission time required by R-TWT member STAs.

A mechanism is described for providing indications that the R-TWT SP has terminated immediately after all the RTA traffic of the R-TWT SP has been transmitted. One of the challenges addressed is how the R-TWT scheduling AP identifies all the RTA frames have been transmitted when the RTA frames could be either UL, DL, and/or P2P.

In this protocol the member STAs can send a signal to the R-TWT scheduling AP during the R-TWT SP to indicate that it does not have any more scheduled UL and P2P to transmit during R-TWT SP.

The R-TWT scheduling AP can transmit a signal to terminate the R-TWT SP when all the scheduled traffic is transmitted during the R-TWT SP.

After completing all the scheduled traffic transmissions during the R-TWT SP, the R-TWT scheduling AP can share the remaining time of the R-TWT SP, such as to perform frame exchanges with STAs that are R-TWT scheduled STAs but not member STAs of that R-TWT.

4. Embodiments of R-TWT Termination

Figure 18:
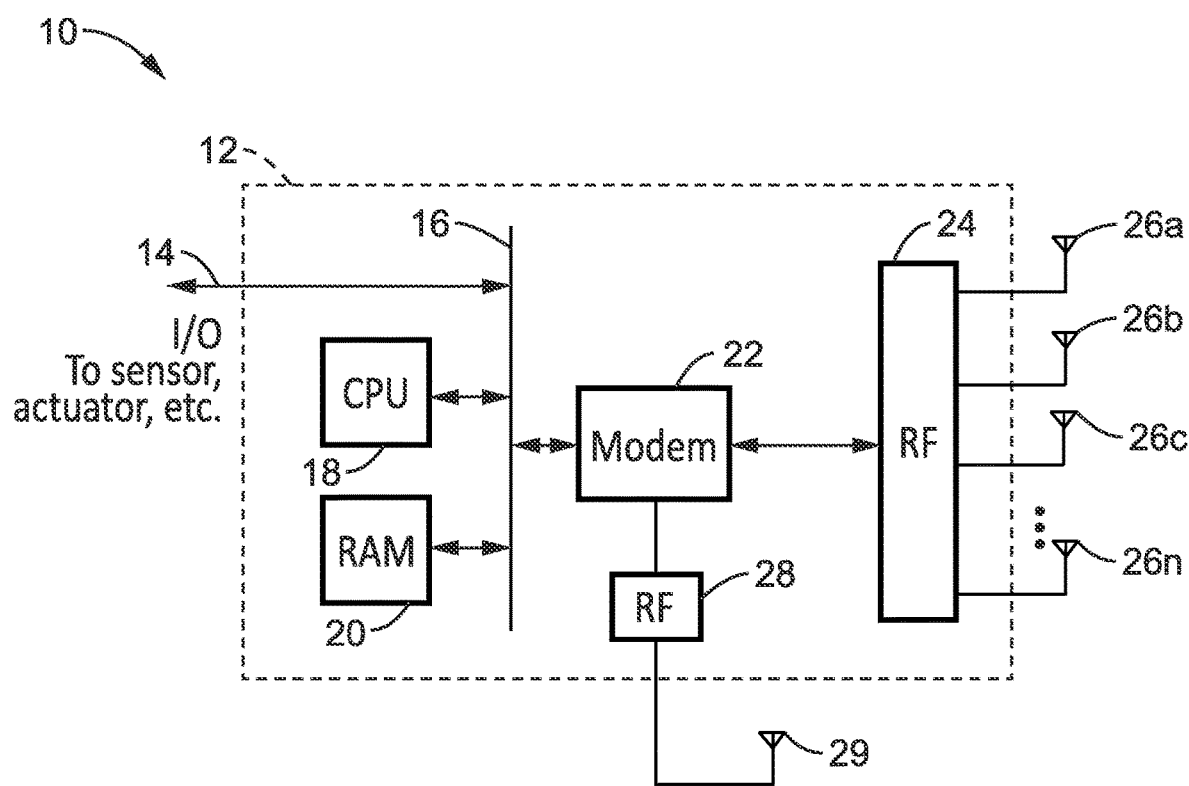
FIG. 18 is a hardware block diagram of station (STA) hardware, according to at least one embodiment of the present disclosure.

4.1. STA and MLD Hardware Configuration,

FIG. 18 illustrates an example embodiment 10 of STA hardware configured for executing the protocol of the present disclosure. An external I/O connection 14 preferably couples to an internal bus 16 of circuitry 12 upon which are connected a CPU 18 and memory (e.g., RAM) 20 for executing a program(s) which implement the communication protocol. The host machine accommodates at least one modem 22 to support communications coupled to at least one RF module 24, 28 each connected to one or multiple antennas 29, 26a, 26b, 26c through 26n. An RF module with multiple antennas (e.g., antenna array) allows for performing beamforming during transmission and reception. In this way, the STA can transmit signals using multiple sets of beam patterns.

Bus 14 allows connecting various devices to the CPU, such as to sensors, actuators and so forth. Instructions from memory 20 are executed on processor 18 to execute a program which implements the communications protocol, which is executed to allow the STA to perform the functions of an access point (AP) station or a regular station (non-AP STA). It should also be appreciated that the programming is configured to operate in different modes (TXOP holder, TXOP share participant, source, intermediate, destination, first AP, other AP, stations associated with the first AP, stations associated with other AP, coordinator, coordinatee, AP in an OBSS, STA in an OBSS, and so forth), depending on what role it is performing in the current communication context.

Thus, the STA HW is shown configured with at least one modem, and associated RF circuitry for providing communication on at least one band.

It should be appreciated that the present disclosure can be configured with multiple modems 22, with each modem coupled to an arbitrary number of RF circuits. In general, using a larger number of RF circuits will result in broader coverage of the antenna beam direction. It should be appreciated that the number of RF circuits and number of antennas being utilized is determined by hardware constraints of a specific device. A portion of the RF circuitry and antennas may be disabled when the STA determines it is unnecessary to communicate with neighboring STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

In addition, it will be noted that multiple instances of the station hardware as shown in the figure, can be combined into a multi-link device (MLD), which typically will have a processor and memory for coordinating the activity, while there is not always a need for a separate CPU and memory for each STA within the MLD.

Figure 19:
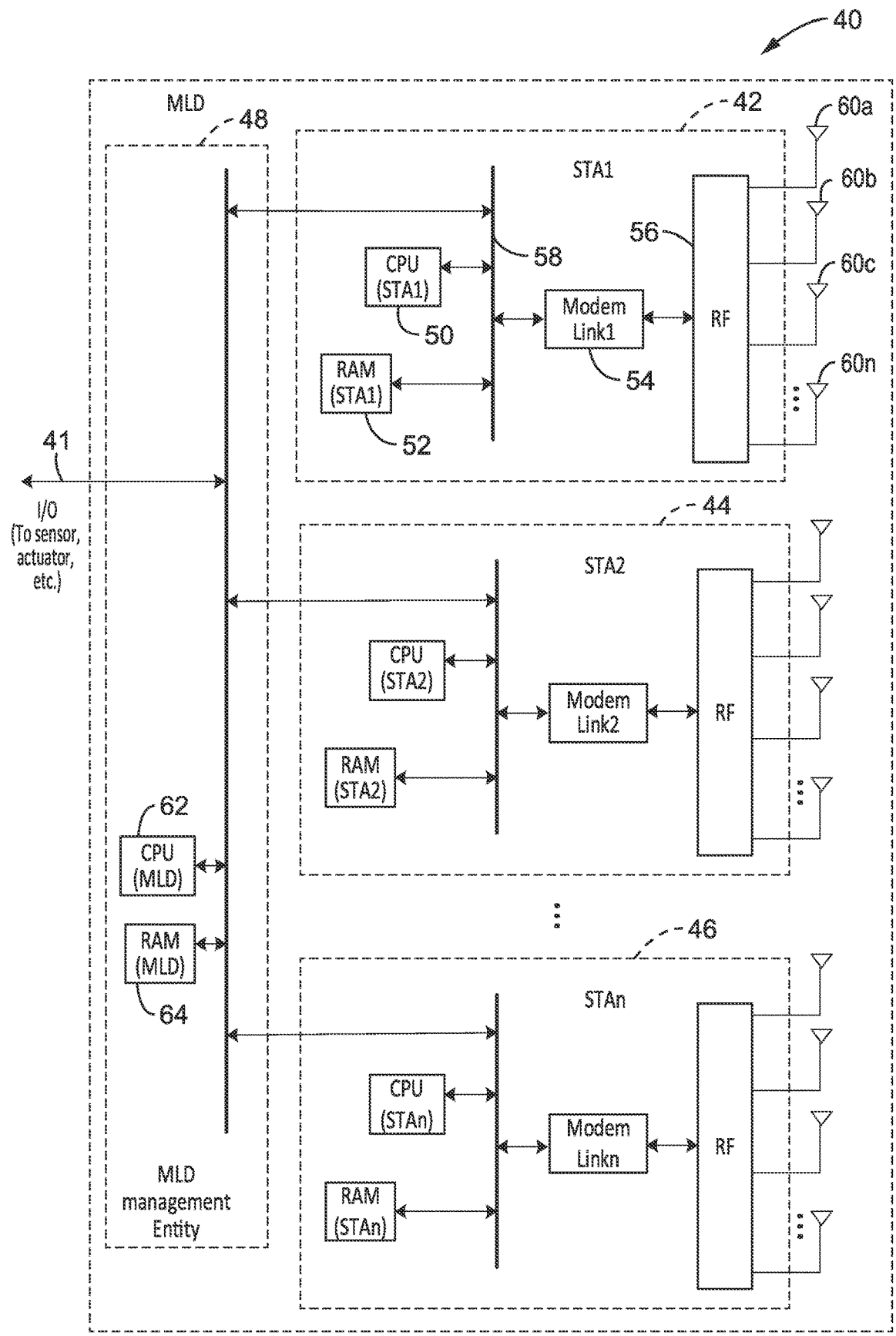
FIG. 19 is a hardware block diagram of a Multi-Link Device (MLD) hardware configuration, according to at least one embodiment of the present disclosure.

FIG. 19 illustrates an example embodiment 40 of a Multi-Link Device (MLD) hardware configuration. Soft AP MLD is a MLD that consists of one or more affiliated STAs, which are operated as APs. Soft AP MLD should support multiple radio operation on 2.4 GHz, 5 GHz and 6 GHz. Among multiple radios, basic link sets are the link pairs that satisfy simultaneous transmission and reception (STR) mode, e.g., basic link set (2.4 GHz and 5 GHz), basic link set (2.4 GHz and 6 GHz).

The conditional link is a link that forms a non-simultaneous transmission and reception (NSTR) link pair with some basic link(s). For example, these link pairs may comprise a 6 GHz link as the conditional link corresponding to 5 GHz link when 5 GHz is a basic link; 5 GHz link is the conditional link corresponding to 6 GHz link when 6 GHz is a basic link. The soft AP is used in different scenarios including Wi-Fi hotspots and tethering.

Multiple STAs are affiliated with an MLD, with each STA operating on a link of a different frequency. The MLD has external I/O access to applications, this access connects to a MLD management entity 48 having a CPU 62 and memory (e.g., RAM) 64 to allow executing a program(s) that implement communication protocols at the MLD level. The MLD can distribute tasks to, and collect information from, each affiliated station to which it is connected, exemplified here as STA 1 42, STA 2 44 through to STA N 46 and the sharing of information between affiliated STAs.

In at least one embodiment, each STA of the MLD has its own CPU 50 and memory (RAM) 52, which are coupled through a bus 58 to at least one modem 54 which is connected to at least one RF circuit 56 which has one or more antennas. In the present example the RF circuit has multiple antennas 60a, 60b, 60c through 60n, such as in an antenna array. The modem in combination with the RF circuit and associated antenna(s) transmits/receives data frames with neighboring STAs. In at least one implementation the RF module includes frequency converter, array antenna controller, and other circuits for interfacing with its antennas.

It should be appreciated that each STA of the MLD does not necessarily require its own processor and memory, as the STAs may share resources with one another and/or with the MLD management entity, depending on the specific MLD implementation. It should be appreciated that the above MLD diagram is given by way of example and not limitation, whereas the present disclosure can operate with a wide range of MLD implementations.

4.2. STA Topology for Example Use

Figure 20:
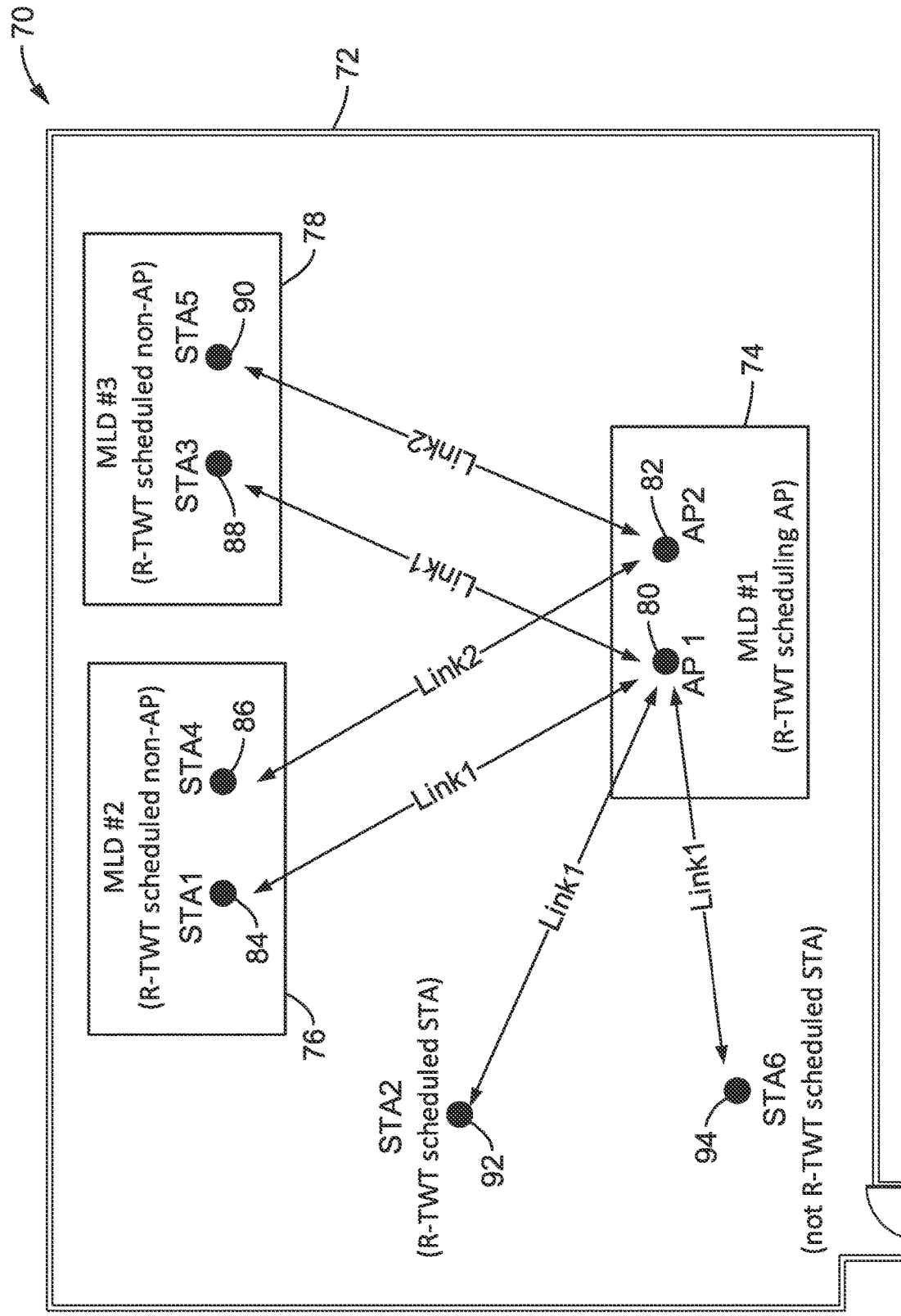
FIG. 20 is a network topology of an example network, according to at least one embodiment of the present disclosure.

FIG. 20 illustrates an example embodiment 70 of a network topology utilized for explaining the goals of the present disclosure. It should be appreciated that this topology (and any topologies exemplified herein) are depicted by way of example, and not by way of limitation, as the apparatus and method of the present disclosure is not limited to any specific network topologies. In addition, the specific MLD, STA and Link references throughout the present disclosure are provided only to simplify the understanding of operations.

An MLD is an AP MLD if AP stations are affiliated with that MLD. An MLD is a non-AP MLD if non-AP STAs are affiliated with that MLD.

As shown in FIG. 20, this scenario depicts 6 STAs consisting of 3 MLDs in a given area, herein exemplified as a room. AP1 and AP2 are affiliated with a multi-link device (MLD) shown as MLD1, while STA1 and STA4 are affiliated with MLD2, and STA3 as well as STA5 are affiliated with MLD3. STA2 and STA6 can be non-AP STAs operating on Link1 or single link MLDs (i.e., a special MLD which only has one STA and operates on one link). STA1, STA2, STA3, STA6 are associated with AP1 over Link1, and STA4 and STA5 are associated with AP2 over Link2. All STAs use EDCA for random channel access (CSMA/CA) on all the links.

A R-TWT scheduling AP is able to schedule and announce R-TWTs. A R-TWT scheduled STA (scheduling enabled STA) is a non-AP STA that is able to receive and recognize R-TWT announcements from the R-TWT scheduling AP and support R-TWT operations. A R-TWT scheduled STA is able to negotiate membership of a R-TWT with the R-TWT scheduling AP. When a R-TWT scheduled STA becomes a member STA of a R-TWT, the traffic (e.g., UL, DL, and/or P2P) of the R-TWT scheduled STA (i.e., the R-TWT member STA) is scheduled and prioritized to transmit during the SPs of that R-TWT.

AP1 and AP2 are the R-TWT scheduling APs, STA1 through STA5 are R-TWT scheduled STAs; while STA6 is not a R-TWT scheduled STA.

4.3. Negotiation of R-TWT Scheduling for SCS Traffic

The scheduling of a R-TWT, denoted by R-TWTx, is announced by a R-TWT scheduling AP. The R-TWT scheduled STAs can request memberships of R-TWTx. Moreover, during a R-TWTx SP, the R-TWT scheduling AP can determine/recognize which traffic streams will be expected to transmit with higher priority. This section explains the manner in which a R-TWT scheduled STA negotiates with the R-TWT scheduling AP about which traffic streams should be transmitted with higher priority during the R-TWTx SPs when it sets up the membership of R-TWTx. After the R-TWT scheduled STA becomes a member STA of R-TWTx, those traffic streams in the R-TWTx membership agreement will be transmitted with higher priority during the R-TWTx SPs and are denoted as the scheduled traffic streams of R-TWTx. In at least one embodiment/mode/case only the frames of the scheduled traffic streams of R-TWTx are allowed to transmit during the R-TWTx SPs. For example, the frames that do not belong to the scheduled traffic streams of R-TWTx are either not allowed to transmit, or are only allowed to transmit with lower priority, during the R-TWTx SPs. It should be noted that traffic with higher priority represents traffic with a higher probability to be transmitted earlier than traffic with lower priority. Furthermore, in at least one embodiment/mode/case the traffic with higher priority is required to be transmitted earlier than the traffic with lower priority.

However, there can arise an exception if there are frames that have the same TID as a scheduled traffic stream of R-TWTx and that need to be retransmitted; but since they do not belong to any scheduled traffic stream of R-TWTx, then those frames can be transmitted during R-TWTx SP. Those frames should be transmitted before transmitting the frames of the scheduled traffic streams of R-TWTx with the same TID by a STA during the R-TWTx SP when that STA uses block acknowledgement for that TID. This exception arises because the sequence numbers of those frames have been assigned, and the frames are smaller than the frames of the scheduled traffic stream of R-TWTx.

Figure 21:
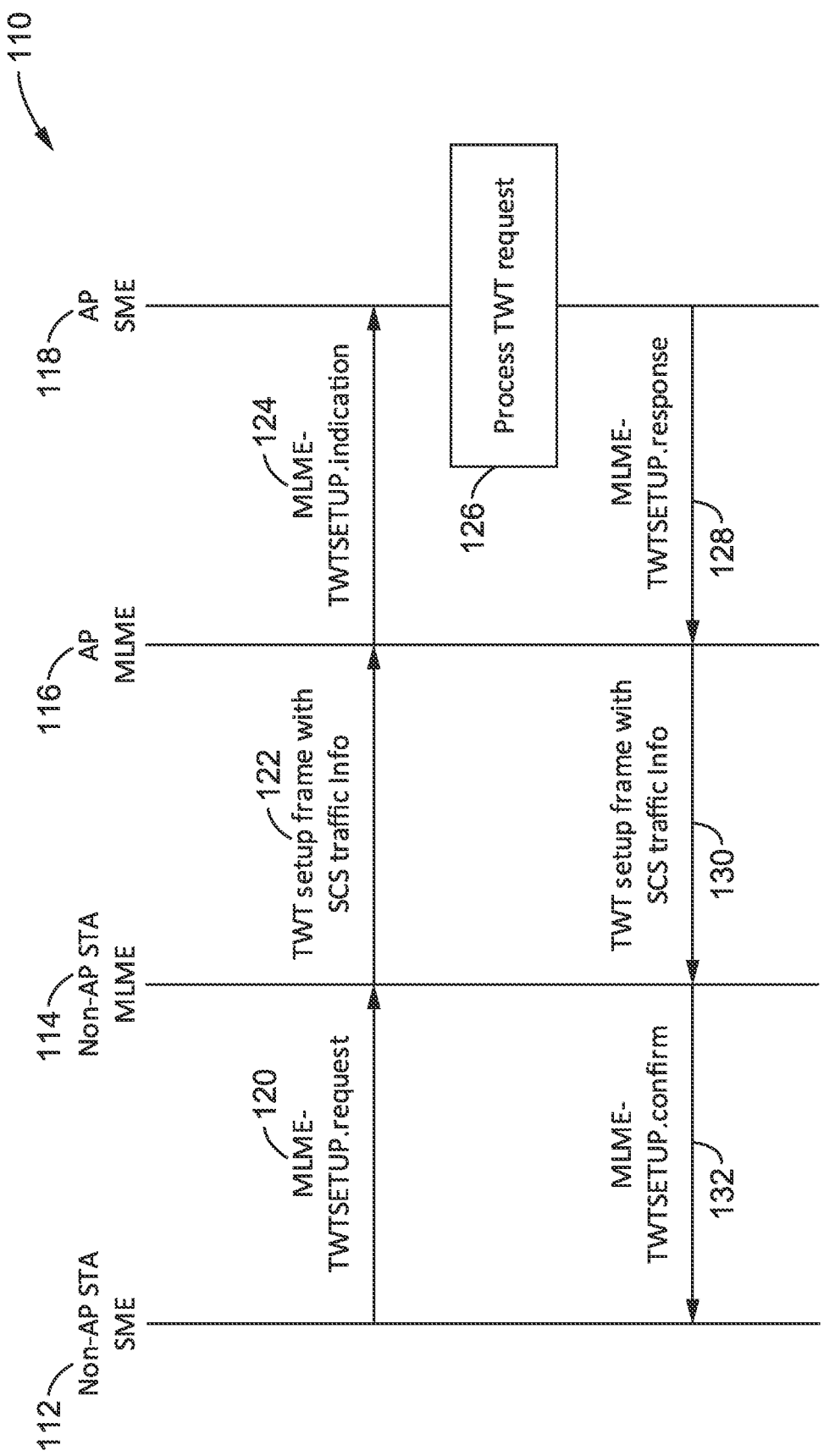
FIG. 21 is a communication diagram of an R-TWT membership setup, according to at least one embodiment of the present disclosure.
Figure 22:
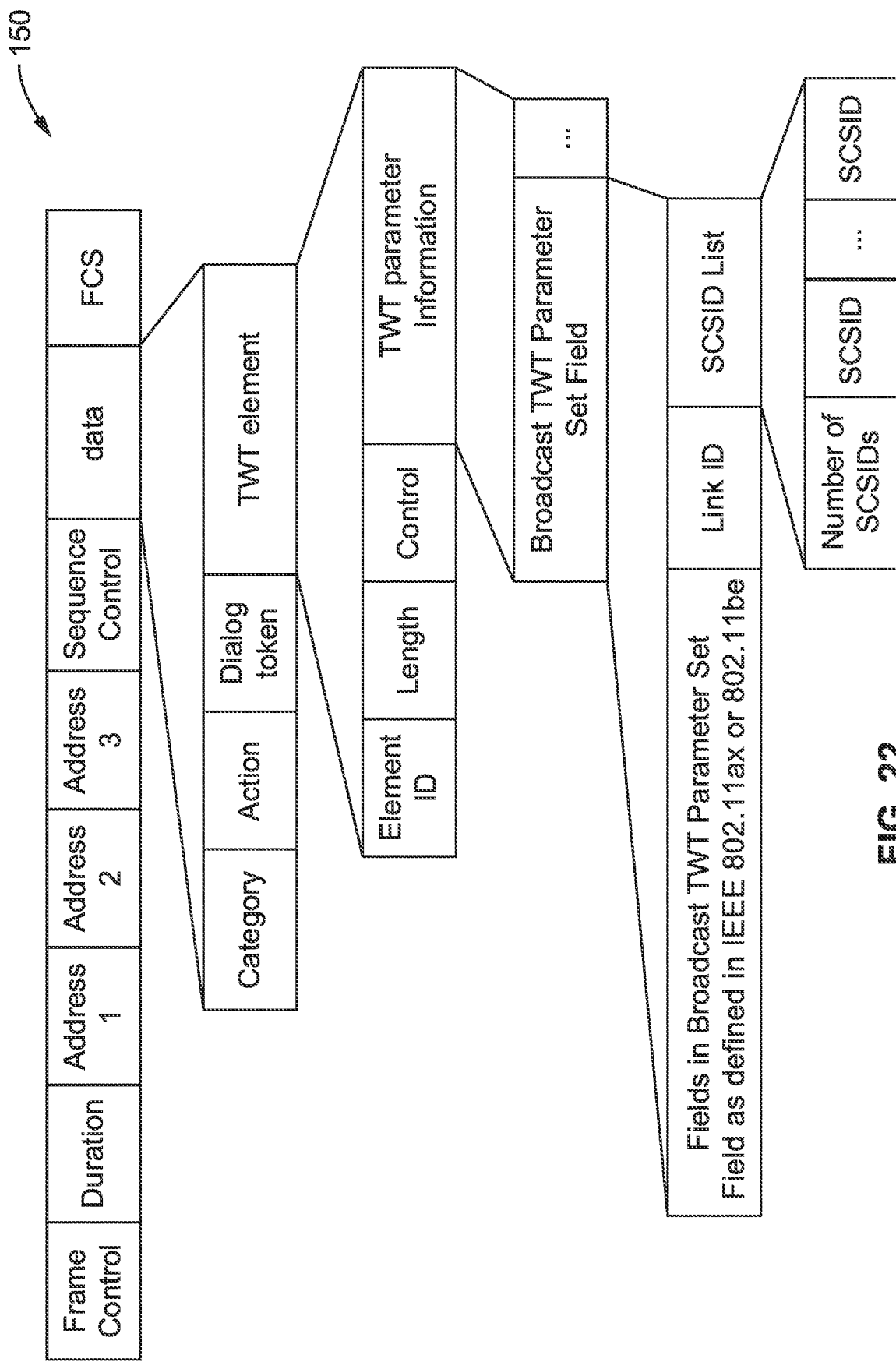
FIG. 22 is a data field diagram of a TWT setup frame with SCS traffic information, according to at least one embodiment of the present disclosure.

FIG. 21 and FIG. 22 illustrates an example embodiment of R-TWT membership setup 110 and TWT setup frame 150.

In FIG. 21 is shown signaling of a membership setup (negotiation) of R-TWTx with SCS traffic stream information between the R-TWT scheduled STA and the R-TWT scheduling AP. Similar to FIG. 15, the non-AP STA (the R-TWT scheduled STA) sends a TWT setup frame (i.e., R-TWT membership request frame) which requests membership of R-TWTx from the AP (the R-TWT scheduling AP). Then, the AP sends a TWT setup frame (i.e., R-TWT membership response frame) back to indicate the result of the R-TWTx membership status of the non-AP STA.

Compared with FIG. 15, the difference here is that the TWT setup frame can carry the information of SCS traffic streams during the R-TWT membership setup procedure. The format of the TWT setup frame with SCS traffic stream information is shown in FIG. 22.

To perform a R-TWT setup, non-AP STA SME 112 sends MLME-TWTSETUP. request 120 to non-AP STA MLME 114, which transmits a TWT setup frame with SCS traffic information 122 over to the AP MLME 116. The AP sends this to its SME 118 as a MLME-TWTSETUP.indication 124, and the SME processes 126 this request and outputs a MLML-TWTSETUP.response 128 to its MLME 116, which transmits a TWT setup frame with SCS traffic information 130 over to the non-AP STA MLME 114, which sends a MLME-TWTSETUP.confirm 132 to its SME 112.

For example, if a Broadcast TWT parameter set field in the TWT setup frame is for R-TWTx, then the SCSID List in that Broadcast TWT parameter set field carries the information of the SCS traffic streams. The non-AP STA embeds the information of the SCS traffic streams in a TWT setup frame as a part of the R-TWTx membership negotiation, which aims to request that the AP schedule the transmission of those SCS traffic streams during the R-TWTx SPs. When the AP accepts the R-TWTx membership request from the non-AP STA, it can embed the information of the SCS traffic streams in the corresponding R-TWT setup frame to indicate that those SCS traffic streams are the scheduled traffic streams of R-TWTx. It should be noted that the AP determines whether to accept the membership request of R-TWTx based on the information of the SCS traffic streams for R-TWTx. If the AP is able to satisfy the QoS requirement of the SCS traffic streams during the R-TWTx SPs, it can accept the R-TWTx membership request from the non-AP STA. The AP then can set the SCSID list field in the corresponding broadcast TWT parameter set field in the R-TWT setup frame to indicate that the AP is able to transmit the SCS traffic streams indicated in the SCSID list field during the R-TWTx SPs. Otherwise, the AP may reject the R-TWT membership request.

In at least one embodiment/mode/case the SCSID list field in the corresponding broadcast TWT parameter set field in the R-TWT membership response frame is duplicated from that in the corresponding R-TWT membership request when the R-TWT membership request is accepted.

It at least one embodiment/mode/case the AP does not embed SCS traffic stream information in its response to the R-TWTx membership request if it accepts the R-TWTx membership request. Then, the SCS traffic streams indicated in the corresponding R-TWT membership request are the scheduled traffic streams of R-TWTx.

The SCSID list field consists of a Number which identifies the number of SCSID fields, which is followed by that number of SCSID fields. Each SCSID represents an existing SCS that is established between the non-AP and the AP. It should be noted that the SCS setup procedure was already explained in FIG. 10.

In at least one embodiment a reserved bit in the Broadcast TWT Parameter Set Field is utilized to indicate the presence of the SCSID List field. For example, in one embodiment, when this bit is set to a first state (e.g., "1"), it indicates that the SCSID List field is present in the Broadcast TWT Parameter Set Field. When this bit is set to a second state (e.g., "0"), it indicates that the SCSID List field is not present in the Broadcast TWT Parameter Set Field.

When the R-TWT scheduled STA becomes a member STA of R-TWTx with scheduled traffic streams of R-TWTx, it has those scheduled traffic streams of R-TWTx to transmit or receive during the R-TWTx SPs. The member STA of R-TWTx and the R-TWT scheduling AP will expect a range which describes the amount of each of its scheduled traffic streams of R-TWTx to be exchanged during a R-TWTx SP. The following types of ranges are described by way of example and not limitation.

(a) A scheduled DL (or UL and/or P2P) SCS traffic stream of R-TWTx has a minimum data rate field in its TSPEC element set to $R_{min}$ (bits per second). Let us denote t (seconds) as the time between the end times of two consecutive R-TWTx SPs. Then, the minimum amount of scheduled DL (or UL and/or P2P, respectively) traffic streams that are expected to arrive at the R-TWT scheduling AP (or R-TWTx member STA which has this scheduled traffic stream, respectively) is $R_{min}*t$ (bits) during the time t. Before the end of the second R-TWTx SP, the R-TWT scheduling AP (or R-TWTx member STA which has this scheduled traffic stream, respectively) can expect to be transmitting at least $R_{min}*t$ (bits) of traffic.

(b) A scheduled DL (or UL and/or P2P) SCS traffic stream of R-TWTx has a mean data rate field in its TSPEC element set to $R_{mean}$ (bits per second). Let us denote t (seconds) as the time between the end times of two consecutive R-TWTx SPs. Then, the average amount of scheduled DL (or UL and P2P, respectively) traffic streams that are expected to arrive at the R-TWT scheduling AP (or R-TWTx member STA which has this scheduled traffic stream, respectively) is $R_{mean}*t$ (bits) during the time t. Before the end of the second R-TWTx SP, the R-TWT scheduling AP (or R-TWTx member STA which has this scheduled traffic stream, respectively) can thus expect to be transmitting $R_{mean}*t$ (bits) of traffic on average.

(c) A scheduled DL (or UL and/or P2P) SCS traffic stream of R-TWTx has a peak data rate field in its TSPEC element set to $R_{max}$ (bits per second). Let us denote t (seconds) is the time between the end times of two consecutive R-TWTx SPs. Then, the average amount of the scheduled DL (or UL and/or P2P, respectively) traffic stream that is expected to arrive at the R-TWT scheduling AP (or R-TWTx member STA which has this scheduled traffic stream, respectively) is $R_{max}*t$ (bits) during the time t. Before the end of the second R-TWTx SP, the R-TWT scheduling AP (or R-TWTx member STA which has this scheduled traffic stream, respectively) can expect to transmit no more than $R_{max}*t$ (bits) traffic.

In the broadcast TWT parameter set field of a R-TWT, besides those fields that are defined in IEEE 802.11ax (as shown in FIG. 7), a Link ID field is added in at least one embodiment/mode/case to indicate the link on which the SPs of that R-TWT are scheduled. In at least one embodiment/mode/case a reserved bit in the Broadcast TWT Parameter Set Field is utilized to indicate the presence of this Link ID field. When this bit is set to a first state (e.g., "1"), it indicates the Link ID field is present in the Broadcast TWT Parameter Set Field. When this bit is set to a second state (e.g., "0"), this indicates that the Link ID field is not present in the Broadcast TWT Parameter Set Field and the SPs of the R-TWT are scheduled on the link where this Broadcast TWT Parameter Set Field is transmitted.

One TWT element can have multiple broadcast TWT parameter set fields with the same or different R-TWT ID (i.e., the value set in the broadcast TWT ID field as shown in FIG. 9). Multiple broadcast TWT parameter set fields with the same R-TWT ID, and different Link IDs can be incorporated into one TWT element to indicate a R-TWT whose SPs are scheduled on multiple links. For example, one broadcast TWT parameter set field with R-TWT ID equal to "4" and a linkID equal to "1" and one broadcast TWT parameter set field with R-TWT ID equal to "4" and a linkID equal to "2" in one TWT element represents a R-TWT with its TWT ID is "4" and its SPs are scheduled on Link1 and Link2.

4.4. Rewarding R-TWT Scheduled STAs that are not R-TWT Members

During a SP of a R-TWT, if a STA is a R-TWT scheduled STA, but not a member STA of that R-TWT, then that STA may sacrifice its opportunities of obtaining a transmit opportunity (TXOP), or accessing the channel, due to the existence of the SP. For example, the STA ends its TXOP before the start time of the SP, or stops (discontinues) contending for the channel during the SP. Therefore, in at least one embodiment/mode/case a reward mechanism is provided in the present disclosure for encouraging such STAs, especially for those which are not members of any R-TWTs scheduled by the R-TWT scheduling AP; toward encouraging their support of the R-TWT operation. It should be noted that during a SP of a R-TWT, those R-TWT scheduled STAs which are not member STAs of that R-TWT should be awake, since they are not configured to fall asleep.

In IEEE 802.11be, a R-TWT scheduled STA is a non-AP Extremely High Throughput (EHT) STA that supports restricted TWT operation and sets the Restricted TWT Support subfield in the transmitted EHT Capabilities elements to a first state (e.g., "1"). If a non-AP EHT STA does not support restricted TWT operation, it is not a R-TWT scheduled STA and sets the Restricted TWT Support subfield in transmitted EHT Capabilities elements to a second state (e.g., "0"). It should be noted that a non-AP EHT STA transmits the EHT Capabilities element to its associated AP to indicate the EHT capabilities of the non-AP EHT STA. Therefore, a R-TWT scheduling AP can identify whether its associated EHT STA is a restricted TWT (R-TWT) scheduled STA or not, according to the Restricted TWT Support subfield in the transmitted EHT Capabilities element received from that EHT STA.

Let us denote a R-TWT (scheduling) as R-TWTx which is scheduled by the R-TWT scheduling AP. Then, a non-AP STA can be one of the following three types during a SP of R-TWTx.

(a) A STA that is a R-TWT scheduled STA, but which is not a member STA of R-TWTx. This STA ends its TXOP before the start time of R-TWTx SP. It may enter quiet mode during the quiet interval overlapped with the SP of R-TWTx. In some instances, it may contend for channel access during the SP of R-TWTx. It should be noted that the R-TWT scheduling AP may not know whether this STA will enter quiet mode during the quiet interval overlapped with the SP of R-TWTx, or whether or not it will stop contending for the channel during the SP of R-TWTx, unless the STA sends this information to the R-TWT scheduling AP. For example, this STA can add a R-TWT quiet Support subfield and a R-TWT channel contention subfield in the transmitted EHT Capabilities element (or another element) to send this information to the R-TWT scheduling AP.

(a)(i) A R-TWT quiet Support subfield is set to indicate whether the transmitter of this field will enter quiet mode during the quiet interval overlapped with a R-TWT SP. If this field is set to a first state (e.g., "1"), then the transmitter of this field will enter quiet mode during the quiet interval overlapped with a R-TWT SP. Otherwise, this field is set to a second state (e.g., "0") and the transmitter of this field will not enter quiet mode during the quiet interval overlapped with a R-TWT SP. The R-TWT scheduling AP which receives this field can determine the expected behavior of the transmitter STA during the quiet interval that overlaps a R-TWT SP. It should be noted that the quiet interval is announced by the quiet element from the R-TWT scheduling AP.

(a)(ii) A R-TWT channel contention subfield is set to indicate whether the transmitter of this field will contend for the channel during a R-TWT SP if it is not a member of that R-TWT SP (i.e., it is not a member of the R-TWT which schedules this SP). If this field is set to a first state (e.g., "1"), then the transmitter of this field will contend for the channel during a R-TWT SP if it is not a member of that R-TWT SP. Otherwise, this field is set to a second state (e.g., "0") and the transmitter of this field will not contend for the channel during a R-TWT SP if it is not a member STA of the R-TWT SP. Such a STA can pause its backoff counter during the R-TWT SP of which it is not a member. The R-TWT scheduling AP which receives this field can determine expected channel contention behavior of the transmitter STA during the R-TWT SP, especially in the case when it is not a member STA of that R-TWT SP. In at least one embodiment/mode/case it is mandatory that a R-TWT scheduled STA that is a member of a R-TWT scheduled by the R-TWT scheduling AP has to stop (discontinue) contending for the channel during all the R-TWT SPs of which the STA is not a member STA.

(b) A STA that is a member STA of R-TWTx. A member STA of R-TWTx can negotiate the scheduled traffic streams of R-TWTx, such as SCS traffic streams or R-TWT TIDs as defined in IEEE 802.11be, during the R-TWTx membership negotiation as shown in Section 4.3.

(c) A STA that is not a R-TWT scheduled STA. Such a STA won't end its TXOP before the start time of R-TWTx SP, nor will it stop contending for the channel during the SP of R-TWTx.

(c)(i) In some instances such a STA may remain quiet during the quiet interval announced by a quiet element. If such a STA enters quiet mode during the quiet interval, it can report this to the R-TWT scheduling AP by setting the R-TWT quiet Support subfield a first state (e.g., "1").

During a R-TWTx SP, the R-TWT scheduling AP prioritizes, and/or only allows the transmission (i.e., frame exchange) of the scheduled traffic streams of R-TWTx. If the R-TWT scheduling AP finishes transmitting all the scheduled traffic streams of the R-TWTx with all the R-TWTx member STAs before the scheduled end time of the R-TWTx SP, it can use the remaining SP time to exchange frames with those STAs that are R-TWT scheduled STAs, but are not member STAs of R-TWTx as well as those STAs that are not R-TWT scheduled STAs, yet have set their R-TWT quiet Support subfield to a first state (e.g., "1").

The R-TWT scheduling AP can send: (a) a trigger frame to trigger TB PPDUs from those STAs; (b) DL PPDUs to those STAs; and/or (c) a trigger frame, such as MU-RTS TXS frame as defined in IEEE 802.11be, to launch a triggered TXOP sharing time that those STAs can use to transmit.

The R-TWT scheduling AP can send a frame to those STAs only to indicate the end of the R-TWTx SP; and thus, release them to contend for the channel immediately.

During a R-TWTx SP, when the R-TWT scheduling AP transmits the scheduled traffic streams of R-TWTx in a MU PPDU, it can allocate Resource Units (RUs) to transmit the frames with those STAs that are R-TWT scheduled STAs, but that are not member STAs of R-TWTx; if those frames do not increase the transmission time of the MU PPDU required by the scheduled traffic streams.

During a R-TWTx SP, when the R-TWT scheduling AP transmits a trigger frame to trigger the scheduled UL traffic streams of R-TWTx, it can allocate RUs to trigger the frames from those STAs that are R-TWT scheduled STAs, but are not member STAs of R-TWTx; if those frames do not increase the transmission time of the TB PPDU required by the scheduled UL traffic streams.

During a R-TWTx SP, if there is no buffer of the scheduled traffic streams of R-TWTx, the scheduling AP can also exchange frames with those STAs that are R-TWT scheduled STAs but are not member STAs of R-TWTx.

When the R-TWT scheduling AP can send a trigger frame to trigger TB PPDUs from those STAs that are R-TWT scheduled STAs, but are not member STAs of R-TWTx; then those STAs may not use MU-EDCA or reset their backoff counter to contend for the channel after sending TB PPDUs. The trigger frame can have RA-RUs Uplink OFDMA random access (UORA) for a certain group of STAs to send TB PPDUs through those RA-RUs.

The AID of the user info field for RA-RU can be in a select value range, for example between "2047" and "4094", which are reserved in the current IEEE 802.11ax, to represent the group of STAs. A STA can access the RA-RUs when it receives the AID that is set to a group of STAs it belongs to.

There can be multiple groups of STAs, and each group uses a distinct AID. A STA can belong to multiple groups of STAs (e.g., subgroup1 through subgroup6).

The trigger frame can allocate RUs to one or more individual STAs. It is possible that the individual STA can only be a STA of some of the subgroups as described below. For example, the individual STAs may only be the STAs of Subgroup1.

A group of STAs can consist of one or more following subgroups.

(1) In Subgroup1 all the R-TWT scheduled STAs that are not member STAs of any R-TWTs of the R-TWT scheduling AP and that have set their R-TWT channel contention subfield equal to a first state (e.g., "1").

(2) In Subgroup2 all the R-TWT scheduled STAs that are not member STAs of any R-TWTs of the R-TWT scheduling AP and that have set their R-TWT channel contention subfield to a second state (e.g., "0"), and their R-TWT quiet Support subfield to a first state (e.g., "1").

(3) In Subgroup3 all the R-TWT scheduled STAs that are not member STAs of any R-TWTs of the R-TWT scheduling AP and have set their R-TWT channel contention subfield to a second state (e.g., "0"), and their R-TWT quiet Support subfield to a second state (e.g., "0".

(4) In Subgroup4 all STAs that are not R-TWT scheduled STAs and have set their R-TWT quiet Support subfield to a first state (e.g., "1").

(5) In Subgroup5 all the R-TWT scheduled STAs that are not member STAs of R-TWTx, but are member STAs of other R-TWTs of the R-TWT scheduling AP, and have set their R-TWT channel contention subfield to a first state (e.g., "1).

(6) In Subgroup6 all the R-TWT scheduled STAs that are not member STAs of R-TWTx, but are members of other R-TWTs of the R-TWT scheduling AP, and have set their R-TWT channel contention subfield to a second state (e.g., "0").

In at least one embodiment/mode/case the priority of using the R-TWTx SP time can be set in between those subgroups. Generally, the STAs of a subgroup supporting more than one R-TWT operation will have higher priority of using the R-TWTx SP time. The priority of a STA using the remaining R-TWTx SP time can be set in a desired priority order, for example in subgroup number order, or any other desired pattern.

4.5. Termination of R-TWT SP

Section 4.3 explained the manner in which a R-TWT scheduled STA negotiates its membership and the scheduled traffic streams, such as SCS traffic streams, for that R-TWT. It should be noted that a member STA of a R-TWT can have multiple scheduled traffic streams of that R-TWT. A R-TWT can have multiple R-TWT member STAs. A R-TWT scheduling AP can announce multiple R-TWTs, such as R-TWTx, R-TWTy, R-TWTz, and so on.

This section explains how to terminate a R-TWT SP. The present disclosure allows letting the member STAs of a R-TWT send signals to the R-TWT scheduling AP to indicate that they do not have any more frames of the scheduled traffic streams to transmit during the SP of that R-TWT. When the R-TWT scheduling AP recognizes that all the scheduled traffic has been transmitted, it sends a signal to indicate the termination of the SP of that R-TWT.

Figure 27:
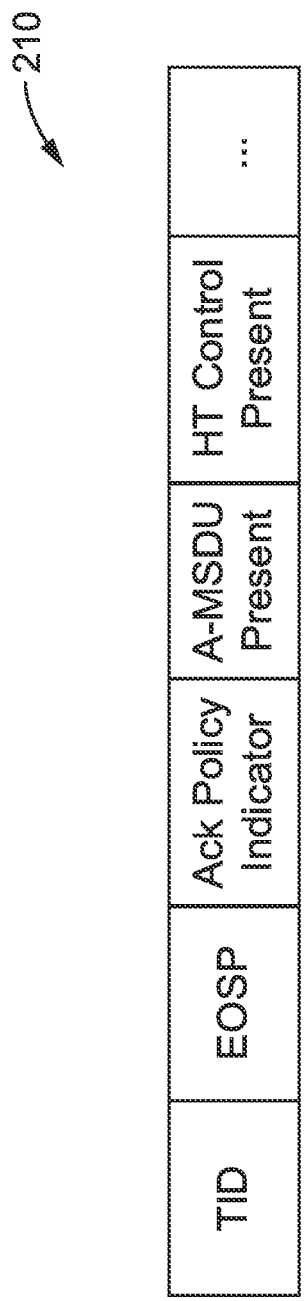
FIG. 27 is a data field diagram of a QoS control field in QoS data and QoS null frame for R-TWT, according to at least one embodiment of the present disclosure.

The R-TWT scheduling AP and R-TWT scheduled STA can embed the QoS control field as shown in FIG. 27 in the QoS data or QoS Null frame.

Figure 23:
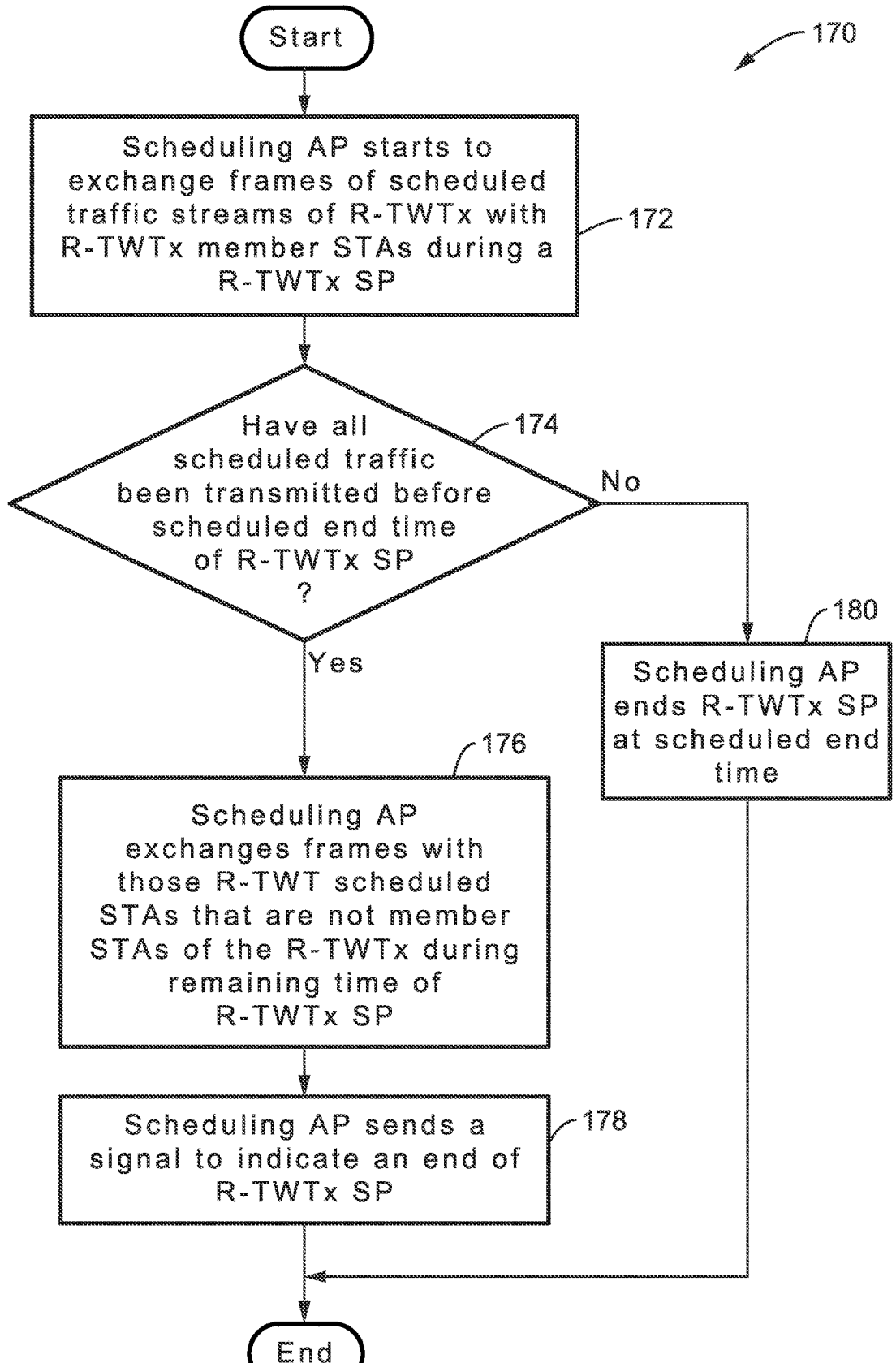
FIG. 23 is a flow diagram of terminating a R-TWTx SP by the R-TWT scheduling AP, according to at least one embodiment of the present disclosure.

FIG. 23 illustrates an example embodiment 170 of terminating a R-TWTx SP (i.e., a SP of R-TWTx) by the R-TWT scheduling AP. In order to simplify the explanation, the R-TWT is denoted as R-TWTx, which is scheduled by the R-TWT scheduling AP. The R-TWT scheduling AP starts to exchange frames 172 of the scheduled traffic streams of R-TWTx with the R-TWTx member STAs during a R-TWTx SP. It should be noted that the R-TWTx member STAs can negotiate the scheduled traffic streams of R-TWTx as explained in Section 4.3.

First a brief overview is provided of the flowchart of FIG. 23. In block 172 the scheduling AP starts to exchange frames of scheduled traffic streams of R-TWTx with R-TWTx member STAs during a R-TWTx SP.

A check 174 determines if all scheduled traffic has been transmitted before the scheduled end time of the R-TWTx SP. If all traffic has not been transmitted, then at block 180 the scheduling AP can end the R-TWTx SP at the scheduled end time, and the process ends.

Otherwise, if the condition is met with all scheduled traffic having been transmitted, then at block 176 the scheduling AP exchanges frames with those R-TWT scheduled STAs that are not member STAs of the R-TWTx during the remaining time of the R-TWTx SP. After this the scheduling AP sends 178 a signal to indicate the end of the R-TWTx SP to end the process.

The following section provides additional details on the exchanges shown in FIG. 23 in a hierarchical form.

(a) In some cases, before the R-TWT scheduling AP and the R-TWTx member STAs start to exchange frames of the scheduled traffic streams of R-TWTx, either the R-TWT scheduling AP or the R-TWT member STAs will need to contend for the channel to obtain a TXOP for the frame exchange. In at least one embodiment or mode, the R-TWT scheduling AP or a R-TWTx member STA is only allowed to contend for the channel when there are frames of the scheduled traffic streams of R-TWTx in its buffer. In certain cases, the R-TWT scheduling AP can contend for the channel although it has no buffer of scheduled traffic streams of R-TWTx during a R-TWTx SP.

(b) When the R-TWT scheduling AP, or a R-TWTx member STA, gains channel access, an exchange of RTS/MU-RTS and CTS can be used to reserve the TXOP. In at least one embodiment/mode/case the TXOP duration is required to be less-than-or-equal-to the scheduled R-TWTx SP time (scheduled end time of the R-TWTx SP-R-TWT scheduled start time of the R-TWTx SP). In at least one embodiment/mode/case the TXOP is not allowed to be reserved beyond the scheduled end time of the R-TWTx SP. During the TXOP, all the scheduled traffic streams of R-TWTx can be transmitted as the traffic from the primary AC of the TXOP.

(c) In at least one embodiment/mode/case if a R-TWT scheduled STA is to obtain a TXOP that overlaps the R-TWTx SP, it is forced to use (MU)RTS/CTS exchange to obtain that TXOP. The R-TWT scheduling AP may not respond to a CTS when it receives such RTS from a R-TWT scheduled STA which does not allow that R-TWT scheduled STA to obtain the TXOP. In at least one embodiment/mode/case the R-TWT scheduling AP sets an arbitrary NAV in the CTS frame in response to such an RTS from the R-TWT scheduled STA. The R-TWT scheduled STA then only obtains the TXOP that equals the NAV in the CTS frame.

(d) In at least one embodiment/mode/case the R-TWT scheduling AP sends a trigger frame for the scheduled UL traffic streams of R-TWTx from the R-TWTx member STAs during the R-TWTx SP. The trigger frame can include RA-RU (UORA) which any STAs (or one or more subgroups as explained in Section 4.4) can use for their UL transmission. The priority of allocating RA-RU to the STAs can follow the priority of the subgroups as explained in Section 4.4. In at least one embodiment/mode/case the RA-RU in the trigger frame is allowed only if it does not increase the transmission time of the solicited TB PPDUs that are required by the scheduled UL traffic streams of R-TWTx.

(e) In at least one embodiment/mode/case the R-TWT scheduling AP and the R-TWTx member STAs use EDCA to obtain the TXOP for the transmission of the scheduled traffic streams of R-TWTx during R-TWTx SP. When an EDCA TXOP is obtained, then in at least one embodiment/mode/case all frames of the scheduled traffic streams of R-TWTx, including those from the primary AC and non-primary AC, can be transmitted during that EDCA TXOP. It should be noted that the primary AC represents the AC of which the EDCAF obtains the TXOP. In at least one embodiment/mode/case only the EDCAFs of the ACs which have the frames of the scheduled traffic streams of R-TWTx in their buffer are allowed to contend for the channel.

(f) In at least one embodiment/mode/case when the trigger field in Request type field in Broadcast TWT parameter Information field of R-TWTx is set to a first state (e.g., "1") by the R-TWT scheduling AP, that only the R-TWT scheduling AP is allowed to contend for the channel during the R-TWTx SPs. If this field is set to a second state (e.g., "0"), then the R-TWTx member STAs can also contend for the channel during the R-TWTx SPs.

(g) In at least one embodiment/mode/case if there are frames that have the same TID as a scheduled traffic stream of R-TWTx, and those frames need to be retransmitted but do not belong to any scheduled traffic stream of R-TWTx, then the R-TWT scheduling AP transmits those frames during the R-TWTx SP. In at least one embodiment/mode/case the R-TWT scheduling AP transmits those frames earlier than the frames of the scheduled traffic streams of R-TWTx with the same TID during the R-TWTx SP when block acknowledgement is used for that TID. This is beneficial because the sequence numbers of those frames have been assigned and those frames are smaller than the frames of the scheduled traffic stream of R-TWTx.

The R-TWT scheduling AP and R-TWTx member STAs continue frame exchange of the scheduled traffic streams of R-TWTx. The scheduled traffic streams can be uplink (UL), downlink (DL), and/or peer-to-peer (P2P) streams. The R-TWT scheduling AP needs to know (determine/recognize) whether all the frames of the scheduled traffic streams of a R-TWTx member STA are transmitted during the R-TWTx SP. It should be noted that the empty buffer status of a scheduled traffic stream of R-TWTx at a R-TWTx member STA may not be a valid indicator that all the frames of the scheduled traffic stream have been transmitted during the R-TWTx SP. The frames of the scheduled traffic stream may arrive at the R-TWTx member STA later, e.g., in the middle of a R-TWTx SP. Therefore, the present disclosure utilizes a signal to explicitly indicate that all the frames of the scheduled traffic streams of a R-TWTx member STA have been transmitted during the R-TWTx SP, while not relying on using an empty buffer status report. The explicit signal may take the following forms.

Figure 24:
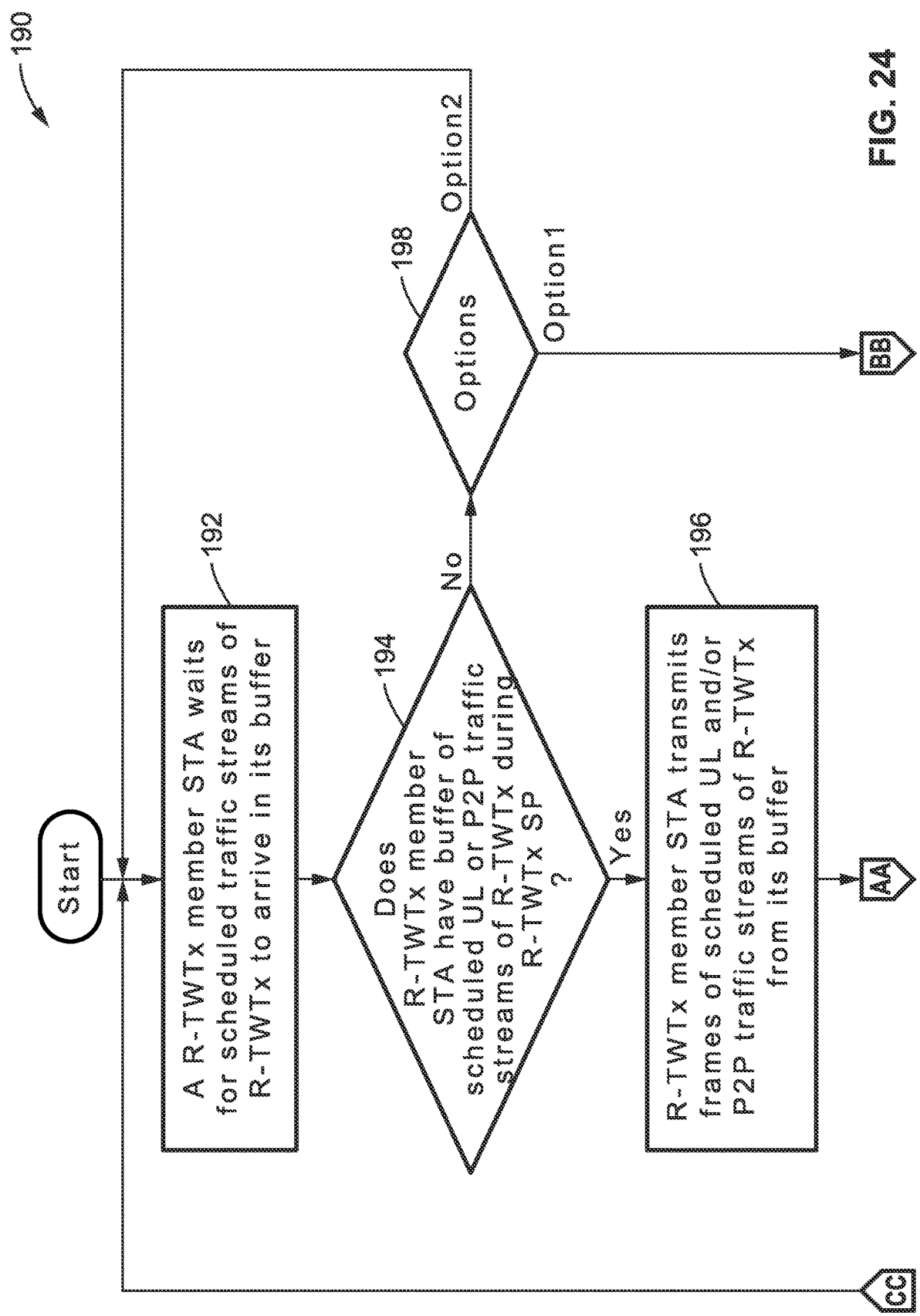
FIG. 24 through FIG. 26 is a flow diagram of a R-TWTx member STA sending a signal to indicate that all the frames of its scheduled UL and P2P traffic streams of R-TWTx have been transmitted during the R-TWTx SP, according to at least one embodiment of the present disclosure.
Figure 25:
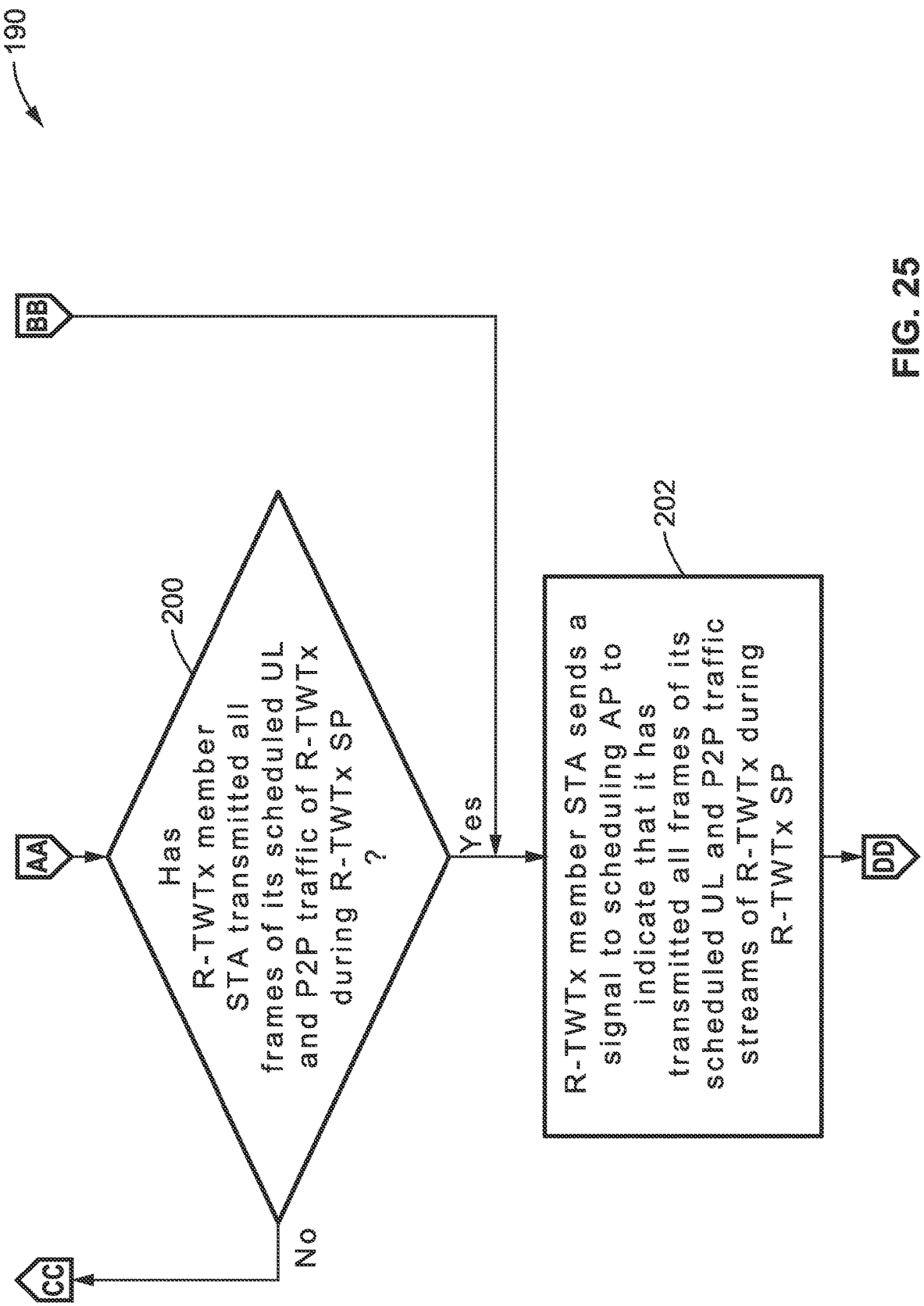
Figure 26:
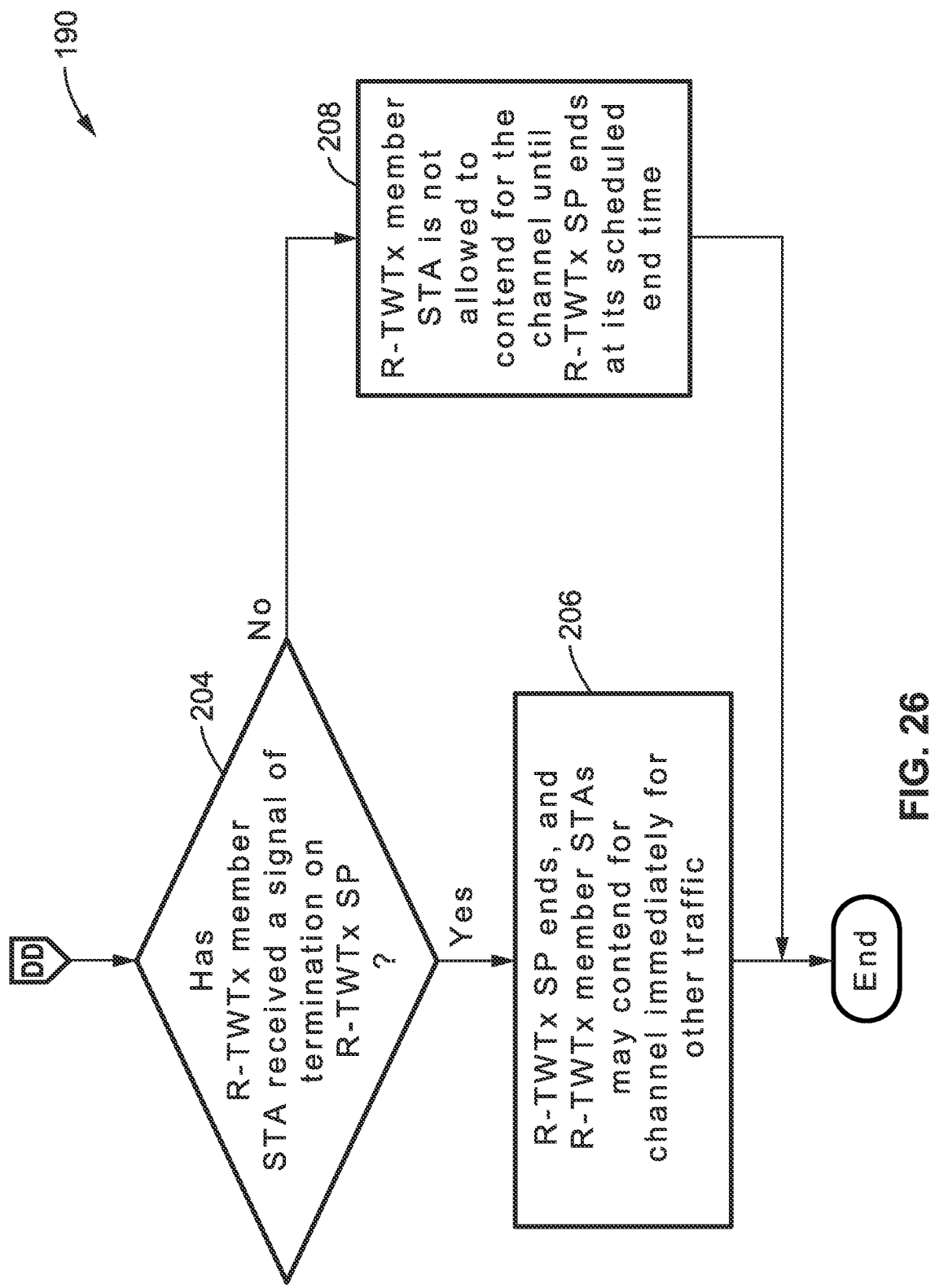

(a) If there are scheduled UL or P2P traffic streams of R-TWTx, the R-TWT scheduling AP expects to receive a signal from each R-TWTx member STA that has scheduled UL and/or P2P traffic streams of R-TWTx to indicate that it has transmitted all the frames of the scheduled UL and P2P traffic streams of R-TWTx (i.e., it does not have more frames of the scheduled UL and/or P2P traffic streams of R-TWTx to transmit) during the R-TWTx SP, as explained in the flowchart of FIG. 24 through FIG. 26. When the R-TWT scheduling AP receives such signals from all the R-TWTx member STAs which have scheduled UL and P2P traffic streams of R-TWTx during the R-TWTx SP, it recognizes that all the frames of the scheduled UL and P2P traffic streams of R-TWTx have been transmitted.
  (b) Instead of a R-TWTx member STA sending a signal to indicate it does not have more frames of the scheduled UL and/or P2P traffic streams of R-TWTx to transmit during the R-TWTx SP, in at least one embodiment/mode/case the R-TWT scheduling AP recognizes that a R-TWTx member does not have additional frames of the scheduled UL traffic or P2P traffic streams of R-TWTx to transmit when the following two conditions are met.
  (b)(i) The minimum amount of each UL and P2P scheduled traffic stream that is expected to arrive at the R-TWTx member STA have been received by the R-TWT scheduling AP. For example, a scheduled UL SCS traffic stream of R-TWTx has the minimum data rate field in its TSPEC element set to $R_{min}$ (bits per second). Let us denote t (seconds) is the time between the end times of two consequent R-TWTx SPs. Then, the minimum amount of the scheduled UL SCS traffic stream that is expected to arrive at the R-TWTx member STA is $R_{min}*t$ (bits) during the time t. Before the end of the second R-TWTx SP, the R-TWT scheduling AP should receive all those $R_{min}*t$ (bits) of traffic.
  (b)(ii) The buffer of all the scheduled UL and/or P2P traffic steams of R-TWTx is empty. The R-TWT scheduling AP can send a BSRP to request that information. And the R-TWTx member STAs may only report the buffer status of the scheduled traffic streams of R-TWTx to the R-TWT scheduling AP during the R-TWTx SP.
  (b) (con't.) The minimum amount of each schedules UL or P2P traffic stream of R-TWTx can be replaced by a mean or maximum amount, or similar relative measure, of each scheduled DL traffic stream of R-TWTx which can be calculated as explained in Section 4.3.
  (c) The R-TWT scheduling AP can recognize when it does not have more frames of the scheduled DL traffic streams to transmit when the following two conditions are met.
  (c)(i) The minimum amount of each schedule DL traffic stream of R-TWTx that is expected to arrive at the R-TWT scheduling AP have been transmitted. For example, a scheduled DL SCS traffic stream of R-TWTx has a minimum data rate field in its TSPEC element set to $R_{min}$ (bits per second). Let us denote t (seconds) is the time between the end times of two consequent R-TWTx SPs. Then, the minimum amount of the scheduled DL traffic stream that is expected to arrive at the R-TWT scheduling AP is $R_{min}*t$ (bits) during the time t. Before the end of the second R-TWTx SPs, the R-TWT scheduling AP should transmit all those $R_{min}*t$ (bits) of traffic. A R-TWT scheduling AP may have multiple scheduled DL traffic streams of R-TWTx.
  (c)(ii) The buffers of all the scheduled DL traffic streams of R-TWTx are empty.
  (c)(con't.) The minimum amount of each schedule DL traffic stream of R-TWTx can be replaced by a mean or maximum amount, or similar relative measure, of each schedule DL traffic stream of R-TWTx which can be calculated as explained in Section 4.3.
  (d) In check 174, if all the frames of the scheduled traffic streams of R-TWTx are transmitted before the scheduled end time of the R-TWTx SP, then the R-TWT scheduling AP may exchange frames 176 with those R-TWT scheduled STAs that are not R-TWTx member STAs during the remaining time of the R-TWT SP. This is to reward those R-TWT scheduled STAs that are not R-TWTx member STAs for their support of the R-TWT operation. The details are explained in Section 4.4.
  (e) The R-TWT scheduling AP can send a signal 178 to indicate the end of the R-TWTx SP at any time after all the frames of the scheduled traffic streams of R-TWTx are transmitted and before the scheduled end time of the R-TWTx SP. For example, the signal to indicate the end of the R-TWT SP can be any of the following.
  (e)(i) A QoS data frame or QoS Null frame with the EOSP subfield set equal to a first state (e.g., "1"), whereby the QoS control field of the frame can be as depicted in FIG. 27 or that is defined in IEEE 802.11ax (note that the QoS Null frame with EOSP set to "1" may have to be broadcasted).
  (e)(ii) A frame that is neither QoS data nor a QoS Null frame (including Ack or BA frame) with the More Data field equal to a second state (e.g., "0") which can be the same as defined in IEEE 802.11ax. It will be noted that the More data field can be in the frame control field or the RDG/More data field the CAS control of HT control field. In this case, when the More data subfield is set to a first state (e.g., "1"), it has the same effect as EOSP being set to a second state (e.g., "0"). When the More data subfield is set to a second state (e.g., "0"), it has the same effect as EOSP equal to a first state (e.g., "1").
  (e)(iii) A CF-End frame to indicate the termination of the R-TWT SP.

(e)(iv) A trigger frame that has the More TF field equal to a second state (e.g., "0") and is not addressed to any R-TWT member STAs.

(e)(v) A TWT information frame as defined in IEEE 802.11ax that has the TWT flow identification field equal to the R-TWT ID to indicate the termination of the R-TWT SP.

(e)(vi) A frame that is neither QoS data nor QoS Null frame (including Ack or BA frame) with the More Data field (e.g., either the more data subfield in the frame control field or the RDG/More data field the CAS control of HT control field) equal to a first state (e.g., "1") in the frame during R-TWT SP.

It should be noted that during R-TWT SP, when the More data subfield is set to a first state (e.g., "1"), it has the same effect as when EOSP is equal to a first state (e.g., "1"). When the More data subfield is set to a second state (e.g., "0"), it has the same effect as EOSP being equal to a second state (e.g., "0"). It should be noted that when outside the R-TWT SP, the More data field can be utilized in the same manner as it is in the current IEEE 802.11ax.

(f) A STA can recognize the end of the R-TWTx SP under the following conditions.

(f)(i) When it receives a frame (for example a broadcast frame) from the R-TWT scheduling AP that does not solicit an immediate response and indicates the termination of R-TWT SP.

(f)(ii) When it sends the acknowledgement in response to a frame that indicates the termination of R-TWT SP. It should be noted that the frame that indicates the termination of R-TWT SP is transmitted by the R-TWT scheduling AP.

(g) The R-TWT scheduled STAs that are not R-TWTx member STAs can commence or continue to contend for the channel immediately after they recognize the end of the R-TWTx SP.

(h) When a R-TWTx member STA recognizes the end of the R-TWTx SP, it can either: (i) fall asleep if it is in power save mode; or (ii) start or continue channel contention immediately; or (iii) it is not allowed to contend for the channel until the scheduled end time of the R-TWTx SP.

(j) In at least one embodiment/mode/case a set of EDCA parameters, e.g., MU-EDCA element in IEEE 802.11ax, can be utilized to slow down (delay) the channel contention process of a R-TWTx member STA for a period of time (e.g., MU EDCA Timer field for each AC in MU-EDCA) when the R-TWTx member STA starts to contend for the channel after the end of the R-TWTx SP.

(k) If all the frames of the scheduled traffic streams of R-TWTx cannot be transmitted before the scheduled end time of the R-TWTx SP, then the R-TWT scheduling AP or R-TWT member STA may end 180 the R-TWTx SP at the scheduled end time or extend the R-TWTx SP by extending its obtained TXOP.

FIG. 24 through FIG. 26 illustrate the process of an R-TWTx member STA sending a signal to indicate that all the frames of its scheduled UL and P2P traffic streams of R-TWTx have been transmitted during the R-TWTx SP.

First a brief overview is provided of the flowchart of FIG. 24 through FIG. 26. In block 192 a R-TWTx member STA waits for the scheduled traffic streams of R-TWTx to arrive in its buffer.

A check 194 determines if the R-TWTx member STA has in its buffer any UL and/or P2P traffic streams for transmission during the R-TWTx SP. If the condition is met, then at block 196 the R-TWTx member STA transmits frames of the scheduled UL or P2P traffic streams of R-TWTx in its buffer, and execution moves to block 200 in FIG. 25.

In block 200, a check determines if the R-TWTx member STA has transmitted all frames of its scheduled UL and P2P traffic of R-TWTx during the R-TWTx SP. If all frames have not been transmitted, then execution returns to block 192. Otherwise, since all frames have been transmitted, execution moves to block 202 in which the R-TWTx member STA sends a signal to the scheduling AP to indicate that is has transmitted all frames of its scheduled UL and P2P traffic streams of R-TWTx during the R-TWTx SP.

Execution reaches decision block 204 in which it is determined if the R-TWTx member STA has received any signal of termination of the R-TWTx SP. If the termination signal has been received, then at block 206 the R-TWTx SP ends and the R-TWTx member STA can then contend for the channel, or other traffic may contend for the channel, and the process ends. Otherwise, in block 208 the R-TWTx member STA is not allowed to contend for the channel until R-TWTx SP ends at its scheduled end time.

Returning now to block 194 of FIG. 24, if the condition in block 194 is not met, then decision block 198 is reached which determines between two options. In option 2 it returns to block 192 and continues to wait on the arrival of the frames, otherwise in option 1 execution moves to block 202 in FIG. 25, which has already been described.

The following provides additional details about the process illustrated in FIG. 24 through FIG. 26.

An R-TWTx member STA first waits 192 for the scheduled UL or P2P traffic streams of R-TWTx to arrive in its buffer. If the R-TWTx member STA has the frames of the scheduled UL or P2P traffic streams of R-TWTx in its buffer during a R-TWTx SP, as determined at block 194, then the R-TWTx member STA starts to transmit 196 the frames of those scheduled traffic streams of R-TWTx to the R-TWT scheduling AP during the R-TWTx SP. It should be noted that the R-TWTx member STA can negotiate its scheduled traffic streams of R-TWTx as explained in Section 4.3. This can be performed in any of the following ways.

(a) In certain cases, before the R-TWT scheduling AP and the R-TWTx member STAs start to exchange frames of the scheduled traffic streams of R-TWTx, either the R-TWT scheduling AP or the R-TWTx member STAs will need to contend for the channel to obtain the TXOP for the frame exchange. When the R-TWT scheduling AP or a R-TWT member STA obtains channel access, the exchange of RTS/MU-RTS and CTS can be used to reserve the TXOP. In at least one embodiment/mode/case the TXOP duration must be less-than-or-equal-to the scheduled R-TWTx SP time. In at least one embodiment/mode/case the TXOP cannot be reserved to extend beyond the end time of the R-TWTx SP. During the TXOP, all the scheduled traffic streams can be transmitted as the traffic from the primary AC of the TXOP.

(b) In at least one embodiment/mode/case when a R-TWT scheduled STA is to obtain a TXOP that overlaps a R-TWT SP, it is forced to use an (MU)RTS/CTS exchange to obtain that TXOP. The R-TWT scheduling AP may not respond with a CTS when it receives such an RTS from a R-TWT scheduled STA, and does not allow that R-TWT scheduled STA to obtain the TXOP. It is also possible that the R-TWT scheduling AP sets an arbitrary NAV in the CTS frame in response to such a RTS from a R-TWT scheduled STA. The R-TWT scheduled STA then only obtains the TXOP that equals the NAV in the CTS frame.

(c) In at least one embodiment/mode/case the R-TWT scheduling AP and the R-TWTx member STAs use EDCA to obtain the TXOP for the transmission of the scheduled traffic streams of R-TWTx during R-TWTx SP. When an EDCA TXOP is obtained, in some cases all the frames of the scheduled traffic streams of R-TWTx, including those from the primary AC and non-primary AC, can be transmitted during that EDCA TXOP. It should be noted that the primary AC represents the AC of which the EDCAF obtains the TXOP. In at least one embodiment/mode/case only the EDCAFs of the ACs which have scheduled traffic streams of R-TWTx in their buffer are allowed to contend for the channel.

(d) In at least one embodiment/mode/case when the trigger field in the Request type field in Broadcast TWT parameter Information field of R-TWTx is set to a first state (e.g., "1") by the R-TWT scheduling AP, the R-TWTx member STAs are not allowed to contend for the channel during the R-TWTx SPs. If this field is set to a first state (e.g., "0"), then the R-TWTx member STAs can also contend for the channel during the R-TWTx SPs.

(e) It is possible that if there are frames that have the same TID as a scheduled traffic stream of R-TWTx and that need to be retransmitted but do not belong to any scheduled traffic stream of R-TWTx, then the R-TWTx member STA can transmit those frames during the R-TWTx SP. The R-TWTx member STA should transmit those frames earlier than the frames of the scheduled traffic stream of R-TWTx with the same TID during the R-TWTx SP when the block acknowledgement is used for that TID. This is because the sequence numbers of those frames have been assigned and the frames are smaller than the frames of the scheduled traffic stream of R-TWTx.

If the R-TWTx member STA does not have any frames of the scheduled UL and/or P2P traffic streams of R-TWTx in its buffer during the R-TWTx SP, as determined in block 194, it can determine options 198 whether to continue to wait 192 for the arrival of the frames or send a signal 202 to the R-TWT scheduling AP to indicate that it has transmitted all the frames of its scheduled UL and P2P traffic streams of R-TWTx during the R-TWTx SP. That is, the R-TWTx member STA does not expect more frames of the scheduled UL and/or P2P traffic streams to arrive and be transmitted during the R-TWTx SP.

If the R-TWTx member STA has transmitted all the frames of the scheduled UL and/or P2P traffic streams of R-TWTx in its buffer, as determined in block 200, but expects more frames of the scheduled UL or P2P traffic streams of R-TWTx to arrive during the R-TWTx SP, it should keep waiting 192 for the arrival of those frames.

When the R-TWTx member STA has transmitted all the frames of the UL and/or P2P traffic streams of R-TWTx during the R-TWT SP, it sends a signal 202 with such an indication, the process being further outlined below.

(a) It should be noted that the R-TWTx member STA can recognize that it does not have more frames of the scheduled UL and/or P2P traffic streams of R-TWTx to transmit when the following two conditions are met.

(a)(i) The minimum amount of each scheduled UL and P2P traffic streams that is expected to arrive at the R-TWT member STA have been transmitted. For example, a scheduled UL SCS traffic stream of R-TWTx has a minimum data rate field in the TSPEC element set to Rmin (bits per second). Let us denote t (seconds) is the time between the end times of two consecutive R-TWTx SPs. Then, the minimum amount of the UL SCS traffic stream that is expected to arrive at the R-TWTx member STA is $R_{min}*t$ (bits) during the time t. Before the end of the second R-TWTx SP, the R-TWTx member STA should transmit all those $R_{min}*t$ (bits) of traffic. A R-TWTx member STA may have multiple scheduled UL and/or P2P traffic streams of R-TWTx.

(a)(ii) The buffer of those scheduled traffic streams of R-TWTx is empty at the R-TWTx member STA.

(a)(con't.) The minimum amount of each schedule DL traffic stream of R-TWTx can be replaced by mean or maximum amount, or similar relative measure, of each schedule DL traffic stream of R-TWTx which can be determined (e.g., calculated) as explained in Section 4.3.

(b) In at least one embodiment, the signal for indicating that a R-TWT member STA have transmitted all the frames of its scheduled UL and P2P traffic streams of R-TWTx during the R-TWTx SP is selected from the following.

(b)(i) The signal can be a frame that is neither QoS data nor a QoS Null frame (including Ack or BA frame) with the More Data field equal to a second state (e.g., "0") which can be the same as defined in IEEE 802.11ax. It should be noted that the More data field can be either in the frame control field or the RDG/More data field in the CAS control of HT control field of the frame. When the More data subfield is set to a first state (e.g., "1"), it has the same effect as EOSP being set to a second state (e.g., "0"). When the More data subfield is set to a second state (e.g., "0"), it has the same effect as if EOSP is set to a first state (e.g., "1").

(b)(ii) The signal can be a QoS data or QoS Null frame with the EOSP subfield equal to "1" in whose QoS control field in the frame can be shown in FIG. 17.

(b)(iii) The signal can be a frame that is neither a QoS data nor a QoS Null frame (including Ack or BA frame) with the More Data field (e.g., either the more data subfield in the frame control field or the RDG/More data field the CAS control of HT control field) equal to a first state (e.g., "1") in the frame during R-TWT SP. It will be noted that during R-TWT SP, when the RDG/More data subfield is set to a first state (e.g., "1"), then this has the same effect as EOSP set to a first state (e.g., "1"). When the RDG/More data subfield is set to a second state (e.g., "0"), it has the same effect as EOSP being set to a second state (e.g., "0"). It should be noted that when outside the R-TWT SP, the More data field is preferably used in the same manner as in the current IEEE 802.11ax).

(c) If the signal is carried by a data frame, this data frame can be the last data frame of the scheduled traffic streams of R-TWTx transmitted by the R-TWTx member STA. In at least one embodiment/mode/case the signal is carried by all the data frames in the last PPDU transmitted by the R-TWTx member STA, e.g., all the data frames in the last PPDU set the EOSP subfield to a first state (e.g., "1"). Then, the signal is received by the R-TWT scheduling AP successfully when the whole PPDU, which carries the last data frame, is received successfully—or when all the frames of the scheduled traffic streams of R-TWTx in the PPDU are received successfully. In at least one embodiment/ mode/case during the R-TWTx SP, the PPDU is only allowed to carry the frames of the scheduled traffic streams of R-TWTx.

(d) If the signal is not transmitted successfully, the R-TWTx member STA needs to retransmit this signal to the R-TWT scheduling AP.

(e) The signal can be sent in an unsolicited manner by the R-TWTx member STA when it does not have any frames of the scheduled UL or P2P traffic streams of R-TWTx in its buffer and informs the R-TWT scheduling AP that the R-TWT scheduling AP can terminate the R-TWTx SP regardless of the scheduled UL and/or P2P traffic streams of R-TWTx that are supposed to be transmitted by the R-TWTx member STA.

(f) In at least one embodiment/mode/case the R-TWTx member STA that does not have any scheduled UL and/or P2P traffic streams of R-TWTx, is not allowed to send such a signal during the R-TWTx SP. In an alternative embodiment/mode/case the R-TWTx member STAs that do not have any scheduled UL and/or P2P traffic streams of R-TWTx are also required to send such a signal.

(g) If the R-TWTx member STA does not have scheduled DL traffic streams of R-TWTx and it is operating in a power save mode, it is allowed to enter the sleep mode (fall asleep) immediately after sending the signal successfully to the R-TWT scheduling AP.

Thus, as explained in FIG. 24 through FIG. 26, the R-TWT scheduling AP can send a signal to indicate the end of the R-TWTx SP after all the scheduled traffic streams are transmitted. When the R-TWTx member STA recognizes the end of the R-TWTx SP, as determined in block 204, then it can begin to contend 206 for the channel immediately. In at least one embodiment/mode/case the R-TWTx member STA can utilize a different EDCA parameter setting for a period of time to lower its priority of channel contention. For example, the R-TWTx member STA uses MU-EDCA parameters for channel contention after the R-TWTx SP ends. Instead of contending for the channel, the R-TWTx member STA can also enter sleep mode for power saving when the R-TWTx SP ends. Otherwise, the R-TWTx member STA is not allowed to contend for the channel, until the R-TWTx SP ends upon the scheduled end time of the R-TWTx SP, after it sends the signal which indicates that it has transmitted all the frames 208 of its scheduled UL and P2P traffic streams of R-TWTx during the R-TWTx SP.

4.6. QoS Control Field in QoS Data and Null Frames for R-TWT

FIG. 27 illustrates an example embodiment 210 of a QoS control field in QoS data and QoS null frame for R-TWT. It should be noted that in at least one embodiment the QoS data frame also includes QoS data+CF Ack frame. The QoS data and QoS null frame can indicate that this frame type is for R-TWT by using a reserved frame type (e.g., a type and subtype combination in the frame control field in IEEE 802.11), or transmitting the frame during R-TWT SPs, or being transmitted by a R-TWT scheduling AP or R-TWT scheduled STA. When a QoS data and a QoS null frame is for R-TWT, then the QoS control field as shown in FIG. 27 is used in the frame.

A TID field is set to represent the TID of the data of the frame carrying this QoS control field. The TID can be set to a number between "0" to "7", or "8" to "15", or "0" to "15". This field can also be reserved when sent in a QoS null frame.

An EOSP field is set by the R-TWT scheduled STA to indicate whether it has transmitted all the frames of the scheduled UL and/or P2P traffic streams of a R-TWT during a SP of that R-TWT. If this field is set to a first state (e.g., "1"), then the R-TWT scheduled STA has transmitted all the frames of the scheduled UL and P2P traffic streams of the R-TWT during the SP of that R-TWT. Otherwise, this field is set to a second state (e.g., "0") and the R-TWT scheduled STA has more frames of the scheduled UL and P2P traffic streams of the R-TWT during the SP of that R-TWT. If this field is sent in a QoS data frame, this information is acknowledged by the R-TWT scheduling AP when the R-TWT scheduling AP sends feedback which indicates that all the data frames of the scheduled traffic streams in the same PPDU of the QoS data frame (or the whole PPDU) are received successfully. The R-TWT scheduled STA can retransmit this information if it is not acknowledged by the R-TWT scheduling AP. The R-TWT scheduling AP sets this field to indicate the end of the current R-TWT SP. If this field is set to a first state (e.g., "1"), then the current R-TWT SP ends. Otherwise, this field is set to a second state (e.g., "0") and the current R-TWT SP does not end. The STA can recognize the end of the R-TWT SP by receiving this field.

An Ack Policy Indicator field can be identical to that in the QoS control field defined in IEEE 802.11. An A-MSDU Present field can be identical to that in the QoS control field defined in IEEE 802.11.

An HT Control Present field is set to indicate whether there is an HT control field in the MAC header of the frame. When this field is set to a first state (e.g., "1"), then there is a HT control field. The HT control field can carry the extra information such as BSR. When this field is set to a second state (e.g., "0"), then there is no HT control field in the MAC header.

4.7. Examples of Terminating R-TWT

This section illustrates several examples of the termination of a R-TWT SP. As explained in Section 4.3, the R-TWTs can be scheduled by the R-TWT scheduling AP. The R-TWT scheduled STAs request membership of a R-TWT and negotiate the scheduled SCS traffic streams of that R-TWT.

In the examples of this section, the R-TWT scheduling AP and R-TWT scheduled STA can embed the QoS control field as shown in FIG. 27 in the QoS data or QoS Null frame.

Table 1 lists five SCS traffic streams which are scheduled to transmit during SPs of different R-TWTs.

SCS1 is established between MLD2 and MLD1. The direction of SCS1 traffic stream is uplink (i.e., a traffic flow from MLD2 to MLD1). This traffic stream is a scheduled traffic stream of R-TWT1 on Link1.

SCS2 is established between STA2 and MLD1. The direction of this SCS2 traffic stream is downlink (i.e., a traffic flow from MLD1 to STA2). This traffic stream is a scheduled traffic stream of R-TWT1 on Link1.

SCS3 is established between STA2 and STA1. The direction of the SCS3 traffic stream is P2P (i.e., a traffic flow from STA2 to STA1). This traffic stream is a scheduled traffic stream of R-TWT2 on Link1.

SCS4 is established between MLD3 and MLD1. The direction of the SCS3 traffic stream is uplink (i.e., a traffic flow from MLD3 to MLD1). This traffic stream is a scheduled traffic stream of R-TWT4 on Link1 and Link2.

SCS5 is established between MLD3 and MLD1. The direction of this SCS3 traffic stream is downlink (i.e., a traffic flow from MLD1 to MLD3). This traffic stream is a scheduled traffic stream of R-TWT5 on Link1 and Link2.

SCS6 is established between STA2 and MLD1. The direction of the SCS6 traffic stream is uplink (i.e., a traffic flow from STA2 to MLD1). This traffic stream is a scheduled traffic stream of R-TWT2 on Link1.

The examples in this section follow R-TWT scheduling as shown in Table 1. The network topology shown in FIG. 20 is used in the examples.

Figure 28:
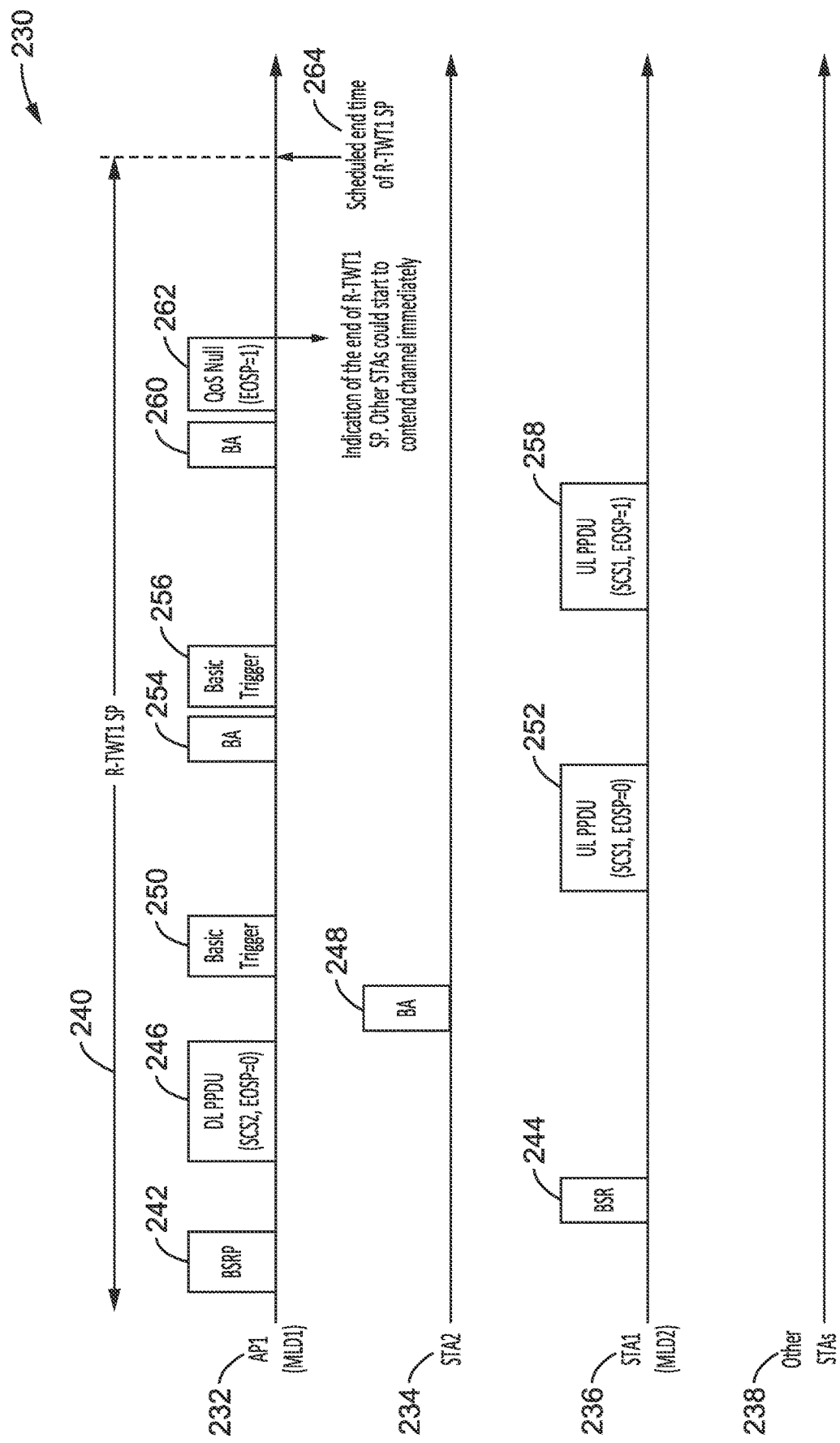
FIG. 28 is a communication diagram of a R-TWT scheduling AP broadcasting a QoS Null frame with EOSP set to a first state (e.g., "1") to indicate the termination of a R-TWT SP, according to at least one embodiment of the present disclosure.

FIG. 28 illustrates an example embodiment 230 of a R-TWT scheduling AP broadcasting a QoS Null frame with EOSP set to a first state (e.g., "1") to indicate the termination of a R-TWT SP. The STAs shown are AP1 232 of MLD1, STA2 234, STA1 236 of MLD2 and other STAs 238.

During a R-TWT1 SP 240, AP1 (the R-TWT scheduling AP) and STA2 and STA1 (the R-TWT1 member STAs) exchange frames of SCS1 and SCS2 traffic streams as listed in Table 1.

As shown in the figure, in order to transmit the uplink (UL) transmission of SCS1, AP1 sends a BSRP 242 to STA1 to request the buffer status of STA1. Then, STA1 reports buffer status 244 of the SCS1 traffic stream to AP1 (e.g., STA1 only reports the buffer status of SCS1 traffic stream in BSR). Then, AP1 can commence transmitting, shown here as downlink (DL) transmission 246 of SCS2 to STA2 first. The DL PPDU of SCS2 can have EOSP set to a second state (e.g., "0") to indicate there are more frames of scheduled traffic streams of R-TWT1 to be transmitted during the current R-TWT1 SP. It should be noted that AP1 can determine whether all the expected frames of SCS2 have arrived at its buffer and are transmitted. STA2 acknowledges receipt 248.

Then, AP1 triggers the UL transmission of SCS1. AP1 is exemplified as triggering the UL transmission of SCS1 twice, 250 and 256, as shown in the figure. The first UL PPDU 252 of SCS1 has EOSP set to a second state (e.g., "0") which indicates that there are more UL PPDUs to be transmitted during the current R-TWT1 SP. The second UL PPDU 258 of SCS1 has EOSP set to a first state (e.g., "1") which indicates that STA1 does not have more frames of the scheduled UL traffic stream of R-TWT1 to transmit during the current R-TWT1 SP. AP1 acknowledges (e.g., BA) each uplink 254 and 260. Once STA1 receives the BA which is in response to the UL PPDU of SCS1 with EOSP set to a first state (e.g., "1") and which indicates all the UL transmissions are received successfully.

Then, since all the frames of the scheduled traffic streams of R-TWT1 (i.e., SCS1 and SCS2) are transmitted before the scheduled end time of the R-TWT1 SP, AP1 broadcasts a QoS Null frame 262 with EOSP set to a first state (e.g., "1") to indicate the end 264 of the R-TWT1 SP. Other STAs that receive this QoS Null frame can commence to contend for the channel immediately.

It should be noted that it may require the DL PPDU and UL PPDU in the figure to carry QoS data or QoS Null frame which have EOSP subfield in the QoS control field as shown in FIG. 27 in the frame. In at least one embodiment/mode/case when one PPDU carries multiple QoS data or QoS Null frames, only the last frame can set the EOSP subfield to a first state (e.g., "1"). The EOSP settings in the PPDUs shown in the figure represent the last EOSP subfield values in those PPDUs.

In at least one embodiment/mode/case the DL PPDU and UL PPDU in the figure carry neither QoS data nor QoS Null frame. Then, there is no EOSP subfield to set in those frames. Instead, the More data subfield in the frame can be utilized to replace the EOSP subfield as explained in Section 4.5.

In at least one embodiment/mode/case the QoS Null frame with EOSP set to a first state (e.g., "1") for transmission by the R-TWT scheduling AP is be replaced by a CF-End frame or a TWT information frame to indicate the end of the R-TWT1 SP.

During the R-TWT SP, the R-TWT scheduling AP and the R-TWT1 member STAs should use either EOSP subfield or More data subfield but not both of them.

Figure 29:
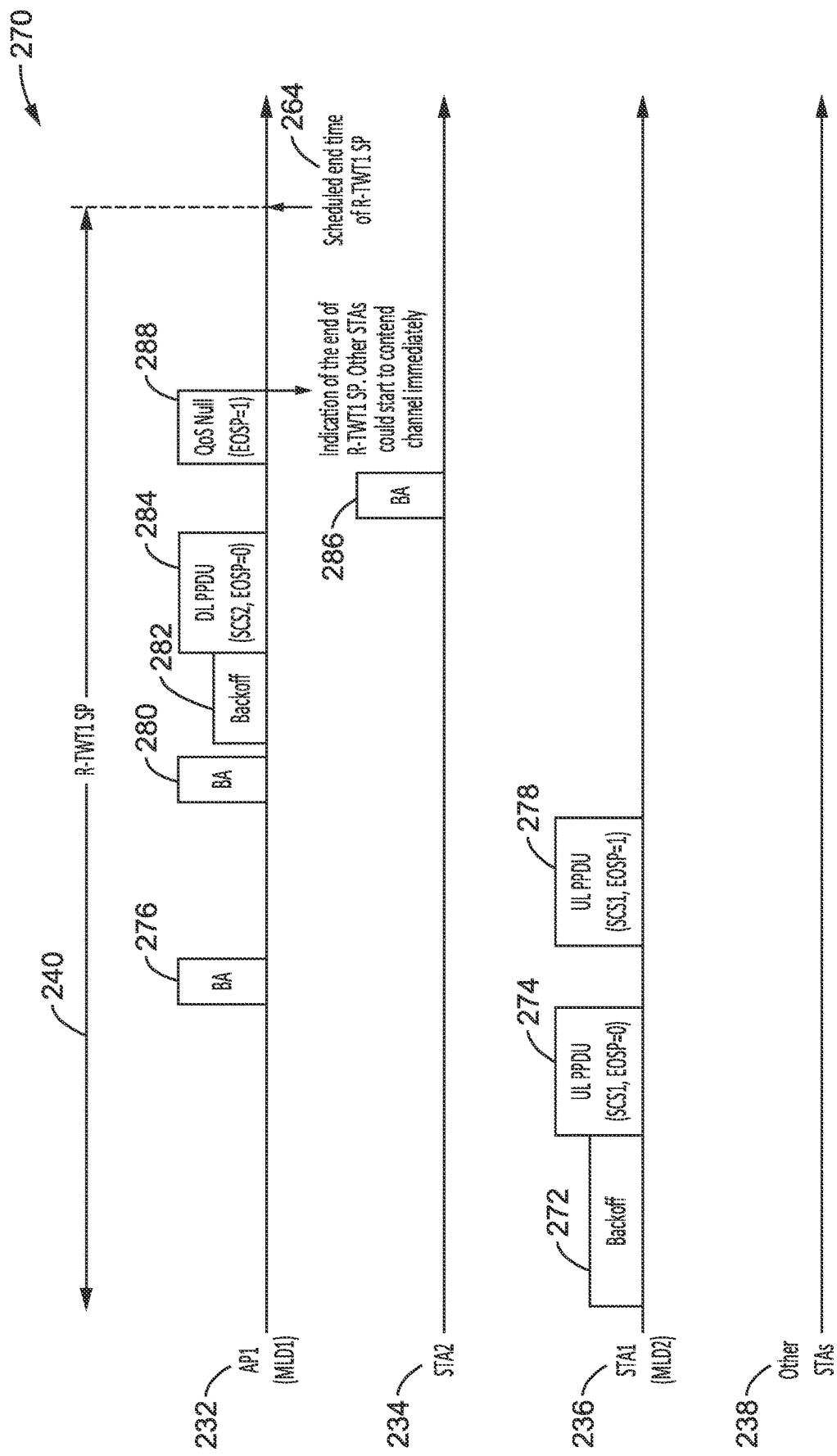
FIG. 29 is a communication diagram of an R-TWT SP in which R-TWT member STA is allowed to contend for the channel during R-TWT SP, according to at least one embodiment of the present disclosure.

FIG. 29 illustrates an example embodiment 270 of the R-TWT scheduling AP broadcasting a QoS Null frame with EOSP set to a first state (e.g., "1") to indicate the termination of a R-TWT SP. While the previous example can arise when the trigger field in Request type field in the Broadcast TWT parameter Information field of R-TWT1 is set to a first state (e.g., "1") by the R-TWT scheduling AP, this example can occur when the trigger field in a Request type field in a Broadcast TWT parameter Information field of R-TWT1 is set to a second state (e.g., "0") by the R-TWT scheduling AP. The STAs shown are AP1 232 of MLD1, STA2 234, STA1 236 of MLD2 and other STAs 238.

During a R-TWT1 SP 240, AP1 (the R-TWT scheduling AP) and STA2 and STA1 (the R-TWT1 member STAs) exchange frames of SCS1 and SCS2 traffic streams as listed in Table 1.

As shown in the figure, in order to transmit the uplink (UL) transmission of SCS1, STA1 performs backoff 272 to contend for the channel. When it obtains channel access, it commences to transmit UL PPDUs 274 and 278, which carry the frames of SCS1, and AP1 acknowledges receipt 276, 280, of these frames. When STA1 sends the last frame of SCS1, it sets the EOSP to a first state (e.g., "1") in that frame. When AP1 sends BA 280 to indicate that the PPDU carrying the last frame of SCS1 has been received successfully, this indicates that STA1 has transmitted all the frames of its scheduled UL and/or P2P traffic streams of R-TWT1 during the R-TWT1 SP.

AP1 also contends for the channel 282 to transmit the frames of the scheduled downlink (DL) traffic streams 284 of R-TWT1, i.e., SCS2, to STA2. The DL PPDU of SCS2 can set EOSP to a second state (e.g., "0") to indicate that the R-TWT1 SP does not end, even if all the frames of the scheduled traffic streams of R-TWT1 will be transmitted after this PPDU is received successfully.

After STA2 sends the BA 286 to indicate the DL PPDU of SCS2 is received successfully, all frames of the scheduled traffic streams of R-TWT1 (i.e., SCS1 and SCS2) have been transmitted before the scheduled end time of the R-TWT1 SP. Then, AP1 broadcasts a QoS Null frame 288 with EOSP set to a first state (e.g., "1") to indicate the end of the R-TWT1 SP, after which the scheduled end time 264 of the R-TWT SP occurs. Other STAs receiving this QoS Null frame can start to contend for the channel immediately.

It should be noted that it may require the DL PPDU and UL PPDU in the figure to carry QoS data or a QoS Null frame which have EOSP subfield in the QoS control field as shown in FIG. 27 in the frame. In at least one embodiment/mode/case when one PPDU carries multiple QoS data or QoS Null frames, only the last frame sets the EOSP subfield to a first state (e.g., "1"). The EOSP settings in the PPDUs shown in the figure represent the last EOSP subfield values in those PPDUs.

In at least one embodiment/mode/case the DL PPDU and/or UL PPDU in the figure carry neither QoS data nor QoS Null frame. Then, there is no EOSP subfield to set in those frames. Instead, the More data subfield in the frame can be used to replace the EOSP subfield as explained in Section 4.5.

In at least one embodiment/mode/case the QoS Null frame with EOSP set to a first state (e.g., "1") can be replaced by a CF-End frame or a TWT information frame to indicate the end of the R-TWT1 SP.

During the R-TWT SP, the R-TWT scheduling AP and the R-TWT1 member STAs should use either a EOSP subfield or a More data subfield; but not both of them at the same time.

Figure 30:
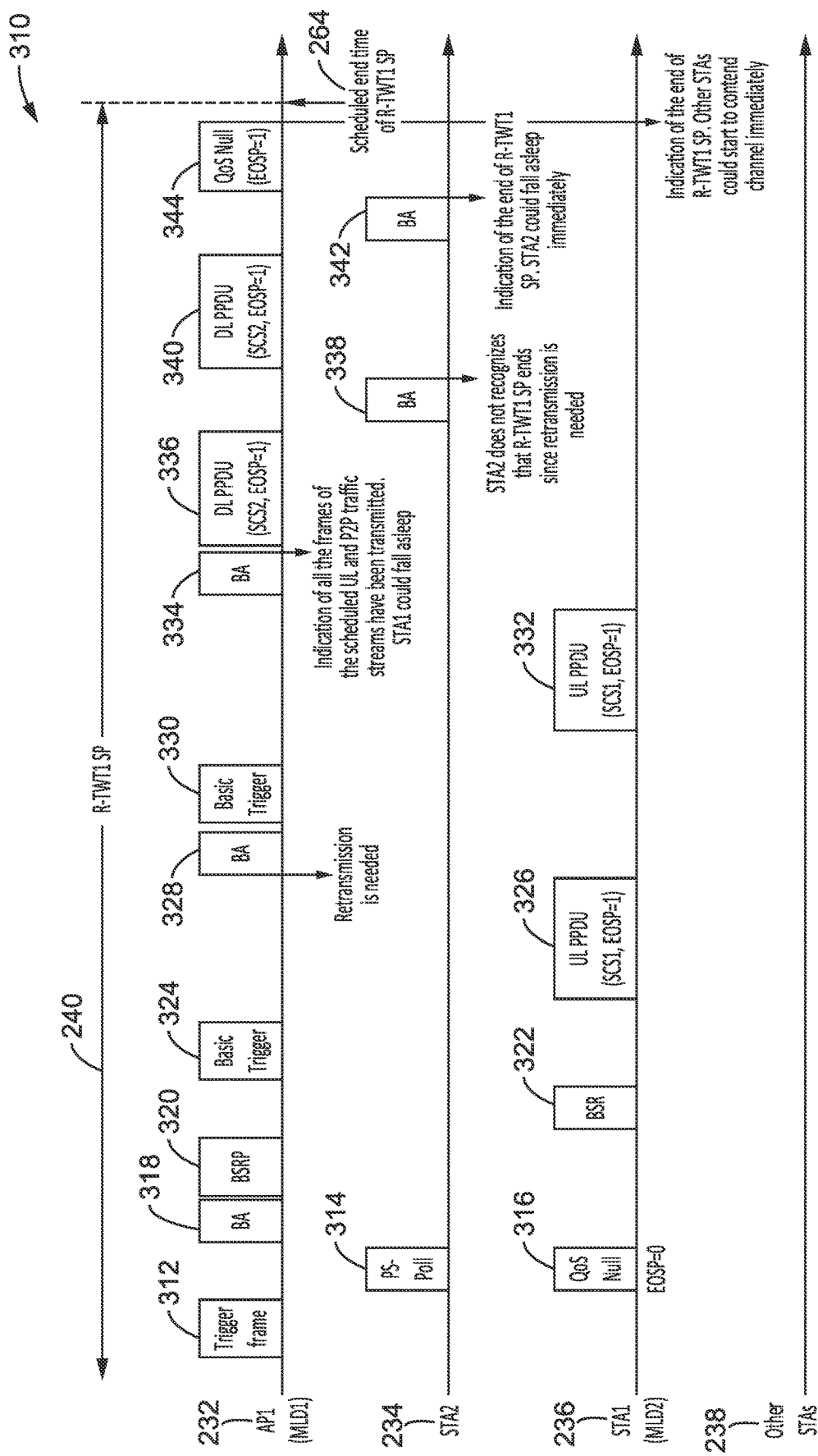
FIG. 30 is a communication diagram of an R-TWT SP in which the termination indication was not successfully received.

FIG. 30 illustrates an example embodiment 310 in which the termination indication of R-TWT SP was not successfully received. In this example, it is presumed that STA2 and STA1 are operating in a power saving mode. The STAs shown are the same as in the prior figure, with AP1 232 of MLD1, STA2 234, STA1 236 of MLD2 and other STAs 238.

During a R-TWT1 SP 240, AP1 (the R-TWT scheduling AP) and STA2 and STA1 (the R-TWT1 member STAs) exchange frames of SCS1 and SCS2 traffic streams as listed in Table 1.

As shown in the figure, in order to check that STA1 and STA2 are awake during the R-TWT1 SP, AP1 sends a trigger frame 312 to STA2 and STA1. STA2 sends a PS-Poll 314 to indicate it is awake and ready for receiving its scheduled DL traffic stream of R-TWT1 from the R-TWT scheduling AP. STA1 sends a QoS Null frame 316 to indicate it is awake. The QoS Null frame can carry the BSR in the HT control field to report its buffer of the scheduled traffic streams of R-TWT1 at its side. AP1 responds to the QoS Null with BA 318.

If the QoS Null frame is not carrying the BSR in the HT control field, then the R-TWT scheduling AP can send a BSRP 320 to request a BSR 322 from STA1 for the buffer of the scheduled traffic streams of R-TWT1 at STA1 as shown in the figure.

Then, AP1 triggers 324 the UL transmission 326 of SCS1. AP1 triggers the UL transmission of SCS1 twice as shown in the figure. As shown in the figure, the first UL PPDU 326 of SCS1 has EOSP set to a first state (e.g., "1") which indicates that there are no more UL PPDUs to be transmitted during the current R-TWT1 SP. However, the BA response 328 indicates that retransmission is needed and AP1 sends another trigger frame 330 for the UL transmission 332 of SCS1. This second UL PPDU 332 of SCS1 also sets EOSP set to a first state (e.g., "1") and its response BA 334 frame indicates that the UL transmissions was successful. Then, STA1 finishes its UL transmissions of the scheduled traffic streams of R-TWT1 during the current R-TWT1 SP. Since STA1 is operating in power saving mode and only has scheduled UL traffic streams of R-TWT1, it can fall asleep immediately.

Then, AP1 is shown commencing a downlink (DL) transmission 336 of SCS2 to STA2. The DL PPDU of SCS2 can have EOSP set to a first state (e.g., "1") to indicate there are no more scheduled traffic transmission of R-TWT1 to be transmitted during the current R-TWT1 SP. However, the response BA 338 from STA2 indicates that retransmissions are needed, and thus the R-TWT1 SP cannot be ended.

AP1 transmits another DL PPDU 340 of SCS2 with EOSP set to a first state (e.g., "1") for the retransmission. It should be noted that the PPDU need only carry the frames that require retransmission. When STA2 sends a BA 342 back to indicate that the DL PPDU of SCS2 with EOSP set to a first state (e.g., "1") is received successfully, then STA2 recognizes the current R-TWT1 SP is terminated. STA2 can then fall asleep (enter sleep mode) immediately since it is operating in a power saving mode.

AP1 can broadcast a QoS Null frame 344 with EOSP set to a first state (e.g., "1"). Other STAs receiving this frame thus can recognize the end of the R-TWT1 SP 264 and start to contend for the channel immediately.

It should be noted that it may require the DL PPDU and UL PPDU in the figure to carry QoS data or QoS Null frame which have EOSP subfield in the QoS control field as shown in FIG. 27 in the frame. In at least one embodiment/mode/case when one PPDU carries multiple QoS data or QoS Null frames, only the last frame can set the EOSP subfield to a first state (e.g., "1"). The EOSP settings in the PPDUs shown in the figure represent the last EOSP subfield values in those PPDUs.

In at least one embodiment/mode/case DL PPDU and UL PPDU in the figure carry neither QoS data nor QoS Null frame. Then, there is no EOSP subfield to set in those frames. Instead, the More data subfield in the frame can be used to replace the EOSP subfield as explained in Section 4.5.

In at least one embodiment/mode/case the QoS Null frame with EOSP set to a first state (e.g., "1") as transmitted by the R-TWT scheduling AP can be replaced by a CF-End frame or a TWT information frame to indicate the end of the R-TWT1 SP.

During the R-TWT SP, the R-TWT scheduling AP and the R-TWT1 member STAs should use either the EOSP subfield or the More data subfield, but not both of them at once.

Figure 31:
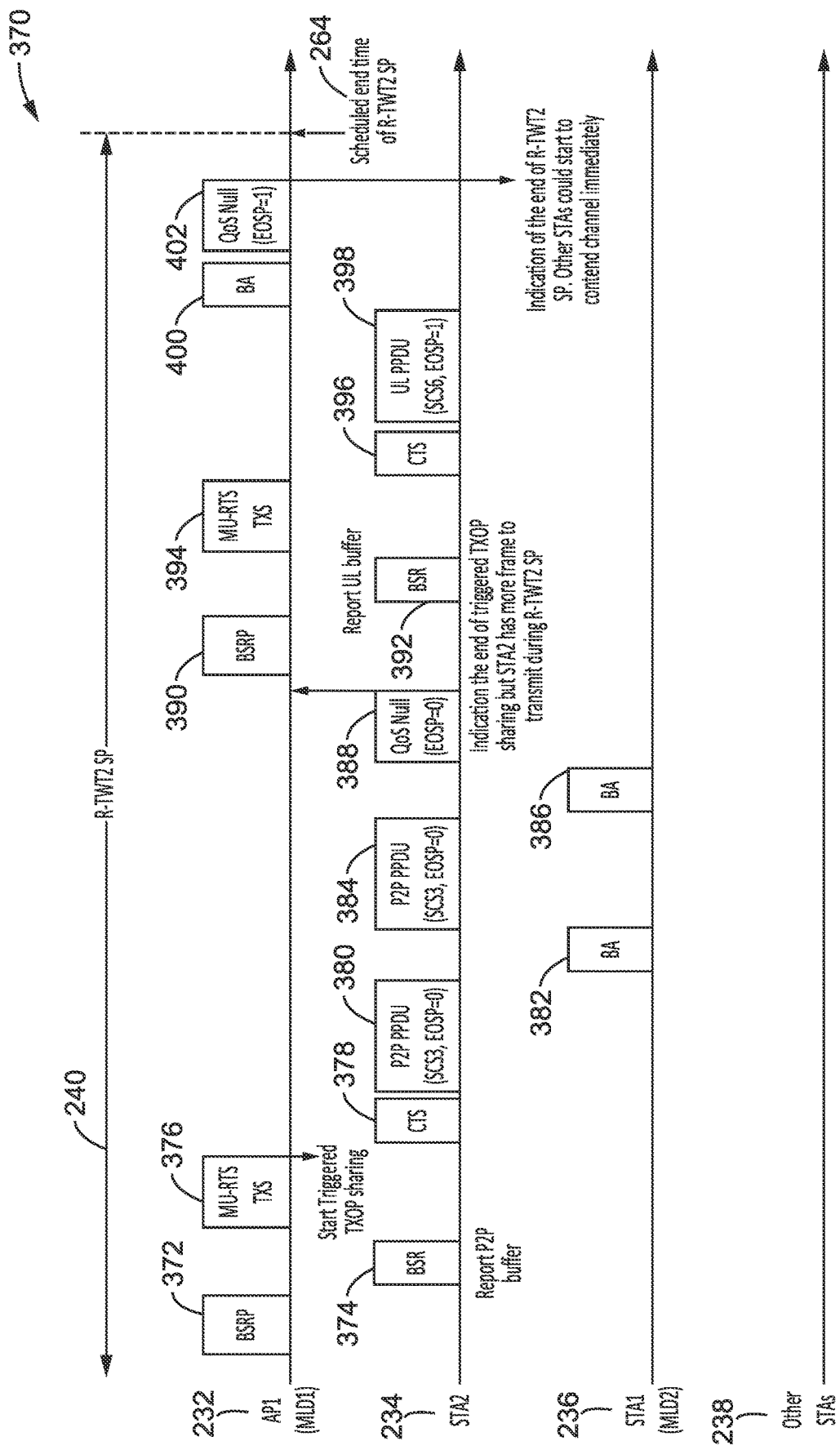
FIG. 31 is a communication diagram of a STA sending a QoS Null frame with EOSP set to a second state (e.g., "0") to end a triggered TXOP sharing time during R-TWT SP, according to at least one embodiment of the present disclosure.

FIG. 31 illustrates an example embodiment 370 of a STA sending a QoS Null frame with EOSP set to a second state (e.g., "0") to end a triggered TXOP sharing time during R-TWT SP. The STAs shown are the same as in the prior figure, with AP1 232 of MLD1, STA2 234, STA1 236 of MLD2 and other STAs 238.

During a R-TWT2 SP 240, AP1 (the R-TWT scheduling AP) and STA2 (the R-TWT2 member STA) exchange frames of SCS3 and SCS6 traffic streams as listed in Table 1.

As shown in the figure, in order to transmit the P2P transmission of SCS3, AP1 sends a BSRP 372 to STA2 to request the buffer status of STA1. Then, STA1 can report the buffer status of SCS3 traffic stream to AP1 (e.g., STA3 only report the buffer status of SCS3 traffic stream in BSR 374). Then, AP1 can start to launch P2P transmission of SCS3. AP1 can send a MU-RTS TXS frame 376 as defined in IEEE 802.11be to share some TXOP time with STA2. After STA2 sends a CTS frame 378 in response to the MU-RTS TXS frame, it starts to transmit P2P PPDUs 380 and 384 of SCS3 to STA1, and receives BAs 382 and 386. After STA2 finishes the P2P transmission, it sends a QoS Null frame 388 with EOSP set to a second state (e.g., "0") to indicate the end of the triggered TXOP sharing; however, STA2 has additional frames of the scheduled traffic streams of R-TWT2 to transmit during the current R-TWT2 SP.

AP1 sends a BSRP 390 to request a BSR from STA2 which reports its UL buffer 392 of SCS6 this time. AP1 then sends another MU-RTS TXS frame 394 to start another triggered TXOP sharing for the UL transmission of SCS6. After this STA2 sends a CTS 396 and then a UL PPDU 398 of SCS6 with EOSP set to a first state (e.g., "1") which indicates that STA2 finished all the frame transmission of its scheduled UL and P2P traffic streams of R-TWT2 during the current R-TWT2 SP. This EOSP is set to a first state (e.g., "1") which also indicates the end of the triggered TXOP sharing time. AP1 acknowledges receipt with BA 400.

It should be noted that AP1 uses a MU-RTS TXS frame instead of a trigger frame for UL PPDU transmission because AP1 may not be able to differentiate between the P2P buffer and UL buffer in the BSRs. Since there is scheduled P2P traffic stream of R-TWT2, AP1 uses MU-RTS TXS frame to start the triggered TXOP sharing. That is, when both P2P traffic and UL traffic are scheduled during a R-TWT SP, the R-TWT scheduling AP should use MU-RTS TXS frame to trigger P2P traffic and UL traffic.

Then, since all the frames of the scheduled traffic streams of R-TWT2 (i.e., SCS3 and SCS6) have been transmitted before the scheduled end time of the R-TWT2 SP, AP1 broadcasts a QoS Null frame 402 with EOSP set to a first state (e.g., "1") to indicate the end of the R-TWT2 SP 264. Other STAs receiving this QoS Null frame can start to contend for the channel immediately.

It should be noted that it may require the UL PPDU in the figure to carry QoS data or a QoS Null frame which have EOSP subfield in the QoS control field as shown in FIG. 27 in the frame. In at least one embodiment/mode/case when one PPDU carries multiple QoS data or QoS Null frames, only the last frame can set the EOSP subfield to a first state (e.g., "1"). The EOSP settings in the PPDUs shown in the figure represent the last EOSP subfield values in those PPDUs.

In at least one embodiment/mode/case the UL PPDU in the figure does not carry either QoS data or a QoS Null frame. Thus, there is no EOSP subfield to set in those frames. Instead, the More data subfield in the frame can be utilized to replace the EOSP subfield as explained in Section 4.5.

In at least one embodiment/mode/case the QoS Null frame with EOSP set to a first state (e.g., "1") can be replaced by a CF-End frame or a TWT information frame to indicate the end of the R-TWT1 SP.

During the R-TWT SP, the R-TWT scheduling AP and the R-TWT1 member STAs should use either an EOSP subfield or a More data subfield but not both of them.

The signal for ending a triggered TXOP sharing can be used by a STA at any time and is not limited to only the R-TWT SP. In at least one embodiment/mode/case, the QoS Null frame with EOSP, requests a Ack/BA for feedback.

It should be noted that during a triggered TXOP sharing time triggered by one MU-RTS TXS frame, the STA which is the intended receiver of the MU-RTS TXS frame can send any desired number of PPDUs during the triggered TXOP sharing time interval.

Figure 32:
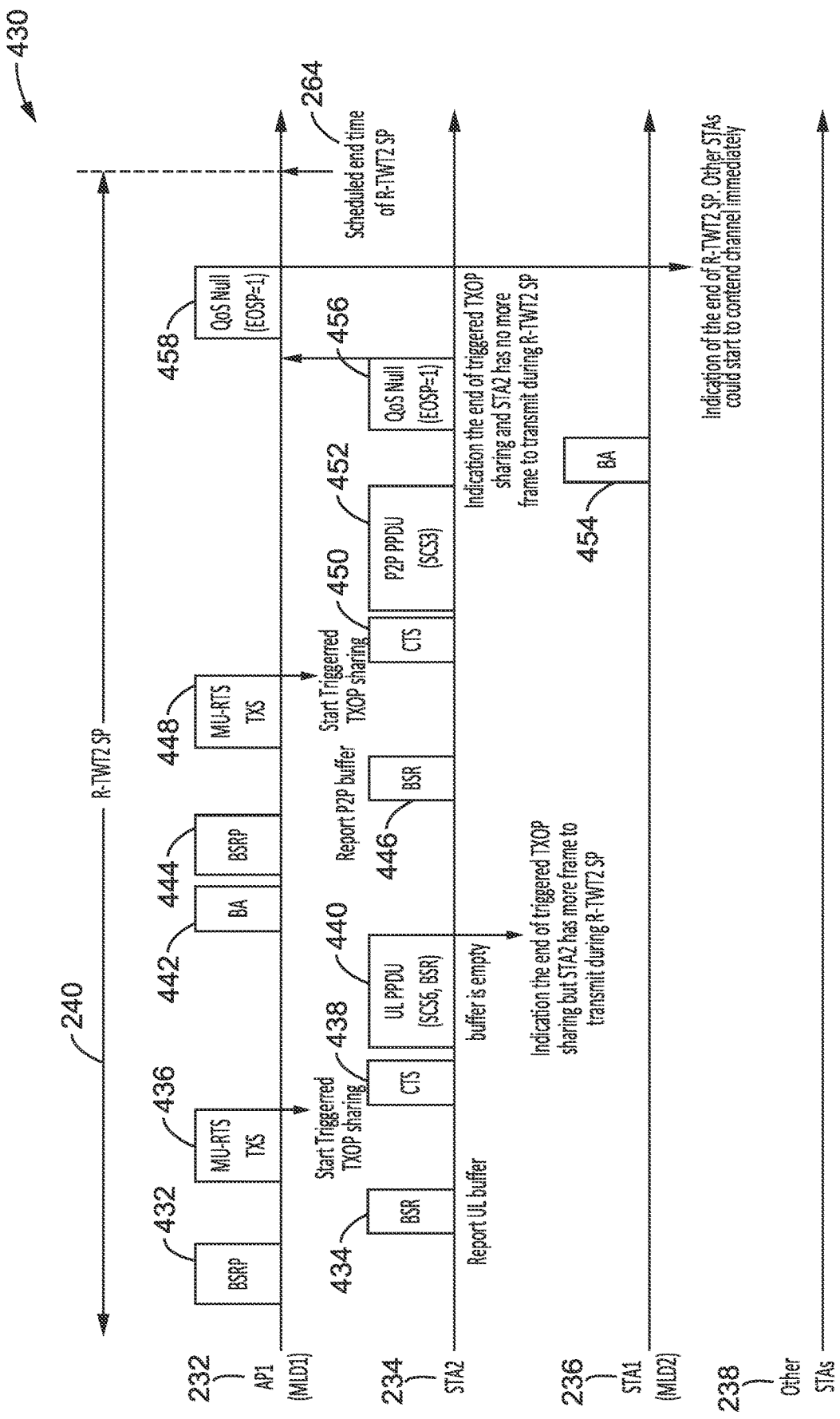
FIG. 32 is a communication diagram of a STA sending a QoS Null frame with EOSP set to a first state (e.g., "1") to end a triggered TXOP sharing time during R-TWT SP

FIG. 32 illustrates an example embodiment 430 of a STA sending a QoS Null frame with EOSP set to a first state (e.g., "1") to end a triggered TXOP sharing time during R-TWT SP. This example also shows an instance in which a STA sending a frame carrying BSR which reports an empty buffer to end a triggered TXOP sharing time during R-TWT SP. The STAs shown are the same as in the prior figure, with AP1 232 of MLD1, STA2 234, STA1 236 of MLD2 and other STAs 238.

During a R-TWT2 SP 240, AP1 (the R-TWT scheduling AP) and STA2 (the R-TWT2 member STA) exchange frames of SCS3 and SCS6 traffic streams as listed in Table 1.

As shown in the figure, in order to transmit the P2P and/or UL transmission of SCS3 and SCS6, AP1 sends a BSRP 432 to STA2 to request the buffer status of STA1. Then, STA1 can report the buffer status (BSR) 434 to AP1 (e.g., STA3 may only report the buffer status of SCS3 and SCS6 traffic streams in BSR). Then, AP1 can send a MU-RTS TXS frame 436 as defined in IEEE 802.11be to share some TXOP time with STA2. After STA2 sends a CTS frame 438 in response to the MU-RTS TXS frame, it starts to transmit UL PPDU 440 of SCS6 to AP1. The UL PPDU contains the BSR which indicates the buffer is empty. Then, this UL PPDU can be used to indicate that the triggered TXOP sharing may have ended but STA2 has more frames of scheduled traffic streams of R-TWT2 to transmit during R-TWT2 SP. AP1 responds with a BA frame 442 after receiving the UL PPDU of SCS6 successfully to end the triggered TXOP sharing.

Later, AP1 sends a BSRP 444 to request a BSR from STA2 and STA2 reports its buffer status 446, this time with a BSR frame to report it has more frames of the scheduled traffic streams of R-TWT2 in the buffer. AP1 then sends another MU-RTS TXS frame 448 to start another triggered TXOP sharing and STA3 uses it for transmitting the P2P transmission of SCS3 to STA1 as shown in the figure. STA2 transmits a CTS 450, and then commences P2P transmission 452. After the P2P transmission is completed, and STA2 has received BA 454 from STA1, then STA2 sends a QoS Null frame 456 with EOSP set to a first state (e.g., "1") to AP1. This QoS Null frame indicates that STA2 has completed transmission of all the frames of the scheduled UL and P2P traffic streams of R-TWT2 during the current R-TWT2 SP. It should be noted that AP1 uses an MU-RTS TXS frame instead of a trigger frame for UL PPDU transmission because in some cases AP1 may not be able to differentiate the P2P buffer and UL buffer in the BSRs. Since there is a scheduled P2P traffic stream of R-TWT2, AP1 uses a MU-RTS TXS frame to start triggered TXOP sharing. That is, when both P2P traffic and UL traffic are scheduled during a R-TWT SP, the R-TWT scheduling AP should use MU-RTS TXS frame to trigger P2P traffic and UL traffic.

Then, since all the frames of the scheduled traffic streams of R-TWT2 (i.e., SCS3 and SCS6) are transmitted before the scheduled end time of the R-TWT2 SP, AP1 broadcasts a QoS Null frame 458 with EOSP set to a first state (e.g., "1") to indicate the end of the R-TWT2 SP 264. Other STAs receiving this QoS Null frame can recognize that they may start to contend for the channel immediately.

It should be noted that it may require the UL PPDU in the figure to carry QoS data or a QoS Null frame which have an EOSP subfield in the QoS control field as shown in FIG. 27 in the frame. In at least one embodiment/mode/case when one PPDU carries multiple QoS data or QoS Null frames, only the last frame can set the EOSP subfield to a first state (e.g., "1"). The EOSP settings in the PPDUs shown in the figure represent the last EOSP subfield values in those PPDUs.

In at least one embodiment/mode/case the UL PPDU in the figure carries neither QoS data nor a QoS Null frame. Then, there is no EOSP subfield to set in those frames. Instead, the More data subfield in the frame can be utilized to replace the EOSP subfield as explained in Section 4.5.

In at least one embodiment/mode/case the QoS Null frame with EOSP set to a first state (e.g., "1") can be replaced by a CF-End frame or a TWT information frame to indicate the end of the R-TWT1 SP.

During the R-TWT SP, the R-TWT scheduling AP and the R-TWT1 member STAs should use either EOSP subfield or the More data subfield but not both of them at the same time.

The signal for ending a triggered TXOP sharing can be utilized by a STA any time and is not limited to use in the R-TWT SP. In at least one embodiment/mode/case the QoS Null frame with EOSP request operates as an Ack/BA for feedback.

It should be noted that during a triggered TXOP sharing time triggered by one MU-RTS TXS frame, the STA which is the intended receiver of the MU-RTS TXS frame can send any desired number of PPDUs that will fit within the triggered TXOP sharing time.

Figure 33:
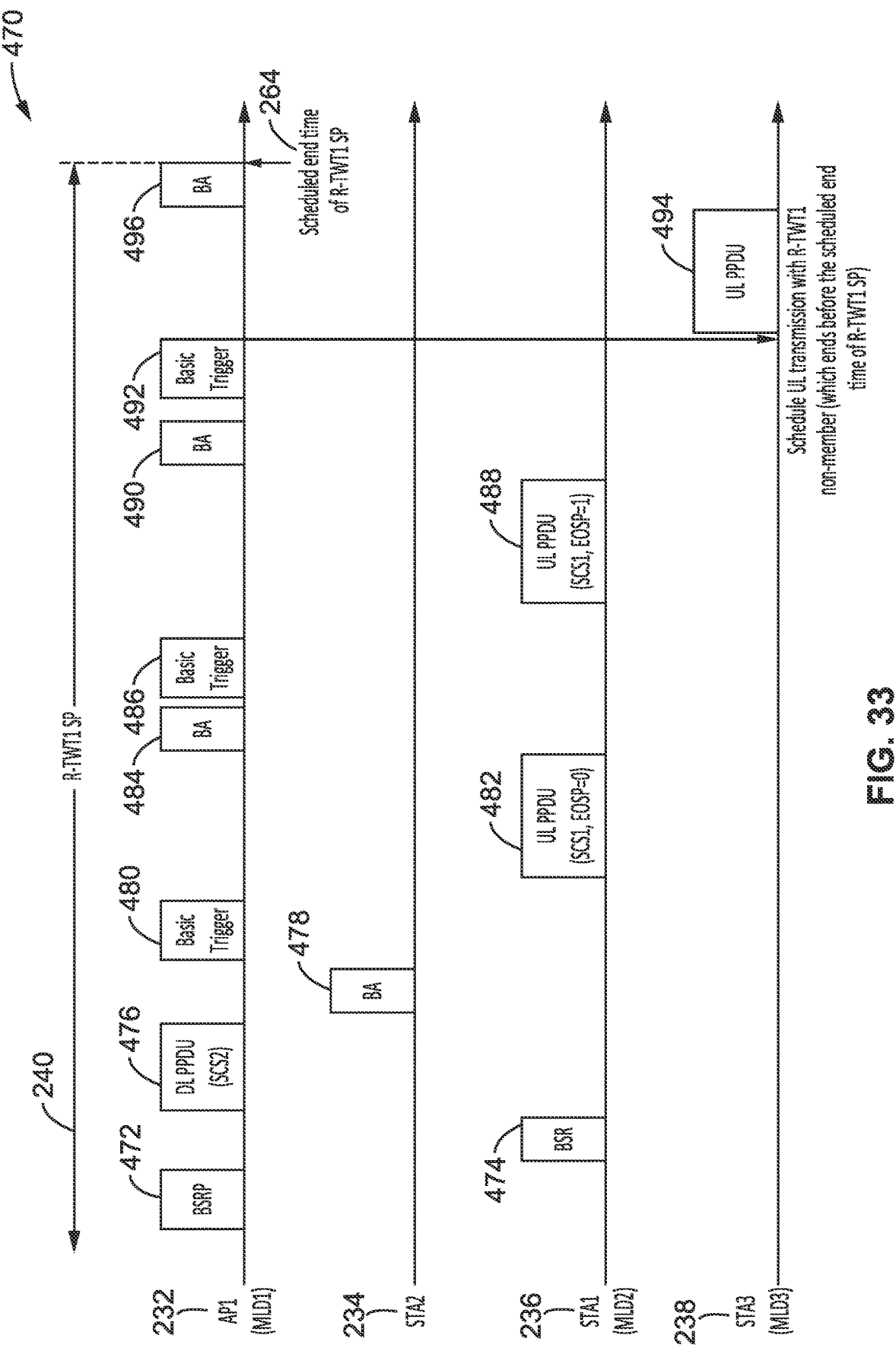
FIG. 33 is a communication diagram of an R-TWT scheduling AP arranging the transmissions of the R-TWT scheduled STAs that are not R-TWT member STAs during R-TWT SP, according to at least one embodiment of the present disclosure.

FIG. 33 illustrates an example embodiment 470 of the R-TWT scheduling AP arranging the transmissions of the R-TWT scheduled STAs that are not R-TWT member STAs during R-TWT SP. The STAs shown are the same as in the prior figure, with AP1 232 of MLD1, STA2 234, STA1 236 of MLD2 and other STAs 238.

The example is similar to the example shown in FIG. 28, except for what is performed after the UL transmissions.

During a R-TWT1 SP 240, AP1 (the R-TWT scheduling AP) and STA2 and STA1 (the R-TWT1 member STAs) exchange frames of SCS1 and SCS2 traffic streams as listed in Table 1. In order to transmit the uplink (UL) transmission of SCS1, AP1 sends a BSRP 472 to STA1 to request the buffer status of STA1. Then, STA1 reports buffer status 474 of the SCS1 traffic stream to AP1 (e.g., STA1 only reports the buffer status of SCS1 traffic stream in BSR). Then, AP1 can commence transmitting, shown here as downlink (DL) transmission 476 of SCS2 to STA2 first. The DL PPDU of SCS2 can have EOSP set to a second state (e.g., "0") to indicate there are more frames of scheduled traffic streams of R-TWT1 to be transmitted during the current R-TWT1 SP. It should be noted that AP1 can determine whether all the expected frames of SCS2 have arrived at its buffer and are transmitted. STA2 acknowledges receipt 478.

Then, AP1 triggers the UL transmission of SCS1 twice, 480 and 486, as shown in the figure. The first UL PPDU 482 of SCS1 has EOSP set to a second state (e.g., "0") which indicates that there are more UL PPDUs to be transmitted during the current R-TWT1 SP. The second UL PPDU 488 of SCS1 has EOSP set to a first state (e.g., "1") which indicates that STA1 does not have more frames of the scheduled UL traffic stream of R-TWT1 to transmit during the current R-TWT1 SP. AP1 acknowledges (e.g., BA) each uplink 484 and 490.

The difference with FIG. 28 arises when all the frames of the scheduled traffic streams of R-TWT1 (i.e., SCS1 and SCS2) have been transmitted before the scheduled end time of the R-TWT1 SP. Instead of sending a QoS Null frame with EOSP set to a first state (e.g., "1") as shown in FIG. 28; in FIG. 33 AP1 sends a basic trigger frame 492 to STA3 to trigger UL transmission 494 from STA3, and responds with a BA 496 at the end of the scheduled R-TWT1 SP 264. In sending the trigger 492 it is assumed that AP1 has determined the buffer status of STA3.

In at least one embodiment/mode/case AP1 sends a BSRP to request buffer status of STA3 before triggering the UL transmission from STA3. Then, STA3 can send a UL PPDU to AP1 as triggered by the basic trigger frame. It should be noted that STA3 is a R-TWT scheduled STA that is not a member of R-TWT1 SP. In at least one embodiment/mode/case AP1 is only allowed to arrange the transmissions of the R-TWT scheduled STAs that are not members of the current R-TWT SP. That is, for example, AP1 should not trigger any transmissions of STAG.

It should be noted that the basic trigger frame that is only sent to the R-TWT non-member STAs can indicate the end of the current R-TWT SP. In order to indicate the termination of the current R-TWT SP, the basic trigger frame may have to set its More TF field equal to a second state (e.g., "0"). For example, AP1 can send multiple basic trigger frames to the non-member STAs of R-TWT1. The last basic trigger frame should set the More TF field to a second state (e.g., "0") and the others should set the More TF field to a first state (e.g., "1").

The frame exchange between the R-TWT scheduling AP and the R-TWT non-member STAs must be completed, or otherwise terminated, before the scheduled end time of R-TWT SP.

Figure 34:
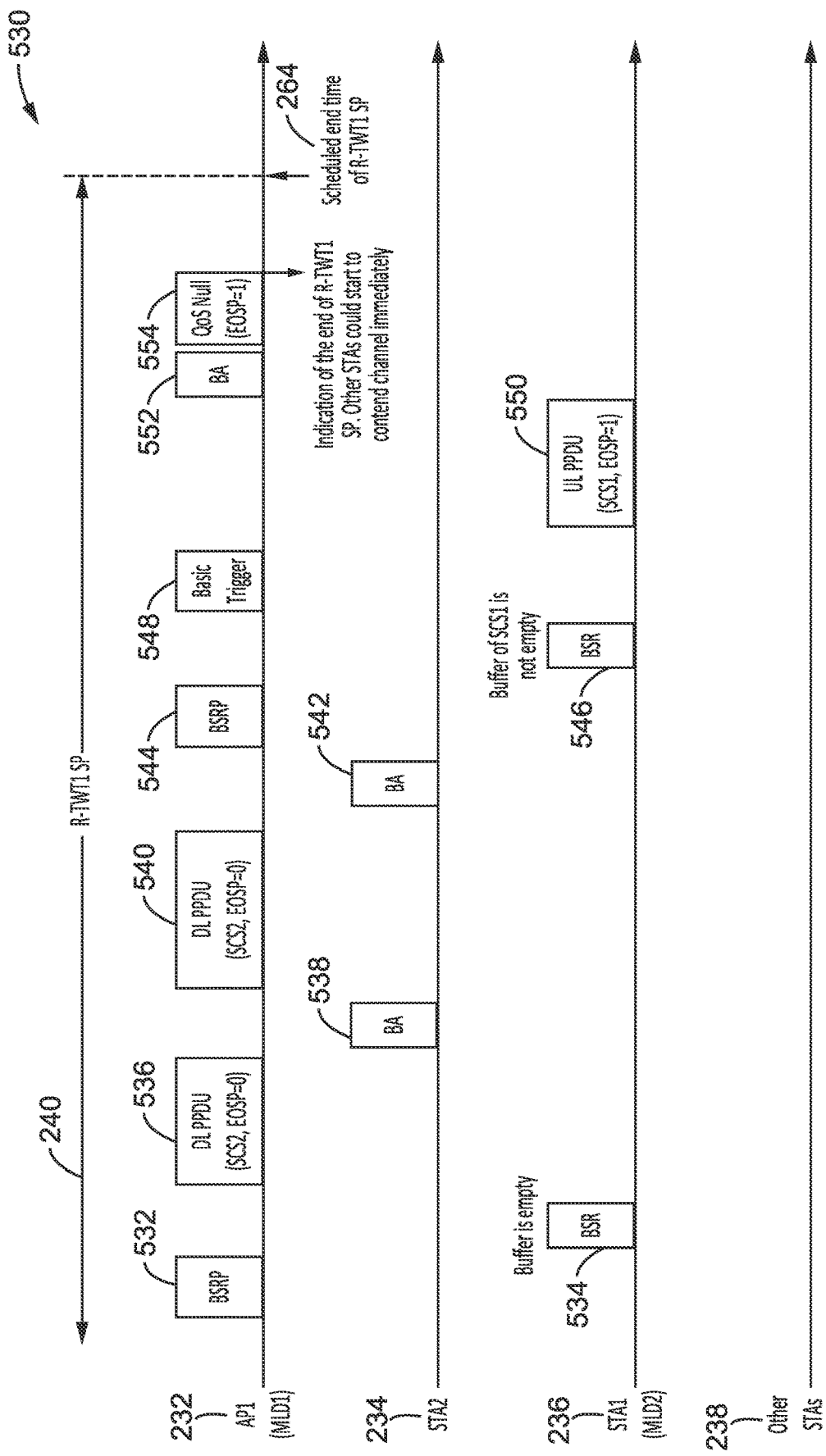
FIG. 34 is a communication diagram of the R-TWT scheduling AP waiting for the scheduled UL traffic to arrive during a R-TWT SP, according to at least one embodiment of the present disclosure.

FIG. 34 illustrates an example embodiment 530 of the R-TWT scheduling AP waiting for the scheduled UL traffic to arrive during a R-TWT SP. During a R-TWT1 SP, AP1 (the R-TWT scheduling AP) and STA2 and STA1 (the R-TWT1 member STAs) exchange frames of SCS1 and SCS2 traffic streams as listed in Table 1. The STAs shown are the same as in the prior figure, with AP1 232 of MLD1, STA2 234, STA1 236 of MLD2 and other STAs 238.

As shown in the figure, in order to transmit the uplink (UL) transmission of SCS1, AP1 sends a BSRP 532 to STA1 to request the buffer status of STA1. Then, STA1 can report the buffer status 534 of SCS1 traffic stream to AP1 (e.g., STA1 only report the buffer status of SCS1 traffic stream in BSR). However, in this instance, STA1 reports that its buffer status is empty 534. At this time the frames of the scheduled traffic stream SCS1 have not arrived at STA1.

Then, AP1 commences to transmit downlink (DL) transmissions 536 and 540 of SCS2 to STA2, and receive BAs 538 and 542. The DL PPDUs of SCS2 can have EOSP set to a second state (e.g., "0") to indicate there are more frames of the scheduled traffic streams of R-TWT1 to be transmitted during the current R-TWT1 SP. It should be noted that AP1 can determine/recognize whether all the expected frames of SCS2 have arrived at its buffer and are transmitted.

Then, AP1 sends another BSRP 544 to request the buffer status of STA1, and STA1 responds with a BSR frame 546 which indicates that its buffer is not empty. That is, the frames of the scheduled traffic stream SCS1 have arrived at STA1. AP1 triggers 548 the UL transmission of SCS1. AP1 triggers the UL transmission of SCS1 a single time (once) only as shown in the figure. As shown in the figure, the UL PPDU 550 of SCS1 has EOSP set to a first state (e.g., "1") which indicates that STA1 finishes frame transmission of its scheduled UL traffic streams of R-TWT1 during the current R-TWT1 SP. AP1 acknowledges receipt of the UL PPDU 550 by sending BA 552.

After finishing the UL transmission of SCS1, all the frames of the scheduled traffic streams during the R-TWT1 SP have been transmitted. AP1 broadcasts a QoS Null frame 554 with EOSP set to a first state (e.g., "1") to indicate the end 264 of the R-TWT1 SP. Other STAs receiving this QoS Null frame can start to contend for the channel immediately.

It should be noted that it may require the DL PPDU and UL PPDU in the figure to carry QoS data or a QoS Null frame which have an EOSP subfield in the QoS control field as shown in FIG. 27 in the frame. In at least one embodiment/mode/case when one PPDU carries multiple QoS data or QoS Null frames, only the last frame can set the EOSP subfield to a first state (e.g., "1"). The EOSP settings in the PPDUs shown in the figure represent the last EOSP subfield values in those PPDUs.

In at least one embodiment/mode/case the DL PPDU and UL PPDU in the figure carry neither QoS data nor a QoS Null frame; whereby there is no EOSP subfield to set in those frames. Instead, the More data subfield in the frame can be utilized to replace the EOSP subfield as explained in Section 4.5.

In at least one embodiment/mode/case the QoS Null frame with EOSP set to a first state (e.g., "1") can be replaced by a CF-End frame or a TWT information frame to indicate the end of the R-TWT1 SP.

During the R-TWT SP, the R-TWT scheduling AP and the R-TWT1 member STAs should use either the EOSP subfield or the More data subfield, but not both of them at the same time.

Figure 35:
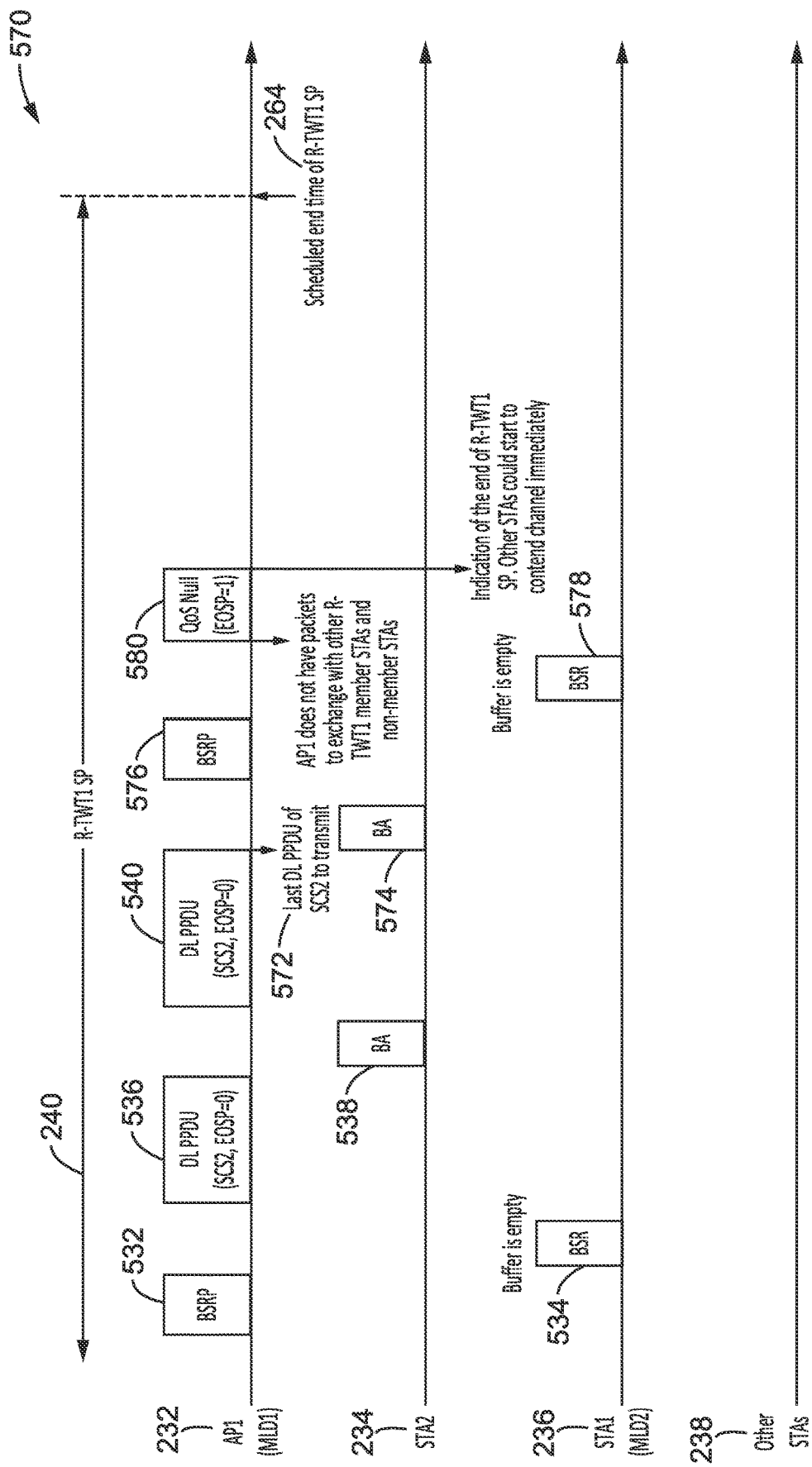
FIG. 35 is a communication diagram of a R-TWT scheduling AP terminating the R-TWT SP if no more frames of the scheduled traffic streams of that R-TWT are to be transmitted, according to at least one embodiment of the present disclosure.

FIG. 35 illustrates an example embodiment 570 of the R-TWT scheduling AP terminating the R-TWT SP if no more frames of the scheduled traffic streams of that R-TWT are to be transmitted. During a R-TWT1 SP, AP1 (the R-TWT scheduling AP) and STA2 and STA1 (the R-TWT1 member STAs) exchange frames of SCS1 and SCS2 traffic streams as listed in Table 1. The STAs shown are the same as in the prior figure, with AP1 232 of MLD1, STA2 234, STA1 236 of MLD2 and other STAs 238.

As shown in the figure, in order to transmit the uplink (UL) transmission of SCS1, AP1 sends a BSRP 532 to STA1 to request the buffer status of STA1. Then, STA1 can report buffer status of SCS1 traffic stream to AP1 (e.g., STA1 only reports the buffer status of SCS1 traffic stream in BSR). However, this time, STA1 reports that its buffer status 534 is empty. The frames of the scheduled traffic stream SCS1 have not arrived at STA1 yet.

Then, AP1 can commence transmitting downlink (DL) transmissions of SCS2 to STA2. The DL PPDUs of SCS2 can have SCS2 frames with EOSP set to a second state (e.g., "0") to indicate there are more frames of the scheduled traffic streams of R-TWT1 to be transmitted during the current R-TWT1 SP. It should be noted that AP1 determines/recognizes whether all the frames of SCS2 have arrived at its buffer and are being transmitted. Accordingly, multiple DL transmissions 536 and 540 to different stations are performed and acknowledged 538 and 574. Note that DL PPDU 540 is the last DL PPDU 572 of SCS2 to transmit.

Then, AP1 sends another BSRP 576 to request the buffer status of STA1, and STA1 responds with a BSR frame 578 which indicates that its buffer is still empty.

Since there are no frames of the scheduled traffic streams of R-TWT1 at the buffer to transmit, AP1 broadcasts a QoS Null frame 580 with EOSP set to a first state (e.g., "1") to indicate the end 264 of the R-TWT1 SP. Other STAs receive this QoS Null frame and recognize they can begin to immediately contend for the channel.

It should be noted that it may require the DL PPDU in the figure to carry QoS data or a QoS Null frame which have an EOSP subfield in the QoS control field as shown in FIG. 27. In at least one embodiment/mode/case when one PPDU carries multiple QoS data or QoS Null frames, only the last frame is to set the EOSP subfield to a first state (e.g., "1"). The EOSP settings in the PPDUs shown in the figure represent the last EOSP subfield values in those PPDUs.

In at least one embodiment/mode/case the DL PPDU in the figure carries neither QoS data or a QoS Null frame; and it follows that there is no EOSP subfield to set in those frames. Instead, the More data subfield in the frame can be used to replace the EOSP subfield as explained in Section 4.5.

In at least one embodiment/mode/case the QoS Null frame with EOSP set to a first state (e.g., "1") can be replaced by a CF-End frame or a TWT information frame to indicate the end of the R-TWT1 SP.

During the R-TWT SP, the R-TWT scheduling AP and the R-TWT1 member STAs should use either the EOSP subfield or the More data subfield; but not both of them.

Figure 36:
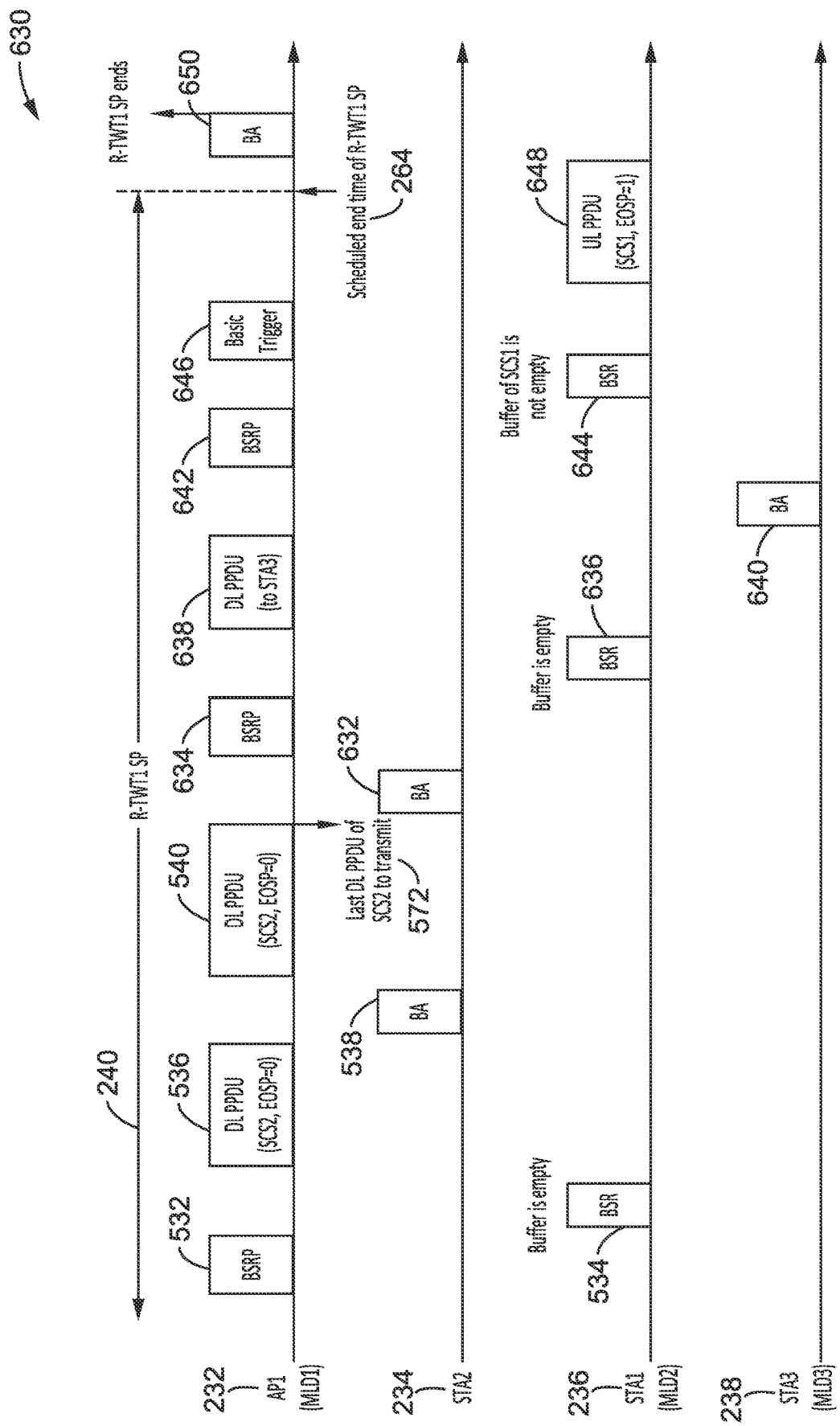
FIG. 36 is a communication diagram of a R-TWT scheduling AP exchanging frames with the R-TWT non-member STA when awaiting the arrival of the scheduled traffic, according to at least one embodiment of the present disclosure.

FIG. 36 illustrates an example embodiment 630 of the R-TWT scheduling AP exchanging frames with the R-TWT non-member STA when awaiting the arrival of the scheduled traffic. During a R-TWT1 SP, AP1 (the R-TWT scheduling AP) and STA2 and STA1 (the R-TWT1 member STAs) exchange frames of SCS1 and SCS2 traffic streams as listed in Table 1. The STAs shown are the same as in the prior figure, with AP1 232 of MLD1, STA2 234, STA1 236 of MLD2 and other STAs 238.

As shown in the figure, in order to transmit the uplink (UL) transmissions of SCS1, AP1 sends a BSRP 532 to STA1 to request the buffer status of STA1. Then, STA1 can report the buffer status of SCS1 traffic stream to AP1 (e.g., STA1 only reports the buffer status of SCS1 traffic stream in BSR). However, in this case, STA1 reports that its buffer status 534 is empty. The frame of scheduled traffic stream SCS1 has not yet arrived at STA1.

Then, AP1 commences to transmit downlink (DL) transmissions 536 and 540 of SCS2 to STA2, and is seen receiving acknowledgements (BAs) 538 and 632. Note DL PPDU 540 is the last 572 DL PPDU of SCS2 to be transmitted. The DL PPDUs of SCS2 can have EOSP set to a second state (e.g., "0") to indicate there are more frames of the scheduled traffic streams of R-TWT1 to be transmitted during the current R-TWT1 SP. It should be noted that AP1 determines/recognizes whether all the expected frames of SCS2 have arrived at its buffer and are being transmitted.

Then, AP1 sends another BSRP 634 to request the buffer status of STA1, which responds with a BSR frame 636 which indicates that its buffer is still empty.

Since there are no more frames of the scheduled traffic streams of R-TWT1 at the buffer to transmit, AP1 sends a DL PPDU 638 to STA3 which is a R-TWT scheduled STA but not a R-TWT1 member STA. After finishing the DL transmission to STA3 and receiving BA 640, then AP1 sends another BSRP 642 to STA1 for a buffer report. This time, STA1 reports (BSR) 644 the buffer of SCS1 and AP1 immediately sends a basic trigger 646 to trigger UL transmission 648 of SCS1. There is only one UL PPDU of SCS1 and STA1 sets EOSP field to a first state (e.g., "1") in the last MPDU in the UL PPDU. When AP1 sends BA 650 to indicate that the UL PPDU of SCS1 has been transmitted successfully, the R-TWT1 SP ends, it will be noted that this BA is sent after the scheduled end time 264 of T-TWT1 SP.

This example also shows a possibility that a R-TWT SP can be extended if all the frames of the scheduled traffic streams of that R-TWT cannot be transmitted before the scheduled end time of the R-TWT SP. For example, as shown in the figure, the R-TWT1 SP ends later than its scheduled end time. The R-TWT SP can be extended by the TXOP holder to extend the current TXOP. For example, as shown in the figure, the last trigger frame transmitted by AP1 can extend the TXOP.

It should be noted that it may require the DL PPDU and UL PPDU in the figure to carry QoS data or a QoS Null frame which have the EOSP subfield in the QoS control field as shown in FIG. 27 in the frame. In at least one embodiment/mode/case when one PPDU carries multiple QoS data or QoS Null frames, then only the last frame can set the EOSP subfield to a first state (e.g., "1"). The EOSP settings in the PPDUs shown in the figure represent the last EOSP subfield values in those PPDUs.

In at least one embodiment/mode/case the DL PPDU and UL PPDU in the figure carry neither QoS data nor a QoS Null frame; whereby there is no associated EOSP subfield to set in those frames. Instead, the More data subfield in the frame can be utilized to replace the EOSP subfield as explained in Section 4.5.

In at least one embodiment/mode/case the QoS Null frame with EOSP set to a first state (e.g., "1") can be replaced by a CF-End frame or a TWT information frame to indicate the end of the R-TWT1 SP.

During the R-TWT SP, the R-TWT scheduling AP and the R-TWT1 member STAs should use either EOSP subfield or More data subfield; but not both of them at the same time.

Figure 37:
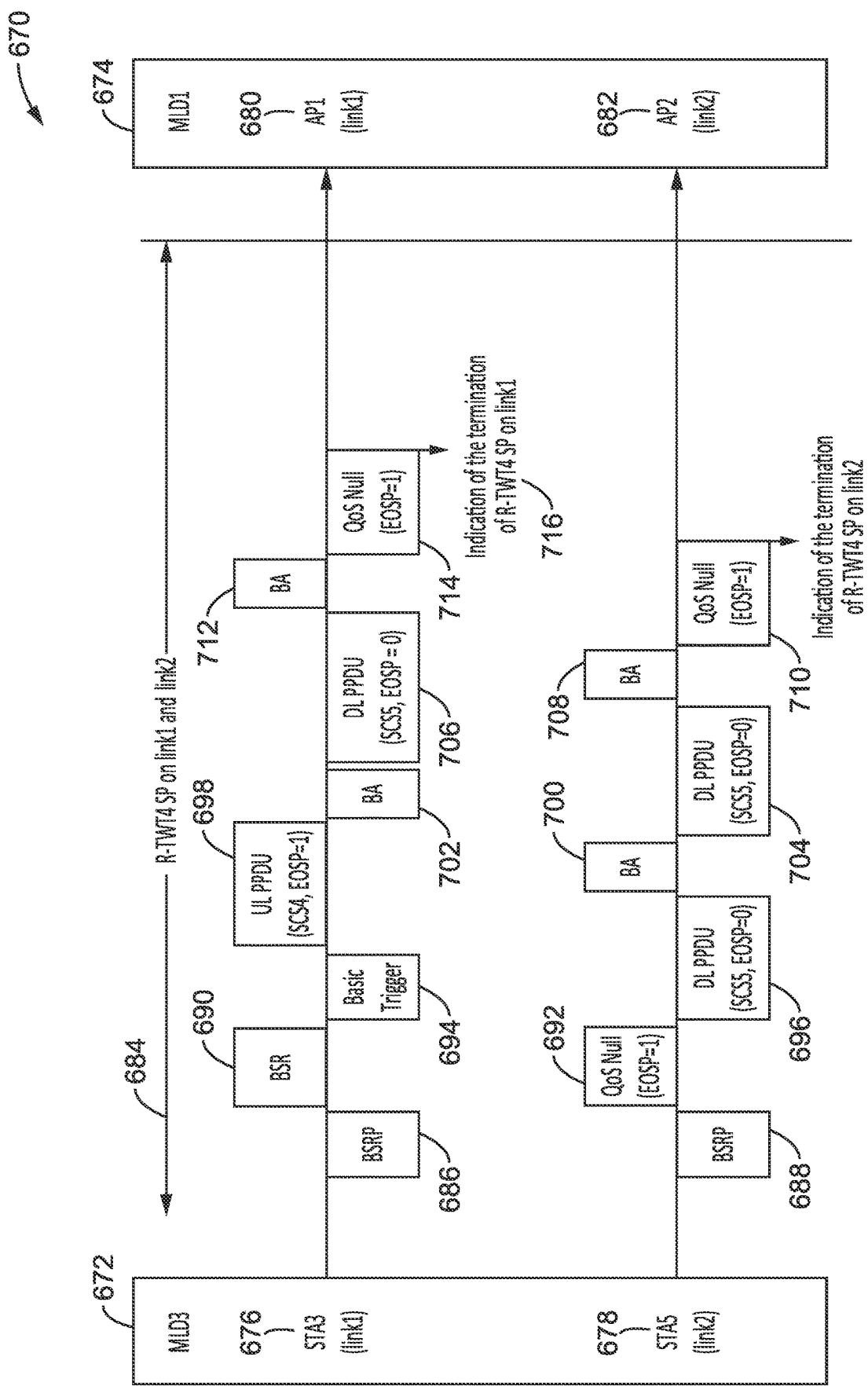
FIG. 37 is a communication diagram of termination of a multi-link R-TWT SP on each link separately, according to at least one embodiment of the present disclosure.

FIG. 37 illustrates an example embodiment 670 of termination of a multi-link R-TWT SP on each link separately. In this example, the R-TWT scheduling AP sends a signal on one link to terminate the SP of a multi-link R-TWT on that link. The example STAs are shown as STA3 676 and STA5 678 of MLD3 672, and AP1 680 and AP2 682 of MLD1 674.

As shown in the figure, R-TWT4 684 is announced by the R-TWT scheduling AP MLD1 and the R-TWT4 SPs are scheduled on both Link1 and Link2. As explained in Section 4.3, a R-TWT on multiple links can be indicated by multiple broadcast TWT parameter set fields with the same R-TWT ID and different link IDs in one TWT element. For example, AP MLD1 can announce R-TWT4 SPs on Link1 and Link2 by having one broadcast TWT parameter set field with R-TWT ID set to R-TWT4 and linkID set to Link1, and the other broadcast TWT parameter set field with R-TWT ID set to R-TWT4 and linkID set to Link2 in a TWT element in its beacon frame. A R-TWT scheduled STA can request membership of the R-TWT4 SPs on Link1 and Link2 by sending a TWT setup frame whose TWT element has one broadcast TWT parameter set field with R-TWT ID set to R-TWT4 and linkID set to Link1, and the other broadcast TWT parameter set field with R-TWT ID set to R-TWT4 and linkID set to Link2 on either Link1 or Link2.

The R-TWT scheduling STA can respond to the membership request of the R-TWT4 SPs on Link1 and Link2 by sending a TWT setup frame whose TWT element has one broadcast TWT parameter set field with R-TWT ID set to R-TWT4 and linkID set to Link1, and the other broadcast TWT parameter set field with R-TWT ID set to R-TWT4 and linkID set to Link2 on either Link1 or Link2. In at least one embodiment/mode/case the TWT setup frame which requests membership of a R-TWT, and the TWT setup frame which responds to the membership request, may be sent over different links.

Also, when non-AP MLD3 requests membership of R-TWT4, it can indicate that SCS5 and SCS4 are the scheduled traffic streams of R-TWT4. During a R-TWT4 SP, AP1 and AP2 affiliated with MLD1 (the R-TWT scheduling AP), and STA3 and STA5 affiliated with MLD3 (the R-TWT4 member STAs), exchange frames of SCS4 and SCS5 traffic streams as listed in Table 1.

As shown in the figure, in order to transmit the uplink (UL) transmission of SCS4, AP1 and AP2 send BSRPs 686 and 688 to STA3 and STA5, respectively, to request buffer status information. STA3 and STA5 can report the buffer to indicate the buffer they are requesting AP1 and AP2 to trigger for transmission on Link1 and Link2, respectively. Although SCS4 can be transmitted over Link1 and Link2, in certain instances STA3 may report the buffer status 690 of SCS4; but STA5 may report an empty buffer in a QoS Null frame 692 with EOSP set to a first state (e.g., "1").

AP1 can trigger (basic trigger 694) a transmission, shown as UL transmission 698 of SCS4 on Link1 according to the buffer report received from STA3. AP2 determines/recognizes that STA5 does not have UL transmissions during the R-TWT4 SP on Link2. It should be noted that MLD3 can make the decision on how to report the buffer on the two links.

STA3 sends the UL PPDU 698 of SCS4 with EOSP set to a first state (e.g., "1") to indicate that this is STA3 finishing all the frames of the scheduled UL traffic streams of R-TWT4 during the current R-TWT4 SP on Link1.

Then, after receiving BA 702 from STA3, AP1 can start DL transmission 706 of SCS5 on Link1. After AP1 sends all DL transmissions of SCS5 on Link1, and has received BA 712, it broadcasts a QoS Null frame 714 with EOSP set to a first state (e.g., "1") to indicate the termination 716 of the R-TWT4 on Link1.

Going back now to Link2, it is seen that after receiving the basic trigger 694, AP2 does not trigger UL transmission of SCS5 on Link2 according to the buffer report from STA5. STA5 transmits DL PPDUs 696 and 704 of SCS5 which can have EOSP set to a second state (e.g., "0") to indicate there are more frames of the scheduled traffic streams of R-TWT4 to be transmitted during the current R-TWT4 SP on Link2, and receiving BAs 700 and 708 from AP2 682. Then AP2 broadcasts a QoS Null frame 710 with EOSP set to a first state (e.g., "1") to indicate the end of the R-TWT4 SP on Link2.

It should be noted that it may require the DL PPDU and UL PPDU in the figure to carry QoS data or a QoS Null frame which have the EOSP subfield in the QoS control field as shown in FIG. 27. In at least one embodiment/mode/case when one PPDU carries multiple QoS data or QoS Null frames, then only the last frame can set the EOSP subfield to a first state (e.g., "1"). The EOSP settings in the PPDUs shown in the figure represent the last EOSP subfield values in those PPDUs.

In at least one embodiment/mode/case the DL PPDU and UL PPDU, such as seen in the figure, carry neither QoS data or a QoS Null frame; and thus, there is no EOSP subfield to set in those frames. Instead, the More data subfield in the frame can be used to replace the EOSP subfield as explained in Section 4.5.

In at least one embodiment/mode/case the QoS Null frame with EOSP set to a first state (e.g., "1") can be replaced by a CF-End frame or a TWT information frame to indicate the end of the R-TWT1 SP.

During the R-TWT SP, the R-TWT scheduling AP and the R-TWT1 member STAs should use either the EOSP subfield or More data subfield; but not both of them at once.

Figure 38:
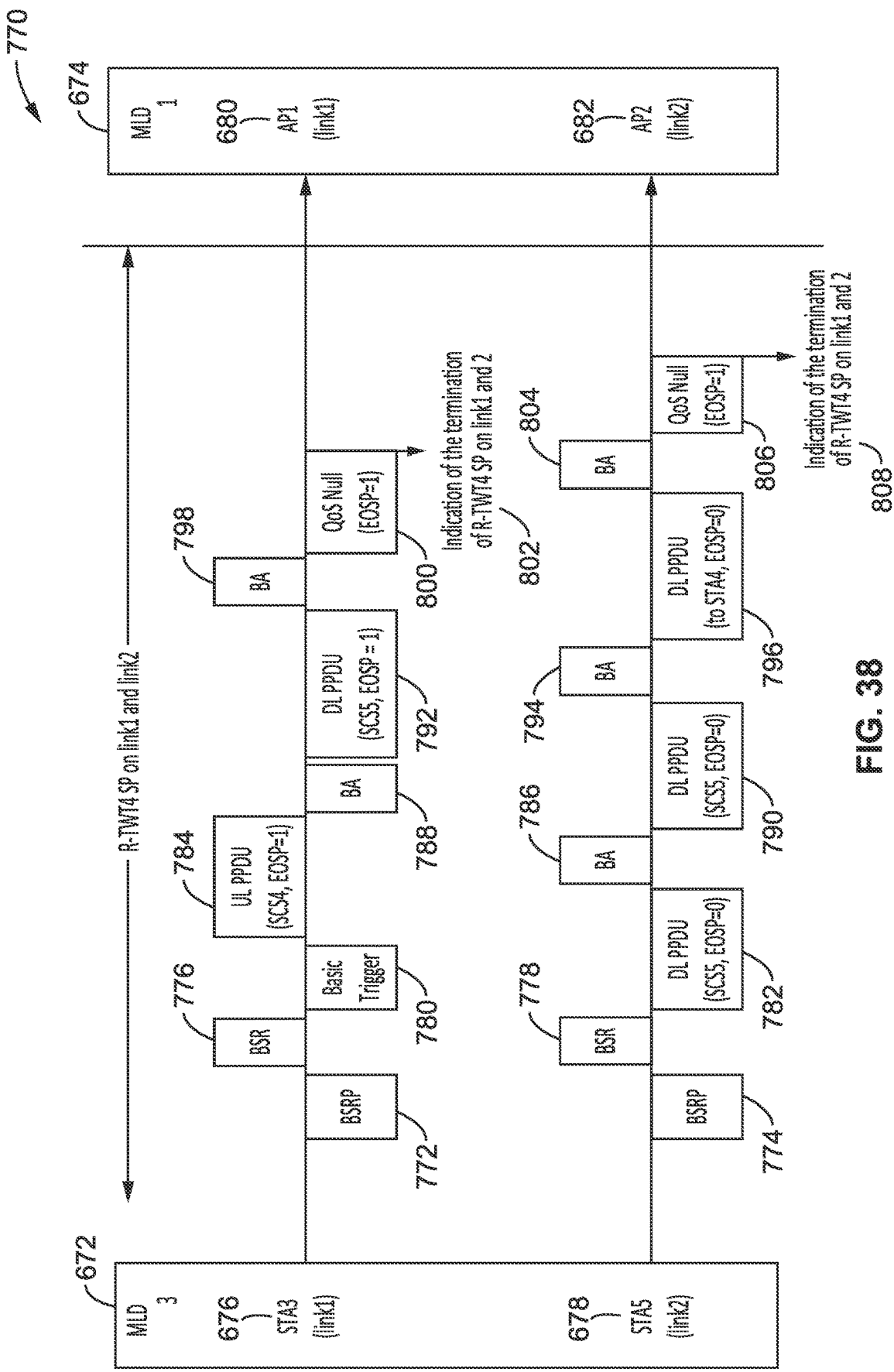
FIG. 38 is a communication diagram of termination of a ML R-TWT SP on one link, according to at least one embodiment of the present disclosure.

FIG. 38 illustrates an example embodiment 770 of termination of a ML R-TWT SP on one link. In this example, the R-TWT scheduling AP sends a signal on one link to terminate the SPs of the same R-TWT that are scheduled on different links.

The STAs shown are the same as in the prior figure, with STA3 676 and STA5 678 of MLD3 672, and AP1 680 and AP2 682 of MLD1 674.

As shown in the figure, R-TWT4 is announced 684 by the R-TWT scheduling AP MLD1 and the R-TWT4 SPs are scheduled on both Link1 and Link2. As explained in Section 4.3, a R-TWT on multiple links can be indicated by multiple broadcast TWT parameter set fields with same R-TWT ID and different link IDs in one TWT element. For example, AP MLD1 can announce the R-TWT4 SPs on Link1 and Link2 by having one broadcast TWT parameter set field with R-TWT ID set to R-TWT4 and linkID set to Link1, and the other broadcast TWT parameter set field with R-TWT ID set to R-TWT4 and linkID set to Link2 in a TWT element in its beacon frame. A R-TWT scheduled STA can request the membership of the R-TWT4 SPs on Link1 and Link2 by sending a TWT setup frame whose TWT element has one broadcast TWT parameter set field with R-TWT ID set to R-TWT4 and linkID set to Link1, and the other broadcast TWT parameter set field with R-TWT ID set to R-TWT4 and linkID set to Link2 on either Link1 or Link2. The R-TWT scheduling STA can respond to the membership request of the R-TWT4 SPs on Link1 and Link2 by sending a TWT setup frame whose TWT element has one broadcast TWT parameter set field with R-TWT ID set to R-TWT4 and linkID set to Link1, and the other broadcast TWT parameter set field with R-TWT ID set to R-TWT4 and linkID set to Link2 on either Link1 or Link2. In at least one embodiment/mode/case the TWT setup frame which requests membership of a R-TWT and the TWT setup frame which responds to the membership request may be sent over different links.

Also, when a non-AP MLD3 requests membership of R-TWT4, it can indicate that SCS5 and SCS4 are the scheduled traffic streams of R-TWT4. During a R-TWT4 SP, AP1 and AP2 affiliated with MLD1 (the R-TWT scheduling AP), and STA3 and STA5 affiliated with MLD3 (the R-TWT4 member STAs), exchange frames of SCS4 and SCS5 traffic streams as listed in Table 1.

As shown in the figure, in order to transmit the uplink (UL) transmission of SCS4, AP1 and AP2 send BSRPs 772 and 774 to STA3 and STA5, respectively, to request buffer status, and STA3 and STA5 can report their buffer status 776 and 778. It should be noted that in the example, STA3 and STA5 report the same buffer status (e.g., STA3 and STA5 only report the buffer status of SCS4 traffic stream in BSR).

Then, AP1 sends a basic trigger frame 780 on Link1 to trigger UL transmission of SCS4 on Link1. STA3 sends the UL PPDU 784 of SCS4 with EOSP set to a first state (e.g., "1") to indicate that this STA3 finishes all the frame transmission of the scheduled UL traffic streams of R-TWT4 during the current R-TWT4 SP on Link1 and Link2. Then, after receiving BA 788, AP1 can start a DL transmission 792 of SCS5 on Link1, for which it receives BA 798.

Returning back, AP2 decides not to trigger UL transmission of SCS5 on Link2 according to the buffer report from STA5. That is, one UL PPDU of SCS4 on Link1 is considered enough. AP2 starts downlink (DL) transmissions 782, 790 and 796 of SCS5 to STA5, and receives acknowledgements (BAs) 786, 794 and 804.

When AP2 sends all the DL PPDUs of SCS5 on Link2, it cannot terminate R-TWT4 SP, since DL PPDU of SCS5 is transmitting on Link1. AP2 can start some transmissions with the STAs that are scheduled R-TWT STAs, such as STA4, as explained in Section 4.4.

After AP1 receives the BA frame 798 in response to the last DL PPDU of SCS5 on Link1 which indicates all the DL PPDU of SCS5 are received successfully, AP1 can broadcast a QoS Null frame 800 with EOSP set to a first state (e.g., "1") to terminate 802 the R-TWT4 on Link1 and Link2. Then, AP2 can also broadcast a QoS Null frame 806 with EOSP set to a first state (e.g., "1") on Link2 to terminate 808 the R-TWT4 on Link1 and Link2.

It should be noted that it may require the DL PPDU and UL PPDU in the figure to carry QoS data or QoS Null frame which have EOSP subfield in the QoS control field as shown in FIG. 27 in the frame. In at least one embodiment/mode/case when one PPDU carries multiple QoS data or QoS Null frames, only the last frame should set the EOSP subfield to a first state (e.g., "1"). The EOSP settings in the PPDUs shown in the figure represent the last EOSP subfield values in those PPDUs.

In at least one embodiment/mode/case the DL PPDU and UL PPDU in the figure carry neither QoS data nor a QoS Null frame; thus, there is no EOSP subfield to set in those frames. Instead, the More data subfield in the frame can be utilized to replace the EOSP subfield as explained in Section 4.5.

In at least one embodiment/mode/case the QoS Null frame with EOSP set to a first state (e.g., "1") can be replaced by a CF-End frame or a TWT information frame to indicate the end of the R-TWT1 SP.

During the R-TWT SP, the R-TWT scheduling AP and the R-TWT1 member STAs should use either the EOSP subfield or the More data subfield; but not both of them together.

5. General Scope of Embodiments

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

An apparatus for wireless communication in a network, the apparatus comprising: (a) a wireless communication circuit, as a station (STA) which is separate or associated with a multi-link device (MLD), wherein said station is configured for wirelessly communicating over a channel with other wireless stations (STAs) performing transmissions of frames with their packets using carrier sense multiple access/collision avoidance (CSMA/CA) on a wireless local area network (WLAN) under an IEEE 802 protocol for a scheduling service period (SP) for a restricted target wake time (R-TWT); (b) a processor coupled to said STA for operating on the WLAN; (c) a non-transitory memory storing instructions executable by the processor for communicating with other STAs in a communications protocol; and (d) wherein said instructions, when executed by the processor, perform one or more steps in announcing R-TWT scheduling to exchange frames with member STAs of the R-TWT comprising: (d)(i) wherein said station, operating as an access point (AP) which is configured for performing R-TWT scheduling, as an R-TWT scheduling AP, announces R-TWT scheduling and exchanges frames with a member STA of the R-TWT after entering into an R-TWT SP; (d)(ii) wherein a termination condition is detected; and (d)(iii) wherein said R-TWT scheduling AP, transmits a signal to indicate termination of the R-TWT SP, in a termination announcement, after all the frame exchanges have been completed during the R-TWT SP.

An apparatus for wireless communication in a network, the apparatus comprising: (a) a wireless communication circuit, as a station (STA) which is separate or associated with a multi-link device (MLD), wherein said station is configured for wirelessly communicating over a channel with other wireless stations (STAs) performing transmissions of frames with their packets using carrier sense multiple access/collision avoidance (CSMA/CA) on a wireless local area network (WLAN) under an IEEE 802 protocol for a scheduling service period (SP) for a restricted target wake time (R-TWT); (b) a processor coupled to said STA for operating on the WLAN; (c) a non-transitory memory storing instructions executable by the processor for communicating with other STAs; and (d) wherein said instructions, when executed by the processor, perform one or more steps in announcing R-TWT scheduling to exchange frames with member STAs of the R-TWT comprising: (d)(i) wherein said station, operating as an access point (AP) which is configured for performing R-TWT scheduling, as an R-TWT scheduling AP; and wherein said R-TWT scheduling AP and the R-TWT member STAs enter into an R-TWT SP; (d)(ii) terminating said R-TWT SP, by said R-TWT scheduling AP, before the scheduled end time of the R-TWT SP and sending a termination announcement on the channel; and (d)(iii) wherein other STAs on the network, which are not member STAs of the R-TWT, in response to receiving said termination announcement, can immediately contend for the channel.

An apparatus for wireless communication in a network, the apparatus comprising: (a) a wireless communication circuit, as a station (STA) which is separate or associated with a multi-link device (MLD), wherein said station is configured for wirelessly communicating over a channel with other wireless stations (STAs) performing transmissions of frames with their packets using carrier sense multiple access/collision avoidance (CSMA/CA) on a wireless local area network (WLAN) under an IEEE 802 protocol for a scheduling service period (SP) for a restricted target wake time (R-TWT); (b) a processor coupled to said STA for operating on the WLAN; (c) a non-transitory memory storing instructions executable by the processor for communicating with other STAs; and (d) wherein said instructions, when executed by the processor, perform one or more steps in announcing R-TWT scheduling to exchange frames with member STAs of the R-TWT comprising: (d)(i) wherein said station, operating as an access point (AP) which is configured for performing R-TWT scheduling, as an R-TWT scheduling AP, and the R-TWT member STAs enter into an R-TWT SP; (d)(ii) exchanging frames between said R-TWT scheduling AP and the R-TWT member STAs during said R-TWT SP; and (d)(iii) exchanging frames between said R-TWT scheduling AP with STAs that have an R-TWT feature but are not R-TWT member STAs, after said R-TWT scheduling AP completes frame exchanges with the R-TWT member STAs during the R-TWT SP.

Wireless communication system/apparatus performing transmission of packets, where CSMA/CA is applied in the system/apparatus, the R-TWT scheduling AP announce a R-TWT scheduling to exchange frames with the member STAs of the R-TWT during the R-TWT SPs, comprising: (a) R-TWT scheduling AP and the R-TWT member STAs start a R-TWT SP for frame exchange between them; (b) the R-TWT member STA sends a signal to the R-TWT scheduling AP when it does not have more frames to transmit during the R-TWT SP; and (c) the R-TWT scheduling AP sends a signal to indicate the termination of the R-TWT SP when all the frame exchanges are done during the R-TWT SP.

The apparatus or method or system of any preceding implementation, wherein said termination condition arises when said STA operating as an R-TWT member STA, after determining that it has no more frames to be communicated, sends a signal to said R-TWT scheduling AP indicating it has no more frames to be transmitted during the R-TWT SP.

The apparatus or method or system of any preceding implementation, wherein said termination condition arises before the scheduled end time of the R-TWT SP, for terminating said R-TWT SP by said R-TWT scheduling AP.

The apparatus or method or system of any preceding implementation, further comprising exchanging frames between said R-TWT scheduling AP and the R-TWT member STAs during said R-TWT SP.

The apparatus or method or system of any preceding implementation, further comprising exchanging frames between said R-TWT scheduling AP with STAs that have an R-TWT feature but are not R-TWT member STAs, after said R-TWT scheduling AP completes frame exchanges with the R-TWT member STAs during the R-TWT SP.

The apparatus or method or system of any preceding implementation, wherein said instructions when executed by the processor further perform steps comprising the R-TWT member STA sending a signal to said R-TWT scheduling AP when it does not have any uplink (UL) or peer-to-peer (P2P) frames to transmit during the R-TWT SP.

The apparatus or method or system of any preceding implementation, wherein said instructions when executed by the processor further perform steps comprising said R-TWT member STA sending a frame indicating that it does not have frames to transmit during the R-TWT SP.

The apparatus or method or system of any preceding implementation, wherein said frame which indicates that it does not have frames to transmit during the R-TWT SP comprises (a) a frame that is neither a quality-of-service (QoS) data frame or a QoS Null frame; and (b) a frame which contains a field indicating whether it has more data, as a more data field which is in a state representing that said R-TWT member STA does not have any more frames to transmit during the R-TWT SP.

The apparatus or method or system of any preceding implementation, wherein said instructions when executed by the processor further perform steps comprising the R-TWT member STA sending a QoS data or QoS Null frame with the EOSP subfield set to a state which indicates that the R-TWT member STA does not have UL and/or P2P frames to transmit during the R-TWT SP.

The apparatus or method or system of any preceding implementation, wherein said instructions when executed by the processor further perform steps comprising said R-TWT scheduling AP sending a QoS data frame, or QoS Null frame, with an the EOSP subfield set to a state which indicates termination of the R-TWT SP.

The apparatus or method or system of any preceding implementation, wherein said instructions when executed by the processor further perform steps comprising said R-TWT scheduling AP sending a frame, that is neither a QoS data frame or a QoS Null frame, with the frame having a field, as a more data field, for indicating if there is more data to be sent, and said more data field is set to a value indicating the termination of the R-TWT SP.

The apparatus or method or system of any preceding implementation, wherein said instructions when executed by the processor further perform steps comprising said R-TWT scheduling AP sending a contention-free (CF) end frame to indicate termination of the R-TWT SP.

The apparatus or method or system of any preceding implementation, wherein said instructions when executed by the processor further perform steps comprising said R-TWT scheduling AP sending a trigger frame, not addressed to any specific R-TWT member STAs, having a field for indicating if there are more trigger frames, and setting that field to indicate the termination of the R-TWT SP.

The apparatus or method or system of any preceding implementation, wherein said instructions when executed by the processor further perform steps comprising said R-TWT scheduling AP sending a TWT information frame that has a TWT flow identification field set equal to the R-TWT identification, to indicate the termination of the R-TWT SP.

The apparatus or method or system of any preceding implementation, wherein said instructions when executed by the processor further perform steps comprising said member STA recognizing that the R-TWT SP has terminated, in response to receiving a frame from said R-TWT scheduling AP containing an indication that the R-TWT SP has terminated.

The apparatus or method or system of any preceding implementation, wherein said instructions when executed by the processor further perform steps comprising said member STA recognizing that the R-TWT SP has terminated in response to receiving an acknowledgement, from said R-TWT scheduling AP, indicating that the R-TWT SP has terminated.

The apparatus or method or system of any preceding implementation, wherein said instructions when executed by the processor further perform steps comprising said R-TWT scheduling AP sending a signal over the channel to indicate the termination of the R-TWT SP.

The apparatus or method or system of any preceding implementation, wherein said instructions when executed by the processor further perform steps comprising said R-TWT member STA not being allowed to contend for the channel after the R-TWT SP terminates, until the scheduled end time of the R-TWT SP is arrived at.

The apparatus or method or system of any preceding implementation, wherein said instructions when executed by the processor further perform steps comprising allowing the R-TWT member STAs to contend for the channel with lower priority than regular EDCA parameter settings for those R-TWT member STAs, after the R-TWT SP terminates until the scheduled end time of the R-TWT SP.

The apparatus or method or system of any preceding implementation, wherein said instructions when executed by the processor further perform steps comprising said R-TWT scheduling AP extending a transmit opportunity (TXOP) for frame exchanges with the R-TWT member STAs beyond the scheduled end time of the R-TWT SP.

The apparatus or method or system of any preceding implementation, where the R-TWT member STA could send a signal to the R-TWT scheduling AP when it does not have any UL or P2P frames to transmit during the R-TWT SP.

The apparatus or method or system of any preceding implementation, where the R-TWT member STA could send a frame that is neither QoS data nor QoS Null frame with the More Data field equal to 0 to indicate that it does not have frames to transmit during the R-TWT SP.

The apparatus or method or system of any preceding implementation, where the R-TWT member STA could send a QoS data or QoS Null frame with the EOSP subfield equal to 1 to indicate that it does not have UL and P2P frames to transmit during the R-TWT SP.

The apparatus or method or system of any preceding implementation, where the R-TWT scheduling AP could send a QoS data or QoS Null frame with the EOSP subfield equal to 1 to indicate the termination of the R-TWT SP.

The apparatus or method or system of any preceding implementation, where the R-TWT scheduling AP could send a frame that is neither QoS data nor QoS Null frame with the More Data field equal to 0 to indicate the termination of the R-TWT SP.

The apparatus or method or system of any preceding implementation, where the R-TWT scheduling AP could send a CF-End frame to indicate the termination of the R-TWT SP.

The apparatus or method or system of any preceding implementation, where the R-TWT scheduling AP could send a trigger frame that has the More TF field equal to 0 and is not addressed to any R-TWT member STAs to indicate the termination of the R-TWT SP.

The apparatus or method or system of any preceding implementation, where the R-TWT scheduling AP could send a TWT information frame that has the TWT flow identification field equal to the R-TWT ID to indicate the termination of the R-TWT SP.

The apparatus or method or system of any preceding implementation, where the STA could recognize the termination of the R-TWT SP when it receives a frame from the R-TWT scheduling AP that does not solicit an immediate response and indicates the termination of R-TWT SP.

The apparatus or method or system of any preceding implementation, where the STA could recognize the termination of the R-TWT SP when it receives the acknowledgement in response to a frame that is sent by the R-TWT scheduling AP and indicates the termination of R-TWT SP.

The apparatus or method or system of any preceding implementation, where the R-TWT scheduling AP could send a signal to indicate the termination of the R-TWT SP.

The apparatus or method or system of any preceding implementation, where the R-TWT member STAs could be not allowed to contend the channel after the R-TWT SP terminates until the scheduled end time of the R-TWT SP.

The apparatus or method or system of any preceding implementation, where the R-TWT member STAs could be allowed to contend the channel with lower priority after the R-TWT SP terminates until the scheduled end time of the R-TWT SP.

The apparatus or method or system of any preceding implementation, where the R-TWT scheduling AP could extend the TXOP of the frame exchange with the R-TWT member STAs beyond the scheduled end time of the R-TWT SP.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly, the reader should consult the application as filed for the original content of the disclosure. Any deletion of content of the disclosure should not be construed as a disclaimer, forfeiture, or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

SCS Traffic Steams Scheduled to Transmit during R-TWT SPs

| SCS | SCS setup originator | SCS setup recipient | Direction | <R-TWT, Links |
|---|---|---|---|---|
| 1 | MLD2 | MLD1 | Uplink | <R-TWT1, Link1> |
| 2 | STA2 | MLD1 | Downlink | <R-TWT1, Link1> |
| 3 | STA2 | STA1 | P2P | <R-TWT2, Link1> |
| 4 | MLD3 | MLD1 | Uplink | <R-TWT4, Link1>, <R-TWT4, Link2> |
| 5 | MLD3 | MLD1 | Downlink | <R-TWT4, Link1>, <R-TWT4, Link2> |
| 6 | STA2 | MLD1 | Uplink | <R-TWT2, Link1> |

What is claimed is:

1. An apparatus for wireless communication in a network, the apparatus comprising:
   (a) a wireless communication circuit, as a station (STA) which is separate or associated with a multi-link device (MLD), wherein said station is configured for wirelessly communicating over a channel with other wireless stations (STAs) performing transmissions of frames with their packets using carrier sense multiple access/collision avoidance (CSMA/CA) on a wireless local area network (WLAN) under an IEEE 802 protocol for a scheduling service period (SP) for a restricted target wake time (R-TWT);
   (b) a processor coupled to said STA for operating on the WLAN;
   (c) a non-transitory memory storing instructions executable by the processor for communicating with other STAs in a communications protocol; and
   (d) wherein said instructions, when executed by the processor, perform one or more steps in announcing R-TWT scheduling to exchange frames with R-TWT member STAs comprising:
      (i) wherein said station, operating as an access point (AP) which is configured for performing R-TWT scheduling, as an R-TWT scheduling AP, announces R-TWT scheduling, including a scheduled end time of an R-TWT SP, and exchanges frames with a R-TWT member STA, of the R-TWT member STAs, after entering into an R-TWT SP;
      (ii) wherein said R-TWT scheduling AP enters into negotiation with one or more of the R-TWT member STAs in determining which traffic streams are to be transmitted with higher priority during the announced R-TWT SP, with scheduled traffic prioritized to transmit during the R-TWT SP;
      (iii) wherein said R-TWT scheduling AP receives signals from one or more of the R-TWT member STAs indicating that there are no more frames of scheduled traffic to be transmitted; and
      (iv) wherein said R-TWT scheduling AP, after all the frame exchanges have been completed during the R-TWT SP, can share any of the remaining time of the R-TWT SP before it transmits a signal to indicate termination of the R-TWT SP, in a termination announcement.

2. The apparatus of claim 1, wherein termination announcement from said R-TWT scheduling AP occurs before the scheduled end time of the R-TWT SP.

3. The apparatus of claim 1, further comprising exchanging frames between said R-TWT scheduling AP and the R-TWT member STAs during said R-TWT SP.

4. The apparatus of claim 3, further comprising exchanging frames between said R-TWT scheduling AP with STAs that have an R-TWT feature but are not R-TWT member STAs, after said R-TWT scheduling AP completes frame exchanges with the R-TWT member STAs during the R-TWT SP.

5. The apparatus of claim 1, wherein said instructions when executed by the processor further perform steps comprising the R-TWT member STA sending a signal to said R-TWT scheduling AP when it does not have any uplink (UL) or peer-to-peer (P2P) frames to transmit during the R-TWT SP.

6. The apparatus of claim 1, wherein said instructions when executed by the processor further perform steps comprising said R-TWT member STA sending a frame indicating that it does not have frames to transmit during the R-TWT SP.

7. The apparatus of claim 6, wherein said frame which indicates that it does not have frames to transmit during the R-TWT SP comprises (a) a frame that is neither a quality-of-service (QOS) data frame or a QoS Null frame; and (b) a frame which contains a field indicating whether it has more data, as a more data field which is in a state representing that said R-TWT member STA does not have any more frames to transmit during the R-TWT SP.

8. The apparatus of claim 1, wherein said instructions when executed by the processor further perform steps comprising the R-TWT member STA sending a QoS data or QoS Null frame with the end of service period (EOSP) subfield set to a state which indicates that the R-TWT member STA does not have UL and/or P2P frames to transmit during the R-TWT SP.

9. The apparatus of claim 1, wherein said instructions when executed by the processor further perform steps comprising said R-TWT scheduling AP sending a QoS data frame, or QoS Null frame, with an end of service period (EOSP) subfield set to a state which indicates termination of the R-TWT SP.

10. The apparatus of claim 1, wherein said instructions when executed by the processor further perform steps comprising said R-TWT scheduling AP sending a frame, that is neither a QoS data frame or a QoS Null frame, with the frame having a field, as a more data field, for indicating when there is more data to be sent, and said more data field is set to a value indicating the termination of the R-TWT SP.

11. The apparatus of claim 1, wherein said instructions when executed by the processor further perform steps comprising said R-TWT scheduling AP sending a contention-free (CF) end frame to indicate termination of the R-TWT SP.

12. The apparatus of claim 1, wherein said instructions when executed by the processor further perform steps comprising said R-TWT scheduling AP sending a trigger frame, not addressed to any specific R-TWT member STAs, having a field for indicating when there are more trigger frames, and setting that field to indicate the termination of the R-TWT SP.

13. The apparatus of claim 1, wherein said instructions when executed by the processor further perform steps comprising said R-TWT scheduling AP sending a TWT information frame that has a TWT flow identification field set equal to the R-TWT identification, to indicate the termination of the R-TWT SP.

14. The apparatus of claim 1, wherein said instructions when executed by the processor further perform steps comprising the R-TWT member STA recognizing that the R-TWT SP has terminated, in response to receiving a frame from said R-TWT scheduling AP containing an indication that the R-TWT SP has terminated.

15. The apparatus of claim 1, wherein said instructions when executed by the processor further perform steps comprising the R-TWT member STA recognizing that the R-TWT SP has terminated in response to receiving an acknowledgement, from said R-TWT scheduling AP, indicating that the R-TWT SP has terminated.

16. An apparatus for wireless communication in a network, the apparatus comprising:
  (a) a wireless communication circuit, as a station (STA) which is separate or associated with a multi-link device (MLD), wherein said station is configured for wirelessly communicating over a channel with other wireless stations (STAs) performing transmissions of frames with their packets using carrier sense multiple access/collision avoidance (CSMA/CA) on a wireless local area network (WLAN) under an IEEE 802 protocol for a scheduling service period (SP) for a restricted target wake time (R-TWT);
  (b) a processor coupled to said STA for operating on the WLAN;
  (c) a non-transitory memory storing instructions executable by the processor for communicating with other STAs; and
  (d) wherein said instructions, when executed by the processor, perform one or more steps in announcing R-TWT scheduling to exchange frames with member STAs of the R-TWT comprising:
    (i) wherein said station, operating as an access point (AP) which is configured for performing R-TWT scheduling, as an R-TWT scheduling AP; and wherein said R-TWT scheduling AP and the R-TWT member STAs enter into an R-TWT SP;
    (ii) terminating said R-TWT SP, by said R-TWT scheduling AP, before the scheduled end time of the R-TWT SP and sending a termination announcement on the channel; (iii)
    (iii) wherein other STAs on the network, which are not member STAs of the R-TWT, in response to receiving said termination announcement, can immediately contend for the channel; and
    (iv) wherein said R-TWT member STA is not allowed to contend for the channel after the R-TWT SP terminates, until the scheduled end time of the R-TWT SP is arrived at.

17. The apparatus of claim 16, wherein said instructions when executed by the processor further perform steps comprising said R-TWT scheduling AP sending a signal over the channel to indicate the termination of the R-TWT SP.

18. The apparatus of claim 16, wherein said instructions when executed by the processor further perform steps comprising allowing the R-TWT member STAs to contend for the channel with lower priority than regular EDCA parameter settings for those R-TWT member STAs, after the R-TWT SP terminates until the scheduled end time of the R-TWT SP.

19. An apparatus for wireless communication in a network, the apparatus comprising:
  (a) a wireless communication circuit, as a station (STA) which is separate or associated with a multi-link device (MLD), wherein said station is configured for wirelessly communicating over a channel with other wireless stations (STAs) performing transmissions of frames with their packets using carrier sense multiple access/collision avoidance (CSMA/CA) on a wireless local area network (WLAN) under an IEEE 802 protocol for a scheduling service period (SP) for a restricted target wake time (R-TWT);
  (b) a processor coupled to said STA for operating on the WLAN;
  (c) a non-transitory memory storing instructions executable by the processor for communicating with other STAs; and
  (d) wherein said instructions, when executed by the processor, perform one or more steps in announcing R-TWT scheduling to exchange frames with member STAs of the R-TWT comprising:
    (i) wherein said station, operating as an access point (AP) which is configured for performing R-TWT scheduling, as an R-TWT scheduling AP; and wherein said R-TWT scheduling AP and the R-TWT member STAs enter into an R-TWT SP;
    (ii) terminating said R-TWT SP, by said R-TWT scheduling AP, before the scheduled end time of the R-TWT SP and sending a termination announcement on the channel;
    (iii) wherein other STAs on the network, which are not member STAs of the R-TWT, in response to receiving said termination announcement, can immediately contend for the channel; and
    (iv) wherein said instructions when executed by the processor further perform steps comprising allowing the R-TWT member STAs to contend for the channel with lower priority than regular EDCA parameter settings for those R-TWT member STAs, after the R-TWT SP terminates until the scheduled end time of the R-TWT SP.

20. The apparatus of claim 19, wherein said instructions when executed by the processor further perform steps comprising said R-TWT scheduling AP sending a signal over the channel to indicate the termination of the R-TWT SP.

21. The apparatus of claim 19, wherein said R-TWT member STA is not allowed to contend for the channel after the R-TWT SP terminates, until the scheduled end time of the R-TWT SP is arrived at.

* * * * *